United States Patent [19]

Kobayashi et al.

[11] Patent Number: 5,372,925
[45] Date of Patent: Dec. 13, 1994

[54] MULTILAYER POLYESTER SUPPORT OF PHOTOGRAPHIC MATERIAL

[75] Inventors: Hideyuki Kobayashi; Takatoshi Yajima; Kenji Nakanishi; Hiromitsu Araki, all of Hino; Hiroshi Naito, Hohfu; Yoshioki Okubo, Hohfu; Tetsutaro Hashimura, Hohfu, all of Japan

[73] Assignee: Konica Corporation, Tokyo, Japan

[21] Appl. No.: 66,983

[22] Filed: May 25, 1993

[30] Foreign Application Priority Data

| May 29, 1992 | [JP] | Japan | 4-139472 |
| Sep. 24, 1992 | [JP] | Japan | 4-279455 |
| Oct. 6, 1992 | [JP] | Japan | 4-267697 |
| Oct. 6, 1992 | [JP] | Japan | 4-292160 |
| Oct. 6, 1992 | [JP] | Japan | 4-292161 |
| Oct. 6, 1992 | [JP] | Japan | 4-292163 |

[51] Int. Cl.$^5$ ............................................. G03C 1/76
[52] U.S. Cl. ........................................ 430/533; 428/46; 428/215; 428/220; 428/480; 430/523
[58] Field of Search ............... 430/522, 533, 534, 535; 428/46, 215, 220, 480

[56] References Cited

U.S. PATENT DOCUMENTS

| 4,141,735 | 2/1979 | Schrader et al. | 430/533 |
| 4,181,528 | 1/1980 | Work, III | 430/533 |
| 4,252,885 | 2/1981 | McGrail et al. | 430/533 |
| 4,255,516 | 3/1981 | Katol et al. | 430/533 |
| 4,883,706 | 11/1989 | Grosjean . | |
| 5,138,024 | 8/1992 | Brozek et al. . | |
| 5,294,473 | 8/1993 | Kawameto | 430/533 |

Primary Examiner—Jack P. Brammer
Attorney, Agent, or Firm—Frishauf, Holtz, Goodman & Woodward

[57] ABSTRACT

Disclosed is a film constituted of a polyester, said film having a degree of roll set curl of not higher than 135 m$^{-1}$ after being subjected to heat treatment, and having a degree of recovery curl of not higher than 45 m$^{-1}$ after being subjected to hot water bath treatment.

7 Claims, 1 Drawing Sheet

MULTILAYER POLYESTER SUPPORT OF PHOTOGRAPHIC MATERIAL

BACKGROUND OF THE INVENTION

This invention relates to a film and a support of the photographic material. This invention particularly relates to a film, which has a required level of strength, which does not easily suffer from roll set curl, which has good roll set curl eliminating properties, an appropriate level of curl in the width direction, and good handling properties, and which is useful as a film to be used as a printing material, a magnetic material, and a packaging material and to be used in the form of a roll. Also, this invention particularly relates to a support of the photographic material, which has good suitability for the processing apparatuses prior to a development process, good suitability for the processing apparatuses during the development process, and good handling properties after processes, and which is suitable for use in a silver halide light-sensitive photographic material.

At present, small-sized cameras, with which photographs can be taken easily and which is easy to handle and portable, have been put to practical use. However, from the point of view of portability and handiness, a need exists for smaller-sized cameras. In order for the sizes of cameras to be made smaller, it is essential to reduce the space, in which photographic film is accommodated.

Ordinarily, photographic film is wound up as a roll around a spool and is accommodated in this form in a camera. Therefore, such that the space required to accommodate the roll of film may be reduced and such that a roll of film having a predetermined number of frames (e.g. a 36-frame roll of film) may be accommodated in the reduced space, it is necessary to decrease the thickness of the photographic film. In particular, the thickness of a polyester film currently used as a support for photographic film is approximately 120 to 125 $\mu$m and is thus markedly larger than the thickness (approximately 25 to 30 $\mu$m) of a light-sensitive layer overlaid on the support. Therefore, it is considered that decreasing the thickness of the support is the most effective means for making the photographic film thin.

Typically, one end of a roll film having a width of 35 mm or smaller is connected to a spool, and the roll film is accommodated in this form in a patrone.

As specified in JIS K7519-1982, a roll film is provided with perforations at film side edges. In many cases, when the film is rewound in a camera, or the like, claws engage with the perforations of the film in order to rewind the film. If the strength of the perforated portions (i.e. the perforation strength) is low, the film will tear.

In general, the perforation strength is correlated to the breaking strength. If the breaking strength is higher, the perforation strength will become higher.

In general, the polyester film is obtained by carrying out melt extrusion to form an unoriented film, orienting the film in the longitudinal direction and then in the transverse direction, and thereafter subjecting the film to heat treatment. However, a copolymer polyethylene terephthalate (a copolymer PET) has markedly worse orientation properties than ordinary PET, and therefore cannot easily undergo sufficient molecular orientation. Therefore, the copolymer PET yields a film which has a low mechanical strength, particularly a low mechanical strength in the longitudinal direction. Also, the film, which has not been subjected to sufficient molecular orientation, has the drawbacks in that coating defects, such as streaks, grab failures, and coating nonuniformity, occur frequently during post-processes, i.e. the processes for coating functional layers, such as an adhesive layer, an anti-static layer, and a lubricant layer, and therefore the productivity cannot be kept high.

The reasons why the coating defects occur frequently have not yet been clarified. However, it is presumed that such coating defects occur frequently because, if the molecular orientation of the film is not sufficient, the flatness of the film will be lost due to heat treatment during the post-processes, and therefore stability during the coating cannot be obtained.

As conventional plastic film supports, triacetate films, such as films constituted of triacetyl cellulose (hereinafter often referred to as TAC), have typically been used. The TAC film originally has only a low mechanical strength and is therefore not suitable as a support of the photographic material which is to be made thinner than the thickness currently employed. Also, when the TAC film is produced, large amounts of methylene chloride are used. Therefore, various incidental facilities, such as recovery apparatuses, are required for the purposes of environmental protection, and the cost of the TAC film cannot be kept low.

Polyethylene terephthalate has also been used as a support of X-ray film and process film. By virtue of its high strength, the polyethylene terephthalate support may be applied to a color negative film. However, though the polyethylene terephthalate support has a high strength, it has the drawbacks in that it has bad roll set curl eliminating properties. Specifically, if the polyethylene terephthalate support undergoes roll set curl, it cannot get rid of the roll set curl after being subjected to a development process.

As a means for eliminating the roll set curl of a polyester support, methods for imparting the hydrophilic nature to the polyester support have been disclosed in, for example, Japanese Unexamined Patent Publication Nos. 2(1990)-120857 and 1(1989)-244446. However, the disclosed methods have the drawbacks in that, when a polyester support is merely rendered hydrophilic by the addition of amounts of copolymerization constituents, which amounts are required to improve the roll set curl eliminating properties of the support after being subjected to a development process to a level equivalent to the roll set curl eliminating properties of TAC, the level of roll set curl of the copolymer polyester support before being subjected to the development process rather becomes high, and therefore the good handling properties prior to the development process become bad. Particularly, in the current photographic field, a large number of sheets of film are spliced into a single film sheet by a splicer processing machine, and the spliced film sheet is developed in an automatic development processing machine for motion picture film. During the splicer processing, the leading end of the film provided with the hydrophilic copolymer polyester support, which has a very high level of roll set curl, cannot easily enter an inlet of the splicer processing machine. If the film is introduced forcibly into the splicer processing machine, the machine will be clogged with the film or the film will become folded.

Also, in cases where the PET film is used as a support of the photographic material, the support easily suffers from roll set curl during its storage at high temperatures due to large amounts of copolymerization constituents contained therein. In addition, blocking occurs between the front surface and the back surface of a light-sensitive material provided with the support, and scratches and spot-like defects are thereby caused to occur. Thus the PET film support has bad storage stability at high temperatures.

In Japanese Patent Application No. 2(1990)-208804, a light-sensitive photographic material is proposed which comprises laminated polyester layers having different water contents and which has good roll set curl eliminating properties and good mechanical properties, such as tear strength and folding endurance. However, with the proposed technique, the light-sensitive photographic material must contain large amounts of copolymerization constituents in order to obtain sufficient roll set curl eliminating properties. Therefore, the light-sensitive photographic material easily suffers from roll set curl and has bad storage stability at high temperatures, and the properties of the copolymer polyester layers themselves, such as the mechanical strength and dimensional stability, are lost. Accordingly, though the proposed technique has effects for improving the characteristics, such as the tear strength and folding endurance, upon which the properties of an inner polyester layer having a low water content are considered to reflect, the proposed technique has no effect for improving the mechanical strength and, in particular, the characteristics, such as the modulus of elasticity, which are related to the properties of the entire film.

As described above, the support of the photographic material is required to have storage stability at high temperatures. Also, at the stage at which a development process and drying have been finished, the support of the photographic material should exhibit little absorption of light having wavelengths falling within the short wavelength range (approximately 400 to 550 nm). A positive light-sensitive material, such as photographic paper, and a positive light-sensitive material for X-ray photographs have sensitivity to the short wavelength range. Therefore, if the support of the photographic material of a positive light-sensitive material absorbs light having wavelengths falling within the short wavelength range, the problems will occur in that the color formation of a yellow layer, which is primarily sensitive to the short wavelength range, is restricted during a printing process, and therefore a photograph is obtained in which the balance between the yellow color and the magenta and cyan colors is lost. If the support of the photographic material of a light-sensitive material for X-ray photographs absorbs light having wavelengths falling within the short wavelength range, the problems will occur in that filter desensitization effects occur when a photograph is taken, and an unsharp photograph containing defects like fog is obtained.

In order to solve the problems described above, the dependence of the spectral characteristics upon wavelengths may be relieved by adding a dye to the support of the photographic material. However, in such cases, the addition of a dye in an amount necessary to relieve the light absorption specificity for wavelengths falling within the short wavelength range causes the transmittance with respect to light having wavelengths falling within the middle wavelength range to decrease markedly. As a result, when the support of the photographic material is used for the positive light-sensitive material, such as photographic paper, the color balance cannot be improved very much, the entire color density becomes low, and there is the risk that an inappropriate photograph is ultimately obtained.

Also, in cases where the support of the photographic material is used for the positive light-sensitive material for X-ray film, a decrease in the transmittance of the base lead to a decrease in the image quality.

In order to solve the above-described problems, it is considered to increase the amounts of silver halides in the emulsion layer of the positive light-sensitive material or to alter the system setting, including the setting for photographing, for the positive light-sensitive material for X-ray photographs. However, as for the positive light-sensitive material, such as photographic paper, if the decrease in the film transmittance is compensated for by prolonging the exposure time during the printing process, the entire processing time cannot be kept short. Such a method is not appropriate because a need exists at present for a reduction in the entire processing time in view of a very large number of sheets of photographic paper to be processed.

In addition, silver halides are expensive, and therefore an increase in the amounts of silver halides leads to an increase in the cost of the light-sensitive material. Also, for the purposes of recovering silver, it is necessary for additional facilities to be provided. Further, silver halides entrained in the processing solutions during a development process, a fixing process, and the like, cause environmental pollution to occur. Moreover, alteration of the setting of processes in an automatic developing machine is practically impossible when the large scale of the current world-wide market is taken into consideration.

In view of the above-described problems, in the case where the support of the photographic material does not have good storage stability at high temperatures and specific spectral characteristics or a necessary color, it is not practically advantageous A hydrophilic copolymer polyester support has a low strength due to copolymerization constituents contained therein. In cases where the film thickness is 100 μm or less, the film becomes folded in an automatic development processing machine. Also, the film has no curl in the width direction, it is not easy to handle. Specifically, because the film is limp, there is a drawback that it readily buckles and causes film conveyance troubles to occur.

In order to obtain a thin film having good handling properties, particularly a light-sensitive photographic material which can be used in a small-sized camera, it is necessary to provide a thin support, which satisfies incompatible requirements such that it has a high strength and an appropriate level of curl in the width direction, such that it does not easily suffer from roll set curl and has good handling properties, and such that it has good roll set curl eliminating properties after being subjected to a water bath dipping treatment.

Also, if the flatness of the support of the photographic material is low, various coating defects occur in the post-processes. Therefore, the support of the photographic material should satisfy the requirement that its flatness is not adversely affected by heat treatment at high temperatures.

SUMMARY OF THE INVENTION

The primary object of the present invention is to provide a film, which has a required level of strength, which does not easily suffer from roll set curl, which has good roll set curl eliminating properties, an appropriate level of curl in the width direction, and good handling properties, and which is useful as a material to be used as a printing material, a magnetic material, and a packaging material and to be used in the form of a roll.

Another object of the present invention is to provide a support of the photographic material, which has a required level of mechanical strength, which is adapted to be formed as a thin film, which does not easily suffer from roll set curl and has good handling properties, which has good suitability for the processing apparatuses prior to a development process, good suitability for the processing apparatuses during the development process, and good roll set curl eliminating properties after a development process, and which is suitable for use in a small-sized camera.

The present invention provides a first film constituted of a polyester, said film having a degree of roll set curl of not higher than 135 m$^{-1}$ after being subjected to heat treatment, and having a degree of recovery curl of not higher than 45 m$^{-1}$ after being subjected to hot water bath treatment.

The present invention also provides a second film, wherein the first film in accordance with the present invention is modified such that said film having a degree of roll set curl of not higher than 125 m$^{-1}$ after being subjected to heat treatment, and having a degree of recovery curl of not higher than 25 m$^{-1}$ after being subjected to hot water bath treatment.

The present invention further provides a third film comprising at least two polyester layers overlaid one upon the other, said film having a degree of roll set curl of not higher than 135 m$^{-1}$ after being subjected to heat treatment, and having a degree of recovery curl of not higher than 45 m$^{-1}$ after being subjected to hot water bath treatment.

The present invention still further provides a fourth film, wherein the third film in accordance with the present invention is modified such that said film having a degree of roll set curl of not higher than 125 m$^{-1}$ after being subjected to heat treatment, and having a degree of recovery curl of not higher than 25 m$^{-1}$ after being subjected to hot water bath treatment.

The present invention also provides a fifth film, wherein the first or third film in accordance with the present invention is modified such that the film may have a degree of curl in a width direction falling within the range of 5 to 30 m$^{-1}$.

The present invention also provides a sixth film, wherein the third film in accordance with the present invention is modified such that it may have a breaking strength in a longitudinal direction of not lower than 16 kg/mm$^2$.

The present invention further provides a seventh film, wherein the third film in accordance with the present invention is modified such that it may have colorimetric values satisfying the conditions of $L \geq 85$, and $b \leq 5$, wherein L represents the lightness, and b represents the chromaticity.

The present invention still further provides an eighth film, wherein the third film in accordance with the present invention is modified such that it may comprise two polyester layers, which are different from each other.

The present invention also provides a ninth film, wherein the eighth film in accordance with the present invention is modified such that either one of the different polyester layers contains, as a copolymerization constituent, an aromatic dicarboxylic acid having a metal sulfonate group.

The present invention further provides a tenth film, wherein the eighth film in accordance with the present invention is modified such that either one of the different polyester layers contains, as copolymerization constituents, an aromatic dicarboxylic acid having a metal sulfonate group, and a compound having a repeated structure of an alkyleneoxy group and/or a saturated aliphatic dicarboxytic acid.

The present invention still further provides an eleventh film, wherein the third film in accordance with the present invention is modified such that the two different kinds of the polyester layers are different from each other in a ratio of an aromatic dicarboxylic acid having a metal sulfonate group, which is contained as a copolymerization constituent, to a total ester linkage.

The present invention further provides a twelfth film, wherein the third film in accordance with the present invention is modified such that it may comprise two different kinds of polyester layers overlaid one upon the other, the two different kinds of the polyester layers differing from each other in a ratio of a compound having a repeated structure of an alkyleneoxy group, which is contained as a copolymerization constituent, to a reaction product.

The present invention still further provides a thirteenth film, wherein the third film in accordance with the present invention is modified such that it may comprise two different kinds of polyester layers overlaid one upon the other, the two different kinds of the polyester layers differing from each other in a ratio of a saturated aliphatic dicarboxylic acid, which is contained as a copolymerization constituent, to a reaction product.

The present invention also provides a fourteenth film, wherein the fifth film in accordance with the present invention is modified such that a copolymer polyester layer may be overlaid on one surface of a polyester layer, and such that the copolymer polyester layer may contain an aromatic dicarboxylic acid having a metal sulfonate group, as a copolymerization constituent, in a proportion falling within the range of 2 to 7 mol % with respect to a total ester linkage, and may contain a compound having a repeated structure of an alkyleneoxy group and/or a saturated aliphatic dicarboxylic acid, as a copolymerization constituent, in a proportion falling within the range of 3 to 10% by weight with respect to a total weight of a reaction product.

The present invention further provides a fifteenth film, wherein the third film in accordance with the present invention is modified such that the film comprises three polyester layers overlaid one upon another, wherein thicknesses of two polyester layers, which are located respectively on two sides of a middle polyester layer, are different from each other.

The present invention also provides an sixteenth film, wherein the fifteenth film in accordance with the present invention is modified such that it may comprise three polyester layers overlaid one upon another, and may satisfy the conditions of $1.1 \leq d_A/d_B \leq 5$, wherein $d_A$ and $d_B$ respectively represent the thicknesses of two polyester layers, which are located respectively on two sides of a middle polyester layer.

The present invention still further provides a seventeenth film, wherein the third film in accordance with the present invention is modified such that the film comprises three polyester layers overlaid one upon another, wherein two polyester layers, which are located respectively on two sides of a middle polyester layer, are different from each other.

The present invention further provides a eighteenth film, wherein the seventeenth film in accordance with the present invention is modified such that it may comprise the three polyester layers overlaid one upon another, and such that the two polyester layers, which are located respectively on the two sides of the middle polyester layer, may differ from each other in a ratio of an aromatic dicarboxylic acid having a metal sulfonate group, which is contained as a copolymerization constituent, to a total ester linkage.

The present invention still further provides a ninteenth film, wherein the seventeenth film in accordance with the present invention is modified such that it may comprise the three polyester layers overlaid one upon another, and such that the two polyester layers, which are located respectively on the two sides of the middle polyester layer, may differ from each other in a ratio of a compound having a repeated structure of an alkyleneoxy group, which is contained as a copolymerization constituent, to a reaction product.

The present invention also provides a twentieth film, wherein the seventeenth film in accordance with the present invention is modified such that it may comprise the three polyester layers overlaid one upon another, and such that the two polyester layers, which are located respectively on the two sides of the middle polyester layer, may differ from each other in a ratio of a saturated aliphatic dicarboxylic acid, which is contained as a copolymerization constituent, to a reaction product.

The present invention further provides a twenty-first film, wherein the third film in accordance with the present invention is modified such that the film comprises three polyester layers overlaid one upon another, wherein intrinsic viscosities of two polyester layers, which are located respectively on two sides of a middle polyester layer, are different from each other.

The present invention also provides a twenty-second film, wherein the fifteenth film in accordance with the present invention is modified such that it may comprise the three polyester layers overlaid one upon another, and such that a difference $\Delta IV$ between intrinsic viscosities of the two polyester layers, which are located respectively on the two sides of the middle polyester layer, may fall within the range of 0.02 to 0.5.

The present invention further provides a twenty-third film, wherein the seventeenth film in accordance with the present invention is modified such that it may comprise the three polyester layers overlaid one upon another, and such that the two polyester layers, which are located respectively on the two sides of the middle polyester layer, may contain an aromatic dicarboxylic acid having a metal sulfonate group, as a copolymerization constituent, in a proportion falling within the range of 2 to 7 mol % with respect to a total ester linkage, and may contain a compound having a repeated structure of an alkyleneoxy group and/or a saturated aliphatic dicarboxylic acid, as a copolymerization constituent, in a proportion falling within the range of 3 to 10% by weight with respect to a total weight of a reaction product.

The present invention still further provides a twenty-fourth film, wherein the third film in accordance with the present invention is modified such that the film comprises at least two polyester layers overlaid one upon the other, wherein the layer constitution is asymmetric with respect to the plane which divides the whole thickness of said film to a half.

The present invention also provides a twenty-fifth film, wherein the third film in accordance with the present invention is modified such that the film comprises at least four polyester layers overlaid one upon the other, wherein two of at/.east four polyester layers are different from each other.

The present invention still further provides a twenty-sixth film, wherein the first or third film in accordance with the present invention is modified such that it may comprise a polyester layer or polyester layers alone.

The present invention further provides a twenty-seventh film, wherein the third film in accordance with the present invention is modified such that the film comprises a polyester layer, which is composed of a single layer or a plurality of layers, and a copolymer polyester layer, which is overlaid on each of two surfaces of said polyester layer, which contains an aromatic dicarboxylic acid having a metal sulfonate group, as a copolymerization constituent, in a proportion falling within the range of 2 to 7 mol % with respect to a total ester linkage, and which contains a compound having a repeated structure of an alkyleneoxy group and/or a saturated aliphatic dicarboxylic acid, as a copolymerization constituent, in a proportion falling within the range of 3 to 10% by weight with respect to a total weight of a reaction product, said film simultaneously satisfying the following condition formulas (1), (2), and (3):

condition formula (1); $d_2 \leq 50$ ($\mu m$)
condition formula (2); $0.7 \leq \{(d_1+d_3)/d_2\} \leq 3$
condition formula (3); $\{(S_1 \times P_1 \times d_1)/(S_3 \times P_3 \times d_3)\} \geq 1.5$ wherein $d_2$ represents the thickness of the polyester layer, $d_1$ represents the total thickness of the copolymer polyester layer, which is overlaid on one surface of the polyester layer, $S_1$ represents the average content, in mol %, of the aromatic dicarboxylic acid with respect to the total ester linkage in the copolymer polyester layer, which is overlaid on the one surface of the polyester layer, $P_1$ represents the average content, in % by weight, of the compound having a repeated structure of an alkyleneoxy group and/or the saturated aliphatic dicarboxylic acid with respect to the reaction product in the copolymer polyester layer, which is overlaid on the one surface of the polyester layer, and $d_3$, $S_3$, and $P_3$ represent values in the copolymer polyester layer overlaid on the other surface of the polyester layer, which values respectively correspond to $d_1$, $S_1$, and $P_1$.

The present invention still further provides a first support of the photographic material comprising the first or third film in accordance with the present invention.

The present invention still further provides a second support of the photographic material, wherein the first support of the photographic material in accordance with the present invention is modified such that the film has a breaking strength in a longitudinal direction of not lower than 16 kg/mm².

The present invention still further provides a third support of the photographic material, wherein the first support of the photographic material in accordance with the present invention is modified such that the film has colorimetric values satisfying the conditions of $L \geq 85$, and $b \leq 5$, wherein L represents the lightness, and b represents the chromaticity.

The present invention also provides a fourth support of the photographic material, wherein the first support of the photographic material in accordance with the present invention is modified such that it may comprise at least one polyester layer and at least one copolymer polyester layer, which is constituted of a copolymer polyester containing a polyethylene naphthalate as a main constituent, the copolymer polyester containing an aromatic dicarboxylic acid having a metal sulfonate group in a proportion falling within the range of 1 to 8 mol % with respect to a total ester linkage and containing a compound having a repeated structure of an alkyleneoxy group in a proportion falling within the range of 3 to 20% by weight with respect to the copolymer polyester, such that a thickness of a single polyester layer may be not larger than 50 μm, and such that the ratio of a total thickness $d_8$ of the copolymer polyester layer to the total thickness $d_7$ of the polyester layer may fall within the range of $0.7 \leq d_8/d_7 \leq 3$.

The present invention further provides a fifth support of the photographic material, wherein the fourth support of the photographic material in accordance with the present invention is modified such that it may comprise at least one polyester layer and at least one copolymer polyester layer, such that a thickness of a single polyester layer may be not larger than 40 μm, and such that the ratio of a total thickness $d_8$ of the copolymer polyester layer to the total thickness $d_7$ of the polyester layer may fall within the range of $1 \leq d_8/d_7 \leq 2$.

The present invention still further provides a sixth support of the photographic material, wherein the fourth support of the photographic material in accordance with the present invention is modified such that it may comprise at least one polyester layer and at least one copolymer polyester layer, such that a copolymer polyester, which is contained in the copolymer polyester layer, may contain an aromatic dicarboxylic acid having a metal sulfonate group, as a copolymerization constituent, and may contain diethylene glycol in a proportion falling within the range of not higher than 5 mol % with respect to a total ester linkage.

The present invention still further provides a seventh support of the photographic material comprising a single or a plurality of polyester layers and at least one copolymer polyester layer, which is laminated on both surface of said polyester layer, containing 2 to 7 mole % of an aromatic dicarboxylic acid with respect to the total acid components having metal sulfonate groups as a monomer unit and containing 3 to 10% by weight of polyalkylene glycol with respect to a total weight of a reaction product, wherein when the thickness of said polyester layer is d2, the sum of the thickness of the copolymer polyester layer laminated on one surface of said polyester is d1, an average content (mole %) of said aromatic dicarboxylic acid with respect to the total acid components is S1, and an average content (% by weight) of said polyalkylene glycol with respect to the reaction product is P1, and those of the copolymer polyester layer on the other surface of said polyester layer are d3, S3 and P3, respectively, said support simultaneously satisfies the following condition formuras 1, 2 and 3:

condition formura 1; $d2 \leq 50$ (μm)
condition formura 2; $0.7 \leq \{(d1+d3)/d2\} \leq 3$
condition formura 3; $\{(S1 \times P1 \times d1)/(S3 \times P3 \times d3)\} \geq 1.5$.

The films in accordance with the present invention have a required level of strength, do not easily suffer from roll set curl, and have good roll set curl eliminating properties. Also, the films in accordance with the present invention have an appropriate level of curl in the width direction, and good handling properties, and are useful as a film to be used as a printing material, a magnetic material, and the like. The support of the photographic materials constituted of the films in accordance with the present invention are suitable for use in photographic film to be used in small-sized cameras.

DESCRIPTION OF THE PREFERRED EMBODIMENT

Figure 1:
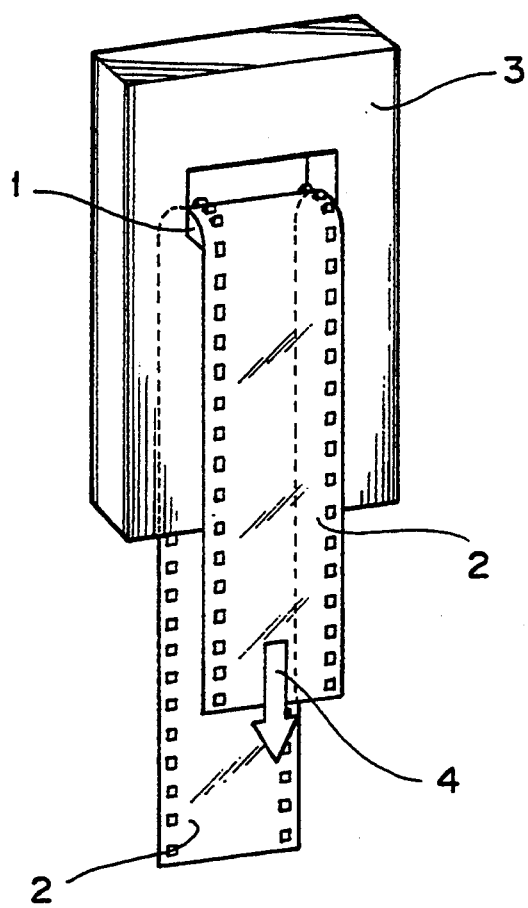
FIG. 1 is a perspective view showing a tester used for measuring perforation strength of a light-sensitive material in accordance with the present invention.

The present invention will hereinbelow be described in further detail.

(1) Evaluation methods

How physical values defining the film in accordance with the present invention are evaluated will be described hereinbelow.

Degree of roll set curl of film after being subjected to heat treatment

A film serving as a sample having a size of 12 cm × 35 mm is subjected to moisture conditioning under the conditions of 23° C. and 55% RH for one day. Thereafter, the film is wound around a core tube having a diameter of 10.8 mm and subjected to heat treatment under the conditions of 55° C. and 20% RH for 4 hours. In cases where the film having been subjected to moisture conditioning has curl in the width direction, the film is wound around the core tube such that the concave surface of the film may stand facing the exterior. Thereafter, the film is allowed to cool in a 23° C., 55% RH atmosphere for 30 minutes and released from the core tube. One minute after the film has been released from the core tube, the degree of roll set curl of the film is measured.

After a light-sensitive material has been made, silver halide emulsion layers and/or gelatin backing layers, which are overlaid on both sides of a support of the light-sensitive material, may be separated from the support by using pancreatin or an aqueous sodium hypochlorite solution. The support, i.e. the film, may then be subjected to heat treatment in the same manner as that described above, and may then be evaluated. In this manner, approximately the same degree of roll set curl of the film after being subjected to heat treatment can be obtained. Therefore, measurement of the degree of roll set curl of the film after being subjected to heat treatment may be carried out after the support has been separated from the light-sensitive material.

Degree of recovery curl of film after being subjected to hot water bath treatment A film serving as a sample having a size of 12 cm × 35 mm is wound around a core tube having a diameter of 10.8 mm and subjected to heat treatment under the conditions of 55° C. and 20% RH for 4 hours. Thereafter, the film is released from the core tube. A load of 70 g is applied to the film, and the film is then dipped in a water bath at 38° C. for 10 minutes. While the load is being applied to the film, the film is dried for 3 minutes in a warm air drier at 55° C. In cases where the film having been subjected to moisture conditioning has curl in the width direction, the film is wound around the core tube such that the concave surface of the film may stand facing the exterior.

The load is then removed from the film, and the film serving as the sample is placed horizontally. The film is then subjected no moisture conditioning under the conditions of 23° C. and 55% RH for one day. Thereafter, the degree of roll set curl of the horizontally placed film is measured at a middle portion of the film.

After a light-sensitive material has been made, silver halide emulsion layers and/or gelatin backing layers, which are overlaid on both sides of a support of the light-sensitive material, may be separated from the support by using pancreatin or an aqueous sodium hypochlorite solution. The support, i.e. the film, may then be subjected to heat treatment in the same manner as that described above, and then to hot water bath treatment, followed by evaluation. In this manner, the same degree of recovery curl of the film can be obtained. Therefore, measurement of the degree of recovery curl of the film after being subjected to hot water bath treatment may be carried out after the support has been separated from the light-sensitive material.

Degree of curl in the width direction

After a film serving as a support has been made, the support is cut to a length of 2 mm in the longitudinal direction of the original support and to a width of 35 mm in the transverse direction (i.e. in the width direction) of the original support, and a sample film is thereby obtained. The sample film is subjected to moisture conditioning under the conditions of 23° C. and 55% RH for one day. Thereafter, the curl in the width direction is measured.

After a light-sensitive material has been made, silver halide emulsion layers and/or gelatin backing layers, which are overlaid on both sides of a support of the light-sensitive material, may be separated from the support by using pancreatin or an aqueous sodium hypochlorite solution. The support, i.e. the film, may then be cut in the same manner as that described above, and may then be evaluated. In this manner, the same degree of curl in the width direction can be obtained. Therefore, measurement of the degree of curl in the width direction may be carried out after the support has been separated from the light-sensitive material. Herein, the degree of roll set curl, the degree of recovery curl and the curl in the width direction is represented by $1/r$ ($m^{-1}$). The above r represents a radius of curvature and the unit is meter (m).

Colorimetric values of film: L, b

The lightness (L value) and the chromaticity (b value) are calculated from the transmittance, which has been measured for the film by using a C light source in a transmittance mode in accordance with the JIS.
Device used: Hitachi Spectrophotometer U-3200

After a light-sensitive material has been made, silver halide emulsion layers and/or gelatin backing layers, which are overlaid on both sides of a support of the light-sensitive material, may be separated from the support by using pancreatin or an aqueous sodium hypochlorite solution. The support, i.e. the film, may then be evaluated. In this manner, the same colorimetric values can be obtained. Therefore, measurement of the colorimetric values may be carried out after the support has been separated from the light-sensitive material.

Intrinsic viscosity

An Ubbelohde viscometer is used. Solutions (temperature: 20° C.) having sample concentrations of 0.2, 0.6, and 1.0 (g/dl) are prepared by using a mixture solvent containing phenol and 1,1,2,2-tetrachloroethane in a weight ratio of approximately 55:45 (adjusted to a flowing time of 42.0±0.1 sec.). The specific viscosity ($\eta_{sp}$) at each concentration (C) is measured by using the Ubbelohde viscometer, and the intrinsic viscosity ($\eta$) is calculated by carrying out extrapolation to zero concentration with the following formula $$[\eta] = \lim_{C \to 0} \frac{\eta_{sp}}{C}$$

After a light-sensitive material has been made, silver halide emulsion layers and/or gelatin backing layers, which are overlaid on both sides of a support of the light-sensitive material, may be separated from the support by using pancreatin or an aqueous sodium hypochlorite solution. The support, i.e. the film, may then be cut and evaluated in the same manner as that described above. In this manner, the same intrinsic viscosity can be obtained. Therefore, measurement of the intrinsic viscosity may be carried out after the support has been separated from the light-sensitive material.

(2) Film

Characteristics of film

The film in accordance with the present invention is constituted of a single polyester layer or of a laminated structure comprising at least two polyester layers, which has a degree of roll set curl of not higher than 135 $m^{-1}$ after being subjected to heat treatment, and has a degree of recovery curl of not higher than 45 $m^{-1}$ after being subjected to hot water bath treatment. The film in accordance with the present invention should preferably be constituted of a single polyester layer or of a laminated structure comprising at least two polyester layers, which has a degree of roll set curl of not higher than 125 $m^{-1}$ after being subjected to heat treatment, and has a degree of recovery curl of not higher than 25 $m^{-1}$ after being subjected to hot water bath treatment. In cases where the degree of roll set curl of the film after being subjected to heat treatment falls within the above-described range and, at the same time, the degree of recovery curl of the film after being subjected to hot water bath treatment falls within the above-described range, good suitability for the splicer processing apparatuses prior to a development process and good roll set curl eliminating properties after the development process has been carried out can be obtained. If the degree of roll set curl of the film after being subjected to heat treatment is higher than 135 $m^{-1}$ the suitability for the splicer processing apparatuses prior to the development process becomes bad. If the degree of recovery curl of the film after being subjected to hot water bath treatment is higher than 45 $m^{-1}$, the roll set curl eliminating properties of the film after being subjected to the development process become bad.

The film in accordance with the present invention should preferably has curl in the width direction. The degree of curl in the width direction should fall within the range of 5 to 30 $m^{-1}$, and should preferably fall within the range of 5 to 20 $m^{-1}$. In cases where the film in accordance with the present invention has curl in the width direction and is used in the form of a roll, the film can be wound in the form of a roll such that the concave surface of the film may face the exterior. In this manner, the film can be prevented from getting roll set curl.

Also, if the degree of curl in the width direction falls within the aforesaid range, when the film in accordance with the present invention is used as a support of the photographic material, good handling properties can be obtained during the coating of an emulsion layer on the support, and folding of the support does not easily occur in an automatic development processing machine.

Material constituting the film

The film in accordance with the present invention comprises at least one polyester layer and/or at least one copolymer polyester layer.

Polyester

The polyester used as a material for constituting the polyester layer has repeating units of a dicarboxylic acid and a diol as main constituents. The polyester should preferably has the repeating units of an aromatic dibasic acid and a glycol as main constituents.

The dibasic acids include, for example, terephthalic acid, isophthalic acid, and naphthalenedicarboxylic acids. Diols or glycols include, for example, ethylene glycol, propylene glycol, butanediol, neopentyl glycol, 1,4-cyclohexanedimethanol, diethylene glycol, and p-xylene glycol. In particular, a copolymer polyethylene terephthalate, which contains terephthalic acid and ethylene glycol as main constituents, and a copolymer polyethylene-2,6-naphthalate, which contains 2,6-naphthalenedicarboxylic acid and ethylene glycol, are preferable.

The polyester may also be constituted of a copolymer, in which the proportion of the main repeating units is 85 mol % or more, preferably 90 mol % or more, and may contain a different polymer in a proportion such that the good properties intrinsic to the polyester may not be lost.

From the viewpoint of the orientation properties during the production of a laminated film, the intrinsic viscosity of the polyester should preferably fall within the range of 0.45 to 0.80, and should more preferably fall within the range of 0.55 to 0.70.

Copolymer polyester

As the copolymer polyester used in forming the copolymer polyester layer, a copolymer polyester may be used, which contains an aromatic dicarboxylic acid having a metal sulfonate group, as a copolymerization constituent, and which contains repeating units of a dicarboxylic acid and a diol as main constituents. The copolymer polyester should preferably contain an aromatic dibasic acid and glycol as main constituents. Also, in the present invention, as the copolymer polyester, a mixture of the above-described copolymer polyester and the above-described polyester may be used.

The dibasic acids include, for example, terephthalic acid, isophthalic acid, and naphthalenedicarboxylic acids. Diols or glycols include, for example, ethylene glycol, propylene glycol, butanediol, neopentyl glycol, 1,4-cyclohexanedimethanol, diethylene glycol, and p-xylene glycol. In particular, a copolymer polyethylene terephthalate, which contains terephthalic acid and ethylene glycol as main constituents, and a copolymer polyethylene-2,6-naphthalate, which contains 2,6-naphthalenedicarboxylic acid and ethylene glycol, are preferable.

From the viewpoint of the orientation properties during the production of a laminated film, the intrinsic viscosity of the copolymer polyester should preferably fall within the range of 0.35 to 0.75, and should more preferably fall within the range of 0.45 to 0.65.

The aromatic dicarboxylic acids having a metal sulfonate group, which may be used as the copolymerization constituent for the copolymer polyester, include 5-sodiumsulfoisophthalic acid, 2-sodiumsulfoterephthalic acid, 4-sodiumsulfoterephthalic acid, 4-sodiumsulfo-2,6-naphthalenedicarboxylic acid, aromatic dicarboxylic acids represented by the formulas shown below, and compounds obtained by substituting sodium in the above-enumerated compounds by a different metal, e.g. potassium or lithium. In particular, ester forming derivatives of the above-enumerated compounds, and compounds obtained by substituting sodium in the above-enumerated compounds by a different metal (e.g. potassium or lithium) are used.

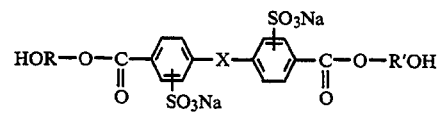

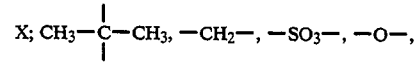

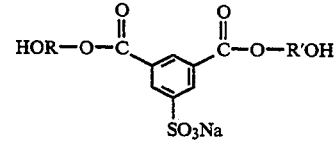

R,R'; —(CH$_2$)$_n$—

The aromatic dicarboxylic acid having a metal sulfonate group, which is contained in the copolymer polyester in the present invention, can be detected by being hydrolyzed. Such that a support of the photographic material may be obtained which has good roll set curl eliminating properties and good flatness and which is free of coating defects during post-processes, the proportion of the aromatic dicarboxylic acid having a metal sulfonate group with respect to the total ester linkage should preferably fall within the range of 2 to 7 mol %, and should more preferably fall within the range of 3 to 6 mol %.

Insofar as the aromatic dicarboxylic acid having a metal sulfonate group is contained as the copolymerization constituent and the effects of the present invention are not lost, the copolymer polyester used in the present invention should preferably further contain, as the copolymerization constituent, a compound having a repeated structure of an alkyleneoxy group and/or aliphatic dicarboxylic acid having 4 to 20 carbon atoms.

As the compound having a repeated structure of an alkyleneoxy group, there can be included the compounds represented by a formula shown below, for example, polyalkylene glycol, polyalkyleneoxy dicarboxylic acid and/or derivatives thereof.

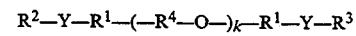

wherein Y is COO, O and OOC, R$^1$ is (CH$_2$)$_m$ (m=1–4), R$^2$ and R$^3$ is H or an alkylene group having 1 to 4 carbon atoms, R$^4$ is (CH$_2$)$_n$ (n=2–4) and k is an integer of 10 or more.

As polyalkyleneoxy dicarboxylic acid, there is included polyethyleneoxy dicarboxylic acid, polytetramethyleneoxy dicarboxylic acid and derivatives thereof. The molecular weight of the dicarboxylic acid is not limitative and is within the range of 600 to 20000, preferably 1000 to 10000, particularly preferably 2000 to 5000. As a polyalkyleneoxy dicarboxylic acid, polyethleneoxy dicarboxylic acid or the derivative thereof is particularly preferable in the view from the eliminating property of roll set curl.

The polyalkylene glycols include polyethylene glycol, polytetramethylene glycol, and the like. Of these polyalkylene glycols, polyethylene glycol is preferable. Though no limitation is imposed on the molecular weight of the polyalkylene glycol, the molecular weight ordinarily falls within the range of 300 to 20,000, and should preferably fall within the range of 600 to 10,000, and should more preferably fall within the range of 1,000 to 5,000. As the polyalkylene glycol, polyethylene glycol is particularly preferable.

Further, the polyalkylene glycol is more preferable than the polyalkyleneoxy dicarboxylic acid.

Ordinarily, the amount of the compound having a repeated structure of an alkyleneoxy group with respect to the total weight of the reaction product should preferably fall within the range of 3 to 10% by weight.

The aliphatic dicarboxylic acids having 4 to 20 carbon atoms include succinic acid, adipic acid, and sebacic acid, among which adipic acid or its ester derivatives are preferable.

In cases where the copolymer polyester, which contains the aromatic dicarboxylic acid having a metal sulfonate group as the copolymerization constituent in the present invention, contains the aliphatic dicarboxylic acid as the copolymerization constituent, the amount of the aliphatic dicarboxylic acid detected by hydrolyzing the copolymer polyester is ordinarily 3 to 25 mol % with respect to the total ester linkage.

Roll set curl of photographic film can be eliminated easily in cases where the polyalkylene glycol and the aliphatic dicarboxylic acid are contained as the monomer units in the copolymer polyester such that their proportions may fall within the aforesaid ranges.

Insofar as the effects of the present invention are not lost, the copolymer polyester used in the present invention may contain other copolymerization constituents in a proportion falling within the range of 0 to 15 mol % with respect to the total ester linkage, and may be mixed with other polymers.

The copolymer polyester used in the present invention should preferably contain an anti-oxidant.

No limitation is imposed on the kind of the anti-oxidant. The anti-oxidants include hindered phenol compounds, allyl amine compounds, phosphite compounds, and thioester anti-oxidants, among which the hindered phenol compounds are preferable. Such that the photographic performance may be obtained and turbidity of the copolymer polyester may be reduced, the proportion of the anti-oxidant with respect to the copolymer polyester ordinarily falls within the range of 0.01 to 2% by weight, and should preferably fall within the range of 0.1 to 0.5% by weight. A single kind of the anti-oxidant may be used alone, or two or more kinds of anti-oxidants may be used in combination.

Preparation of polyester and copolymer polyester

The polyester and the copolymer polyester used in the present invention may contain phosphoric acid, phosphorous acid, their esters, and inorganic particles (silica, kaolin, calcium carbonate, calcium phosphate, titanium dioxide, and the like) at the polymerization stage. Also, after the polymerization, the resulting polymer may be mixed with inorganic particles. Additionally, during or after the polymerization stage, pigments, ultraviolet light absorbers, anti-oxidants, and the like, may be added to the polyester and the copolymer polyester.

In order to obtain the copolymer polyester, melt polymerization may be carried out after the above-described copolymerization constituents have been subjected to ester exchange and have then be added. Alternatively, melt polymerization may be carried out after the ester exchange is performed, on a mixture containing the copolymerization constituents before being subjected to ester exchange, or solid phase polymerization may be carried out on a polymer obtained from melt polymerization. Thus any of known synthetic methods may be used.

Catalysts to be used during the ester exchange include acetates, fatty acid salts, and carbonates of metals, such as manganese, calcium, zinc, and cobalt. Among these catalysts, hydrates of manganese acetate and calcium acetate are preferable, and the mixture of them are more preferable. It is efficient to add hydroxides, metal salts of aliphatic carboxylic acids, or quaternary ammonium salts in proportions such that the ester exchange reaction and/or polymerization reaction may not be obstructed or such that the polymer may not be colored. Among these compounds, sodium hydroxide, sodium acetate, and tetraethylhydroxyammonium are preferable, and sodium acetate is more preferable.

The polyester or the copolymer polyester used to form the film in accordance with the present invention may contain various additives. For example, a dye may be added to the polyester or the copolymer polyester in order to prevent a light piping phenomenon, which occurs when light enters from edges of a support of the photographic material on which a photographic emulsion has been coated. The dye is not limited to a specific type, should preferably have good heat resistance from the viewpoint of film forming process, and may be anthraquinone chemical dye, or the like. From the viewpoint of color tone of the film, a gray dye as in ordinary light-sensitive material is preferable. A single kind of dye may be used alone, or two or more kinds of dyes may be used in combination. As such dyes, SUMIPLAST supplied by Sumitomo Chemical Co., Ltd., Diaresin supplied by Mitsubishi Chemical Industries Ltd., and MACROLEX supplied by Bayer A.G. may be used alone or in combination.

Layer structure of film

As described above, the film in accordance with the present invention has at least one polyester layer and/or at least one copolymer polyester layer. The film may have a single layer structure or a laminated structure composed of an arbitrary number of layers, for example, two, three, or four layers. A multi-layer structure composed of two or more layers is preferable. The layer constituting the film of the present invention is limited to a layer having a thickness of 2 microns or more. A layer having a thickness smaller than 2 microns, e.g. an undercoat layer, is not regarded as the layer constituting the film.

Film having single-layer structure

In cases where the film of the present invention is constituted of a single layer, the layer is a polyester layer, and should preferably be a copolymer polyester layer. The copolymer polyester layer may be constituted of the copolymer polyester described above or a mixture of the copolymer polyester and the above-described polyester.

In cases where the single-layered film is formed with the above-described copolymer polyester, the proportion of the aromatic dicarboxylic acid having a metal sulfonate group, which is contained as the copolymerization constituent, with respect to the total ester linkage should preferably fall within the range of 1 to 5 mol %, and should more preferably fall within the range of 2 to 4 mol %. By the adjustment of the content of the aromatic dicarboxylic acid having a metal sulfonate group such that it may fall within the aforesaid range, the roll set curl eliminating properties of the film after being subjected to the development process can be improved still further, and roll set curl of the film before being subjected to the development process can be reduced still further.

For the purposes of obtaining the film, which has a degree of roll set curl of not higher than 135 m$^{-1}$ after being subjected to heat treatment, and has a degree of recovery curl of not higher than 45 m$^{-1}$ after being subjected to hot water bath treatment, for example, a method may be used wherein the contents of the polyalkylene glycol and/or the saturated aliphatic dicarboxylic acid are adjusted or wherein an appropriate filler is added in an appropriate proportion to the copolymer polyester. Also, the single-layered copolymer polyester film should preferably be subjected to solvent treatment, wherein solution penetration with an organic solvent described below is carried out on one surface of the film, followed by heat treatment. In this manner, the surface treated with the solvent may be provided with curl in the width direction. When the film is used in the roll form, the film may be wound such that its concave surface may stand facing the exterior.

For the purposes of adjusting such that the degree of curl of the film in the width direction may fall within the range of 5 to 30 m$^{-1}$ and preferably within the range of 5 to 20 m$^{-1}$ after the polyester or the copolymer polyester is formed into a film, the film may be biaxially oriented, and then penetration treatment using an organic solvent, such as toluene, phenol, or hexane, may be carried out on one surface of the film. Thereafter, heat treatment and drying may be carried out.

If the degree of curl in the width direction falls within the above-described range, the handling properties during the coating of an emulsion layer can be kept good, and the film does not easily fold in an automatic development processing machine.

The thickness of the single-layered film ordinarily falls within the range of 50 to 130 $\mu$m, and should preferably fall within the range of 65 to 90 $\mu$m.

The film of the present invention constituted of a single layer can be produced in the manner described below. Specifically, an unoriented film may be obtained according to the conventional procedure. For example, the obtained resin is dried sufficiently, and the molten resin is extruded via a filter, a nozzle, and the like, to form a sheet. The sheet is then cast on a rotating cooling drum and thereby cooled and solidified.

In order to carry out biaxial orientation on the thus obtained film, one of processes (A), (B), (C) and (D) described below may be used.

(A) The unoriented film is oriented in the longitudinal direction and then in the transverse direction.

(B) The unoriented film is oriented in the transverse direction and then in the longitudinal direction.

(C) The unoriented film is oriented in the longitudinal direction by a single step or a plurality of steps, then again oriented in the longitudinal direction, and is thereafter oriented in the transverse direction.

(D) The unoriented film is oriented in the longitudinal direction by a single step or a plurality of steps, then oriented in the transverse direction and is thereafter again oriented in the longitudinal direction.

Such that the mechanical strength, the dimensional stability, and the like, of the film support may be satisfied, the orientation should preferably be carried out in an area ratio between 4 and 16. Also, the heat setting may be carried out at temperatures falling within the range of 150° to 240° C.

Film having laminated structure

In cases where the film of the present invention has a laminated structure comprising two or more layers, the thickness of each layer can generally be determined appropriately in accordance with the kinds of the polyester and the copolymer polyester used. The ratio of the total thickness $d_5$ of the copolymer polyester layer to the thickness $d_4$ of the polyester layer should preferably satisfy the condition $0.7 \leq d_5/d_4 \leq 3$, and should more preferably satisfy the condition $1 \leq d_5 d_4 \leq 2$. The thickness $d_4$ of the single polyester layer should preferably be not larger than 50 $\mu$m, and should more preferably be not larger than 40 $\mu$m.

Thus, the layer constitution is preferably the two layers constitution and the three layers constitution in the view from the eliminating property of roll set curl, and particularly preferably the three layers constitution that the polyester layer is provided as an inner layer and the copolymer polyester layers are laminated as an outer layer. In the case of the two layers constitution and the three layers constitution, particularly, in order to enhance the adhesiveness between the polyester layer and the copolymer polyester, the polyester layer of the inner or outer layer or the copolymer polyester layer of the outer or inner layer is preferably a blend of the polyester layer and the copolymer polyester layer. In cases where both polyester are blended, the blend ratio of the copolymer polyester/polyester is preferably within the range of 20/80 to 80/20, particularly preferably, 30/70 to 50/50 from the view of the adhesiveness between both layers and the eliminating property of roll set curl.

Though the total thickness of the film having the laminated structure is not limited to a specific value, it should preferably fall within the range of 40 to 130 $\mu$m, and should more preferably fall within the range of 65 to 100 $\mu$m. If the total thickness of the film having the laminated structure is smaller than this range, there is the risk that the required strength cannot be obtained. If it is larger than this range, the advantage over the conventional support of the photographic material cannot be obtained. Also, if the thickness of the polyester layer is larger than 50 $\mu$m, the roll set curl eliminating properties become poor.

In cases where the laminated structure of the film is composed of two layers, three layers, or four or more layers, such that the film of the present invention may be imparted with curl in the width direction, it is necessary that, when the film is divided into two laminated structures at an arbitrary lamination plane, the layer configurations above and below the division plane should be asymmetric with respect to each other.

The term "asymmetry" as used herein means that the layer configurations above and below the division plane are different from each other in physical, mechanical, or chemical properties. For example, the asymmetry represents a difference in the order, in which the polyester layer and the copolymer polyester layer or a layer of a different material are overlaid, a difference in the thickness of the polyester layer, the copolymer polyester layer, or a layer of a different material, a difference in the amounts of the main constituents contained in the polyester or the copolymer polyester, a difference in the kind or the amount of the copolymerization constituent, a difference in the intrinsic viscosity, or a difference between polyester layers on both sides of the division plane in the kind or content of the copolymerization constituent.

Confirmation of the asymmetry of the laminated film may be carried out with one of various analytic devices and is not limited to a specific method. As for the layer configuration, the asymmetry can be confirmed by microscopic observation of the cross-section of the film or by taking a microscopic photograph. Alternatively, while the film is being seen with a microscope, each layer may be scraped off, or the layers may be scraped off from the two sides of the film to the plane, at which the film is to be divided to two halves. In this manner, analytic samples of the upper and lower layers may be obtained. The analytic samples may then be hydrolyzed, and subjected to measurement with one of various measuring devices for liquid chromatography, NMR, and the like. As another alternative, the analytic samples may be dissolved in a solvent, and subjected to NMR analyses, GPC (gel permeation chromatography) analyses, and measurement of the intrinsic viscosity, and the like. As a further alternative, the analytic samples in the form of powder may be subjected to X-ray spectral analyses, or may be mixed with KBr, or the like, and subjected to analyses with IR (infrared spectroscopic device), or the like. The asymmetry may then be confirmed or measured on the basis of a difference between absolute values obtained, a difference between positions or magnitudes of peaks in the corresponding measurement results, and the like.

In cases where the film of the present invention comprises two layers, three layers, or four or more layers, the film can be imparted with curl in the width direction by appropriately adjusting the aforesaid items, such as the layer configuration, film thickness, and the amount of the copolymerization constituent. When the film is to be used in the roll form, it may be wound such that its concave surface may stand facing the exterior. In this manner, the effects of the present invention in that the film does not easily suffer from roll set curl can be obtained.

The film of the present invention having the laminated structure comprising two or more layers can be produced in the manner described below. Specifically, for example, a method may be used wherein, after molten polyester and molten copolymer polyester are independently extruded from different extruders, they are adhered to one another as a plurality of layers like laminar flow in a conduit or an extrusion nozzle for the molten polymers, extruded in this form, and cooled and solidified on a cooling drum, and the unoriented film thus obtained is subjected to biaxial orientation and heat setting. Alternatively, a method may be used wherein the polyester or the copolymer polyester and a laminated film are subjected to melt extrusion from an extruder and cooled and solidified on a cooling drum, and the unoriented film thus obtained or a monoaxially oriented film obtained from the unoriented film is coated with an anchoring agent, an adhesive, or the like, when necessary. Thereafter, a polyester or a copolymer polyester and a laminated film are extrusion-laminated on the unoriented film or the monoaxially oriented film, and the resulting laminate is then subjected to biaxial orientation and heat setting. The coextrusion method is preferable from the viewpoint of easiness of the process.

In such cases, no limitation is imposed on the conditions under which the film is oriented. In general, in the same manner as that for the above-described polyester layer composed of a single layer, the method (A), (B), or (C) may be carried out for biaxial directions at temperatures falling within the range of Tg to Tg+100° C. wherein Tg represents the glass transition temperature of the polyester layer or the glass transition temperature of the copolymer polyester layer, whichever is higher. The orientation magnification in terms of the area ratio should preferably fall within the range of 4 to 16. Also, the heat setting can be carried out at a temperature falling within the range of 150° to 24° C.

(1) Two-layered film

In cases where the film is composed of two layers, the thicknesses of the two layers may be identical or different. The kind or the content of the main constituent of the polyester or the copolymer polyester should preferably be different between the two layers, or the kind or the content of the copolymerization constituent should preferably be different between the two layers. For example, the two-layered film may be composed of a polyester layer and a copolymer polyester layer, or may be composed of a copolymer polyester layer and a copolymer polyester layer. The copolymer polyester in the copolymer polyester layer should preferably contain an aromatic dicarboxylic acid having a metal sulfonate group, as the copolymerization constituent. The copolymer polyester in the copolymer polyester layer should more preferably further contain a compound having a repeated structure of an alkyleneoxy group and/or a saturated aliphatic dicarboxylic acid. The proportion of the aromatic dicarboxylic acid having a metal sulfonate group with respect to the total ester linkage should preferably fall within the range of 2 to 7 mol %. The proportion of the the compound having a repeated structure of an alkyleneoxy group and/or the saturated aliphatic dicarboxylic acid with respect to the total weight of the reaction product should preferably fall within the range of 3 to 10% by weight.

As for the two-layered film, by appropriate adjustments of the aforesaid items, the degree of curl of the film in the width direction can be adjusted at a predetermined value.

The adjustment of the degree of curl in the width direction can also be carried out by laminating a polyester layer and a copolymer polyester layer. In such cases, the side of the copolymer polyester layer constitutes a concave surface. As for the film comprising two copolymer polyester layers, by appropriate adjustments of the film thickness and formulations, the degree of curl in the width direction can be adjusted.

Also, as in the case of the single-layered film, the surface of the polyester layer or the copolymer polyester layer may be subjected to penetration treatment using an organic solvent, heat-treated, and then dried.

For the purposes of obtaining the film, which has a degree of roll set curl of not higher than 135 $m^{-1}$ after being subjected to heat treatment, and has a degree of recovery curl of not higher than 45 $m^{-1}$ after being subjected to hot water bath treatment, for example, a copolymer polyester layer and a polyester layer may be laminated together, or different copolymer polyester layers may be laminated together. When the copolymer polyester layer and the polyester layer are laminated together, ordinarily, the film curls such that the side of the copolymer polyester layer may constitutes the concave surface.

Also, in cases where the polyester layer and the copolymer polyester layer are laminated together, the ratio of the thickness $d_6$ of the copolymer polyester layer to the thickness $d_4$ of the polyester layer should preferably satisfy the condition $0.7 \leq d_6/d_4 \leq 3$, and should more preferably satisfy the condition $1 \leq d_6/d_4 \leq 2$. The thickness $d_4$ of the single polyester layer should preferably be not larger than 50 $\mu m$, and should more preferably be not larger than 40 $\mu m$. By such adjustments, the film can be caused to curl such that the side of the copolymer polyester layer may constitute the concave surface. In cases where two different kinds of copolymer polyester layers are laminated together, the film curls such that the copolymer polyester layer containing a larger amount of the copolymerization constituent than the other layer constitutes the concave surface.

(2) Three-layered film

In cases where the film of the present invention is composed of three layers, two outer layers should preferably be constituted of either one of the polyester layer and the copolymer polyester layer. Insofar as the effects of the present invention are not lost, the middle layer may be constituted of a polyester or a different material. The different material is not limited to a specified material and may be a polycarbonate, a polyether, a polyamide, a polyimide, a polyphthalamide, a polyphthalimide, or the like. In the film of the present invention, all of the three layers should preferably be constituted of polyester layers.

In the cases of the three-layered film, the thicknesses of the outer layers may be identical or different, and should preferably be different. In cases where a thicker outer layer has a thickness $d_A$ and a thinner outer layer has a thickness of $d_B$, the ratio $d_A/d_B$ should preferably fall within the range of $1.1 \leq d_A/d_B \leq 5$, and should more preferably fall within the range of $1.3 \leq d_A/d_B \leq 3$.

By the adjustment of the thicknesses of the outer layers such that they may be different from each other, curl in the width direction, the degree of roll set curl, and the degree of recovery curl can be adjusted at predetermined values.

Also, in the cases of three-layered film, the the polyesters or the copolymer polyesters constituting the two outer layers of the laminated film should preferably be different from each other in the kind or the amount of the main constituent, in the kind or the amount of the copolymerization constituent, or in the intrinsic viscosity. In such cases, as the copolymerization constituent in the copolymer polyester used, the aromatic dicarboxylic acid having a metal sulfonate group should be contained in a proportion falling within the range of 2 to 10 mol % with respect to the total ester linkage, and should preferably be contained in a proportion falling within the range of 2 to 7 mol % with respect to the total ester linkage. The copolymer polyester should more preferably contain the compound having a repeated structure of an alkyleneoxy group and/or the saturated aliphatic dicarboxylic acid, as the copolymerization constituent, in a proportion falling within the range of 3 to 10% by weight with respect to the total weight of the reaction product.

In cases where the film is composed of three layers, by appropriate adjustments of the above-described items, the laminated film can be imparted with curl in the width direction, a degree of roll set curl, and a degree of recovery curl. For example, in cases where the middle layer is constituted of the copolymer polyester layer and the two outer layers are constituted of the polyester layers, the film is imparted with curl in the width direction such that the side of the outer layer having a smaller thickness, i.e. $d_B$, may constitute the concave surface. In cases where the two outer layers are constituted of copolymer polyester layers and the copolymer polyesters of the two outer layers are approximately identical with each other in the content of the copolymerization constituent or the intrinsic viscosity, the film curls such that the side of the copolymer polyester layer having a larger thickness may constitute the concave surface. In cases where the two outer layers are constituted of copolymer polyester layers having approximately identical thicknesses, the film curls such that the side of the copolymer polyester layer having a higher intrinsic viscosity or containing a larger amount of the copolymerization constituent may constitute the concave surface. In cases where the two outer layers are constituted of the polyester layer and/or the copolymer polyester layer and their intrinsic viscosities are different, the difference DIV in the intrinsic viscosity should preferably fall within the range of 0.02 to 0.5, and should more preferably fall within the range of 0.05 to 0.4. It should most preferably fall within the range of 0.1 to 0.3. In cases where the difference $\Delta IV$ in the intrinsic viscosity falls within the above-described range, if the thicknesses of the two outer layers do not differ markedly, the outer layer having a higher intrinsic viscosity constitutes the concave surface, and an appropriate degree of curl in the width direction can be obtained. In cases where all of the three layers are constituted of copolymer polyester layers, the film curls such that the side of the copolymer polyester layer having a smallest thickness may constitute the concave surface.

The films described above in detail can be used in various applications which are known at present. They are particularly suitable as a polyester film used in the form of a roll film and as support of the photographic materials.

An embodiment of the film in accordance with the present invention, which has a laminated structure composed of three or more layers and which is preferable as a support of the photographic material, comprises a polyester layer, which is composed of a single layer or a plurality of layers, and a copolymer polyester layer, which is overlaid on each of two surfaces of said polyester layer, which contains an aromatic dicarboxylic acid having a metal sulfonate group, as a copolymerization constituent, in a proportion falling within the range of 2 to 7 mol % with respect to the total ester linkage, and preferably within the range of 2 to 6 mol % with respect to the total ester linkage, and which contains a compound having a repeated structure of an alkyleneoxy group and/or a saturated aliphatic dicarboxylic acid, as a copolymerization constituent, in a proportion falling within the range of 3 to 10% by weight with respect to the total weight of the reaction product, and preferably within the range of 4 to 8% by weight with respect to the total weight of the reaction product, the film simultaneously satisfying the following condition formulas (1), (2), and (3):

condition formula (1); $d_2 \leq 50$ ($\mu$m)
condition formula (2); $0.7 \leq \{(d_1+d_3)/d_2\} \leq 3$
condition formula (3); $\{(S_1 \times P_1 \times d_1)/(S_3 \times P_3 \times d_3)\} \geq 1.5$ wherein $d_2$ represents the thickness of the polyester layer, $d_1$ represents the total thickness of the copolymer polyester layer, which is overlaid on one surface of the polyester layer, $S_1$ represents the average content, in mol %, of the aromatic dicarboxylic acid with respect to the total ester linkage in the copolymer polyester layer, which is overlaid on the one surface of the polyester layer, $P_1$ represents the average content, in % by weight, of the compound having a repeated structure of an alkyleneoxy group and/or the saturated aliphatic dicarboxylic acid with respect to the reaction product in the copolymer polyester layer, which is overlaid on the one surface of the polyester layer, and $d_3$, $S_3$, and $P_3$ represent values in the m number of the copolymer polyester layers overlaid on the other surface of the polyester layer, which values respectively correspond to $d_1$, $S_1$, and $P_1$. (This film is often particularly referred to as the support of the photographic material.)

$$d1 = \sum_{i=1}^{n} (d1i)$$

In cases where the proportion of the aromatic dicarboxylic acid having a metal sulfonate group, which is contained as the copolymerization constituent in the copolymer polyester layer, with respect to the total acid constituent falls within the above-described range, the roll set curl recovery properties of the photographic film using this film can be improved still further. Also, in cases where the proportion of the compound having a repeated structure of an alkyleneoxy group with respect to the total weight of the reaction product falls within the above-described range, the roll set curl recovery properties of the photographic film using this support of the photographic material can be improved still further, and the mechanical strength of the support of the photographic material can be improved.

The aforesaid support of the photographic material should preferably simultaneously satisfy the following condition formulas (1), (2), and (3):

condition formula (1); $d_2 \leq 50$ ($\mu$m)
condition formula (2); $0.7 \leq \{(d_1+d_3)/d_2\} \leq 3$
condition formula (3); $\{(S_1 \times P_1 \times d_1)/(S_3 \times P_3 \times d_3)\} \geq 1.5$ wherein $d_2$ represents the thickness of the polyester layer, $d_1$ represents the total thickness of the copolymer polyester layer, which is overlaid on one surface of the polyester layer and which is composed of n, m number of layers, $S_1$ represents the average content, in mol %, of the aromatic dicarboxylic acid with respect to the total acid constituent contained in all of n number of the layers in the copolymer polyester layer, which is overlaid on the one surface of the polyester layer, $P_1$ represents the average content, in % by weight, of the compound having a repeated structure of an alkyleneoxy group and/or the saturated aliphatic dicarboxylic acid with respect to the total weight of the reaction product in the copolymer polyester layer, which is overlaid on the one surface of the polyester layer, and $d_3$, $S_3$, and $P_3$ represent values in m number of the copolymer polyester layer, which is overlaid on the other surface of the polyester layer and which is composed of n number of layers, the values respectively corresponding to $d_1$, $S_1$, and $P_1$.

In these formulas, n, m, $d_1$, $S_1$, $P_1$, $d_3$, $S_3$, and $P_3$ are defined as described below.

n: A natural number satisfying the condition of $n \geq 1$.
m: A natural number satisfying the condition of $m \geq 1$.
$d_1$: If the thicknesses of n number of the layers constituting the copolymer polyester layer, which is overlaid on one surface of the polyester layer, are respectively represented by $d_{11}$, $d_{12}$, $d_{13}$, . . . , $d_{1n-1}$, $d_{1n}$, the following formula obtains.

$$d1 = \sum_{i=1}^{n} (d1i)$$

Therefore, in accordance with this formula, $d_1$ can be regarded as representing the total thickness of the copolymer polyester layer, which is overlaid on one surface of the polyester layer and which is composed of n number of the layers.

$S_1$: If the contents, in mol %, of the aromatic dicarboxylic acid having a metal sulfonate group with respect to the total acid constituent in the respective layers constituting the copolymer polyester layer, which is overlaid on the one surface of the polyester layer and which is composed of n number of the layers, are respectively represented by $S_{11}$, $S_{12}$, $S_{13}$, . . . , $S_{1n-1}$, $S_{1n}$, the following formula obtains.

$$S1 = \sum_{i=1}^{n} (S1i \times d1i) / \sum_{i=1}^{n} (d1i)$$

Therefore, in accordance with this formula, $S_1$ can be regarded as representing the content in mol %, of the aromatic dicarboxylic acid having a metal sulfonate group with respect to the total acid constituent per unit thickness of the copolymer polyester layer.

$P_1$: If the contents, in % by weight, of the compound having a repeated structure of an alkyleneoxy group and/or the saturated aliphatic dicarboxylic acid with respect to the total weight of the reaction product in the respective layers constituting the copolymer polyester layer, which is overlaid on the one surface of the polyester layer and which is composed of n number of the layers, are respectively represented by $P_{11}$, $P_{12}$, $P_{13}$, . . . , $P_{1n-1}$, $P_{1n}$, the following formula obtains.

$$P1 = \sum_{i=1}^{n} (P1i \times d1i) / \sum_{i=1}^{n} (d1i)$$

Therefore, in accordance with this formula, $P_1$ can be regarded as representing the content, in % by weight, of the compound having a repeated structure of an alkyleneoxy group and/or the saturated aliphatic dicarboxylic acid with respect to the total weight of the reaction product per unit thickness of the copolymer polyester layer.

Also, $d_3$, $S_3$, and $P_3$ represent values in the copolymer polyester layer, which is overlaid on the other surface of the polyester layer and which is composed of m number of layers, the values respectively corresponding to $d_1$, $S_1$, and $P_1$. Specifically, $d_3$ is represented by the formula $$d_3 = \sum_{i=1}^{m} (d_{3i})$$

$S_3$ is represented by the formula $$S_3 = \sum_{i=1}^{m} (S_{3i} \times d_{3i}) / \sum_{i=1}^{m} (d_{3i})$$

$P_3$ is represented by the formula $$P_3 = \sum_{i=1}^{m} (P_{3i} \times d_{3i}) / \sum_{i=1}^{m} (d_{3i})$$

In this present invention, the support of the photographic material should more preferably simultaneously satisfy the condition formulas (1), (2), and (3) described above, and at least one of condition formulas (4), (5), and (6) shown below. Also, the support of the photographic material should most preferably simultaneously satisfy the condition formulas (1), (2), and (3) described above, and all of the condition formulas (4), (5), and (6) shown below:

condition formula (4); $d_2 \leq 40$ (mm)
condition formula (5); $1.5 \leq \{(d_1+d_3)/d_2\} \leq 2.5$
condition formula (6);
$\{(S_1 \times P_1 \times d_1)/(S_3 \times P_3 \times d_3)\} \geq 2$
wherein n, m, $d_1$, $S_1$, $P_1$, $d_3$, $S_3$, and $P_3$ are as defined above.

When the film in accordance with the present invention is used as the support of the photographic material, no limitation is imposed on the thickness of the film insofar as the mechanical strength required for support of the photographic materials can be obtained. The thickness of the film ordinarily falls within the range of 30 to 200 μm, should preferably fall within the range of 40 to 120 μm, and should more preferably fall within the range of 50 to 90 μm.

When necessary, the support of the photographic material utilizing the film in accordance with the present invention can be made thicker by increasing the number of the layers to four, five, and so on. Even if the thickness of the support of the photographic material is thin, the objects of the present invention can be accomplished.

As measured with evaluation methods, which will be described later, the film in accordance with the present invention has a degree of roll set curl of not higher than 135 $m^{-1}$, preferably not higher than 125 $m^{-1}$, after being subjected to heat treatment, and has a degree of recovery curl of not higher than 45 $m^{-1}$, preferably not higher than 25 $m^{-1}$, after being subjected to hot water bath treatment. Also, the film in accordance with the present invention preferably has a breaking strength in the longitudinal direction of 16 kg/mm² or higher, and more preferably has a breaking strength in the longitudinal direction of 20 to 30 kg/mm² Additionally, the film in accordance with the present invention preferably has a breaking strength in the transverse direction of 16 kg/mm² or higher, and more preferably has a breaking strength in the transverse direction of 20 to 30 kg/mm² .

When the respective characteristic values fall within the above-described ranges, a film can be obtained which has good roll set curl recovery properties after being subjected to the development process and which is free of coating defects, The term "longitudinal direction" as used herein means the direction along which the film is slit into a tape-like shape. Ordinarily, the longitudinal direction coincides with the direction of extrusion during the film forming process. The term "transverse direction" as used herein means the direction which intersects perpendicularly to the longitudinal direction.

The modulus of elasticity of the film serving as the support of the photographic material should preferably be 450 kg/mm² or higher, and should more preferably be 500 kg/mm² or higher. If the modulus of elasticity is lower than 450 kg/mm², the advantages of the formation of the support of the photographic material from the polyester will become poor, and the characteristics intrinsic to the polyester will be lost.

The roll set curl recovery rate of the support of the photographic material in accordance with the present invention is ordinarily 50% or more, preferably 80% or more. If it is lower than 50%, photographic film provided with the support of the photographic material will have bad handling properties after the development process.

Photographic film utilizing the film or the support of the photographic material in accordance with the present invention has the layer structure described below.

Specifically, photographic film constitutes a light-sensitive material by being provided with at least one halide emulsion layer at least on one side. In the cases of the support of the photographic material or the film in accordance with the present invention, which has curl in the width direction and have been subjected to the anticurl processing, at least one silver halide emulsion layer is overlaid on the convex surface of the support of the photographic material or the film. Also, at least one backing layer or silver halide emulsion layer may be overlaid on the opposite surface such that the effects of the present invention may not be lost. The silver halide emulsion layer may be coated on the support of the photographic material or the film directly or via a different layer, e.g. a hydrophilic colloid layer containing no silver halide emulsion. Also, a hydrophilic colloid layer serving as a protective layer may be overlaid on the silver halide emulsion layer. Additionally, a plurality of silver halide emulsion layers may be classified by the sensitivity and, for example, an emulsion layer having a high sensitivity and an emulsion having a low sensitivity may be coated independently. In such cases, an intermediate layer may be located between adjacent silver halide emulsion layers. Specifically, when necessary, an intermediate hydrophilic colloid layer may be located between adjacent silver halide emulsion layers. A non-light-sensitive hydrophilic colloid layer, such as an intermediate layer, a protective layer, an anti-halation layer, or a backing layer, may be located between the silver halide emulsion layer and the protective layer.

Any of silver halides may be used in the silver halide emulsion. They include silver chloride, silver chlorobromide, silver chloroiodobromide, pure silver bromide, and silver iodobromide.

The silver halide emulsion may contain sensitizing dyes, plasticizers, anti-static agents, surface active agents, hardening agents, and the like.

During the development process for the photographic film utilizing the support of the photographic material in accordance with the present invention, developing agents may be used which are described in, for example, "The Theory of The Photographic Process" by T. H. James, Fourth Edition, pp. 291-334; and "Journal of the American Chemical Society," Vol. 73, p. 3, 100, 1951.

EXAMPLES

The present invention will further be illustrated by the following non-limitative examples.

EXAMPLE 1

After 0.1 part by weight of a hydrate of calcium acetate serving as an ester exchange catalyst was added to 100 parts by weight of dimethyl terephthalate and 64 parts by weight of ethylene glycol, an ester exchange reaction was carried out by a conventional procedure. To the resulting product, the following were added: 28 parts by weight (5 mol %/total acid constituent) of an ethylene glycol solution (concentration: 35% by weight) of 5-sodiumsulfo-di($\beta$-hydroxyethyl)isophthalic acid (abbreviated to SIP), 11 parts by weight (8.5% by weight/polymer) of polyethylene glycol (abbreviated to PEG) (number-average molecular weight: 4,000), 0.05 part by weight of antimony trioxide, 0.13 part by weight of trimethyl phosphate, and Irganox 1010 (supplied by Ciba-Geigy Ltd.) serving as an antioxidant and added such that the proportion might be 1% by weight with respect to a product polymer. Thereafter, the temperature was raised gradually, the pressure was reduced, and polymerization was carried out at 280° C. and 0.5 mmHg. In this manner, a copolymer polyester having an intrinsic viscosity of 0.55 was obtained.

This copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 1, and were quenched and solidified on a cooling drum to form a laminated unoriented film. At this time, the extrusion rate of each material was adjusted such that the thickness of each layer might change as shown in Table 1. Thereafter, the film was subjected to longitudinal orientation (magnification: 3.4) at 85° C. and then to transverse orientation (magnification: 3.4) at 95° C. Heat setting was then carried out at 210° C., and a biaxially oriented film having a film thickness of 90 mm was thereby obtained.

This film had the physical properties shown in Table 1.

Preparation of light-sensitive material

A corona discharge process at 8 W/(m$^2$·min) was carried out on the two surfaces of the obtained film (sample No. 1), and an undercoating composition B-3 was coated on the convex surface of the film (i.e. on the outer thinner copolymer polyester layer) such that the dry film thickness might be 0.8 μm. An undercoat layer was thereby formed. Also, an undercoating composition B-4 was coated on the other surface of the support such that the dry film thickness might be 0.8 μm, and an undercoat layer B-4 was thereby formed.

Undercoating composition B-3

Copolymer latex liquid (solid content: 30%) containing 30% by weight of butyl acrylate, 20% by weight of t-butyl acrylate, 25% by weight of styrene, and 25% by weight of 2-hydroxyethyl

| acrylate | 270 g |
|---|---|
| Compound (UL-1) | 0.6 g |
| Hexamethylene-1,6-bis(ethyleneurea) | 0.8 g |
| Made up to 1,000 ml with water. | |

Undercoating composition B-4

Copolymer latex liquid (solid content: 30%) containing 40% by weight of butyl acrylate, 20% by weight of styrene, and 40% by

| weight of glycidyl acrylate | 270 g |
|---|---|
| Compound (UL-1) | 0.6 g |
| Hexamethylene-1,6-bis(ethyleneurea) | 0.8 g |
| Made up to 1,000 ml with water. | |

Corona discharge was carried out at 8 W/(m$^2$·min) on an undercoat layer B-3 and an undercoat layer B-4. A coating composition B-5 shown below was coated on the undercoat layer B-3 such that the dry film thickness might be 0.1 mm, and an undercoat layer B-5 was thereby formed thereon. Also, a coating composition B-6 shown below was coated on the undercoat layer B-4 such that the dry film thickness might be 0.8 μm, and an undercoat layer B-6 having an anti-static function was thereby formed thereon.

| <Coating composition B-5> | |
|---|---|
| Gelatin | 10 g |
| Compound (UL-1) | 0.2 g |
| Compound (UL-2) | 0.2 g |
| Compound (UL-3) | 0.1 g |
| Silica particles | 0.1 g |
| (average particle diameter: 3 μm) | |
| Made up to 1,000 ml with water. | |
| <Coating composition B-6> | |
| Water-soluble conductive polymer (UL-4) | 60 g |
| Latex liquid (solid content: 20%) | 80 g |
| containing the compound (UL-5) | |
| Ammonium sulfate | 0.5 g |
| Hardening agent (UL-6) | 12 g |
| Polyethylene glycol | 6 g |
| (weight-average molecular weight: 600) | |
| Made up to 1,000 ml with water. | |

Structures of the used compounds (UL-1 to 6) will be shown later.

Corona discharge was carried out at 25 W/(m$^2$·min) on the undercoat layer B-5. Also, corona discharge was carried out at 8 W/(m$^2$·min) on the undercoat layer B-6. Further, the emulsion layers, and the like, shown below were overlaid on the undercoat layer B-5, and the coating compositions for the backing layers were applied to the undercoat layer B-6. In this manner, a multi-layer light-sensitive color photographic material 1 was prepared. The values shown below under <backing layers> and <emulsion layers> indicate the amounts per m$^2$.

| <Backing layers> | |
|---|---|
| First layer; | |
| Gelatin | 4.5 g |
| Sodium-di-(-2-ethylhexyl)- | 1.0 g |
| sulfosuccinate | |
| Sodium tripolyphosphate | 76 mg |
| Citric acid | 16 mg |
| Carboxyalkyldextran sulfate | 49 mg |

| -continued | |
|---|---|
| Vinyl sulfone type hardening agent | 23 mg |
| Second layer: | |
| Gelatin | 1.5 g |
| Polymer beads (average particle diameter: 3 μm, polymethyl methacrylate) | 24 mg |
| Sodium-di-(-2-ethylhexyl)-sulfosuccinate | 15 mg |
| Carboxyalkyldextran sulfate | 12 mg |
| Vinyl sulfone type hardening agent | 30 mg |
| Fluorine-based surface active agent (SB-2 and SB-3, molar ratio 1:1) | 45 mg |
| Compound SB-1 | 230 mg |
| <Emulsion layers> | |
| First layer; anti-halation layer (HC) | |
| Black colloidal silver | 0.15 g |
| UV light absorber (UV-1) | 0.20 g |
| Compound (CC-1) | 0.02 g |
| High boiling point solvent (Oil-1) | 0.20 g |
| High boiling point solvent (Oil-2) | 0.20 g |
| Gelatin | 1.6 g |
| Second layer; intermediate layer (IL-1) | |
| Gelatin | 1.3 g |
| Third layer; low-sensitivity red-sensitive emulsion layer (R-L) | |
| Silver iodobromide emulsion (average grain size: 0.3 μm, average iodine content: 2.0 mole %) | 0.4 g |
| Silver iodobromide emulsion (average grain size: 0.4 μm, average iodine content: 8.0 mole %) | 0.3 g |
| Sensitizing dye (S-1) | $3.2 \times 10^{-4}$ (mole/mole of silver) |
| Sensitizing dye (S-2) | $3.2 \times 10^{-4}$ (mole/mole of silver) |
| Sensitizing dye (S-3) | $0.2 \times 10^{-4}$ (mole/mole of silver) |
| Cyan coupler (C-1) | 0.50 g |
| Cyan coupler (C-2) | 0.13 g |
| Colored cyan coupler (CC-1) | 0.07 g |
| DIR compound (D-1) | 0.006 g |
| DIR compound (D-2) | 0.01 g |
| High boiling point solvent (Oil-1) | 0.55 g |
| Gelatin | 1.0 g |
| Fourth layer: High sensitivity red-sensitive emulsion layer (RH) | |
| Silver iodobromide emulsion (average grain size: 0.7 μm, average iodine content: 7.5 mole %) | 0.9 g |
| Sensitizing dye (S-1) | $1.7 \times 10^{-4}$ (mole/mole of silver) |
| Sensitizing dye (S-2) | $1.6 \times 10^{-4}$ (mole/mole of silver) |
| Sensitizing dye (S-3) | $0.1 \times 10^{-4}$ (mole/mole of silver) |
| Cyan coupler (C-2) | 0.23 g |
| Colored cyan coupler (CC-1) | 0.03 g |
| DIR compound (D-2) | 0.02 g |
| High boiling point solvent (Oil-1) | 0.25 g |
| Gelatin | 1.0 g |
| Fifth layer: Intermediate layer (IL-2) | |
| Gelatin | 0.8 g |
| Sixth layer: Low sensitivity green-sensitive emulsion layer (GL) | |
| Silver iodobromide emulsion (average grain size: 0.4 μm, average iodine content: 8.0 mole %) | 0.6 g |
| Silver iodobromide emulsion (average grain size: 0.3 μm, average iodine content: 2.0 mole %) | 0.2 g |
| Sensitizing dye (S-4) | $6.7 \times 10^{-4}$ (mole/mole of silver) |
| Sensitizing dye (S-5) | $0.8 \times 10^{-4}$ (mole/mole of silver) |
| Magenta coupler (M-1) | 0.17 g |
| Magenta coupler (M-2) | 0.43 g |
| Colored magenta coupler (CM-1) | 0.10 g |
| DIR compound (D-3) | 0.02 g |
| High boiling point solvent (Oil-2) | 0.7 g |
| Gelatin | 1.0 g |
| Seventh layer: High sensitivity green-sensitive emulsion layer (GH) | |
| Silver iodobromide emulsion (average grain size: 0.7 μm, average iodine content: 7.5 mole %) | 0.9 g |
| Sensitizing dye (S-6) | $1.1 \times 10^{-4}$ (mole/mole of silver) |
| Sensitizing dye (S-7) | $2.0 \times 10^{-4}$ (mole/mole of silver) |
| Sensitizing dye (S-8) | $0.3 \times 10^{-4}$ (mole/mole of silver) |
| Magenta coupler (M-1) | 0.30 g |
| Magenta coupler (M-2) | 0.13 g |
| Colored magenta coupler (CM-1) | 0.04 g |
| DIR compound (D-3) | 0.004 g |
| High boiling point solvent (Oil-2) | 0.35 g |
| Gelatin | 1.0 g |
| Eighth layer: Yellow filter layer (YC) | |
| Yellow colloidal silver | 0.1 g |
| Additive (HS-1) | 0.07 g |
| Additive (HS-2) | 0.07 g |
| Additive (SC-1) | 0.12 g |
| High boiling point solvent (Oil-2) | 0.15 g |
| Gelatin | 1.0 g |
| Ninth layer: Low sensitivity blue-sensitive emulsion layer (BL) | |
| Silver iodobromide emulsion (average grain size: 0.3 μm, average iodine content: 2.0 mole %) | 0.25 g |
| Silver iodobromide emulsion (average grain size: 0.4 μm, average iodine content: 8.0 mole %) | 0.25 g |
| Sensitizing dye (S-9) | $5.8 \times 10^{-4}$ (mole/mole of silver) |
| Yellow coupler (Y-1) | 0.6 g |
| Yellow coupler (Y-2) | 0.32 g |
| DIR compound (D-1) | 0.003 g |
| DIR compound (D-2) | 0.006 g |
| High boiling point solvent (Oil-2) | 0.18 g |
| Gelatin | 1.3 g |
| Tenth layer: High sensitivity blue-sensitive emulsion layer (BH) | |
| Silver iodobromide emulsion (average grain size: 0.8 μm, average iodine content: 8.5 mole %) | 0.5 g |
| Sensitizing dye (S-10) | $3 \times 10^{-4}$ (mole/mole of silver) |
| Sensitizing dye (S-11) | $1.2 \times 10^{-4}$ (mole/mole of silver) |
| Yellow coupler (Y-1) | 0.18 g |
| Yellow coupler (Y-2) | 0.10 g |
| High boiling point solvent (Oil-2) | 0.05 g |
| Gelatin | 2.0 g |
| Eleventh layer: First protective layer (PRO-1) | |
| Silver iodobromide emulsion (average grain size: 0.08 μm) | 0.3 g |
| UV absorber (UV-1) | 0.07 g |
| UV absorber (UV-2) | 0.10 g |
| Additive (HS-1) | 0.2 g |
| Additive (HS-2) | 0.1 g |
| High boiling point solvent (Oil-1) | 0.07 g |
| High boiling point solvent (Oil-3) | 0.07 g |
| Gelatin | 0.8 g |
| Twelfth layer: Second protective layer (PRO-2) | |
| Compound (Compound A) | 0.04 g |
| Compound (Compound B) | 0.004 g |
| Polymethyl methacrylate (average grain size: 3 μm) | 0.02 g |
| Copolymer of methyl methacrylate:ethyl methacrylate:methacrylic acid = 3:3:4 (weight ratio)(average grain size: 3 μm) | 0.13 g |
| Gelatin | 0.7 g |

The silver iodobromide emulsion used in the tenth layer was prepared by the following method.

Preparation of silver iodobromide emulsion

By using a monodispersed silver iodobromide grain having an average grain size of 0.33 μm (silver iodide content: 2 mole %) as a seed crystal, the silver iodobromide emulsion was prepared according to a double jet method.

While Solution <G-1> shown below was maintained at a temperature of 70° C., pAg 7.8 and pH 7.0 and stirred well, a seed emulsion in an amount corresponding to 0.34 mole was added thereto.

Formation of inner portion-high iodine content phase "core phase"

Thereafter, Solution <H-1> having the following composition and Solution <S-1> having the following composition were added while maintaining a flow ratio of 1:1 over 86 minutes at an accelerated flow rate (flow rate at completion of addition was 3.6-fold of initial flow rate).

Formation of outer portion-low iodine content phase "shell phase"

Subsequently, <H-2> and <S-2> were added while maintaining pAg 10.1 and pH 6.0 over 65 minutes at a flow ratio of 1:1 and an accelerated flow rate (flow rate at completion of addition was 5.2-fold of initial flow rate).

During formation of grains, pAg and pH were controlled by using a potassium bromide aqueous solution and a 56% acetic acid aqueous solution. After formation of grains, the grains were washed with water according to a conventional flocculation method and then dispersed again by adding gelatin, and pH and pAg were controlled to 5.8 and 8.06, respectively, at 40° C.

The resulting emulsion was a monodispersed emulsion containing octahedral silver iodobromide grains having an average grain size of 0.80 μm, a distribution width of 12.4% and a silver iodide content of 8.5 mole %.

| <G-1> | |
|---|---|
| Ossein gelatin | 100.0 g |
| 10% by weight methanol solution of Compound-I shown below | 25.0 ml |
| 28% Aqueous ammonia | 440.0 ml |
| 56% Acetic acid aqueous solution | 660.0 ml |
| made up to 5,000.0 ml with water. | |
| <H-1> | |
| Ossein gelatin | 82.4 g |
| Potassium bromide | 151.6 g |
| Potassium iodide | 90.6 g |
| made up to 1,030.5 ml with water. | |
| <S-1> | |
| Silver nitrate | 309.2 g |
| 28% Aqueous ammonia | Equivalent amount |
| made up to 1,030.5 ml with water. | |
| <H-2> | |
| Ossein gelatin | 302.1 g |
| Potassium bromide | 770.0 g |
| Potassium iodide | 33.2 g |
| made up to 3,776.8 ml with water. | |
| <S-2> | |
| Silver nitrate | 1,133.0 g |
| 28% Aqueous ammonia | Equivalent amount |
| made up to 3,776.8 ml with water. | |

*Compound I: polypropyleneoxy.polyethyleneoxy.sodium disuccinate

In the same manner except for changing an average grain size of a seed grain, temperature, pAg, pH, flow amount, addition time and halide composition, the above respective silver iodobromide emulsions having different average grain sizes and silver iodide contents to be used in the emulsion layers other than the tenth layer were prepared.

All emulsions were core/shell type monodispersed emulsions having a distribution width of 20% or less. The respective emulsions were subjected to optimum chemical ripening in the presence of sodium thiosulfate, chloroauric acid and ammonium thiocyanate, and a sensitizing dye, 4-hydroxy-6-methyl-1,3,3a,7-tetrazaindene and 1-phenyl-5-mercaptotetrazole were added.

Further, in the above light-sensitive material, Compounds Su-1 and Su-2, a viscosity controller, Hardeners H-1 and H-2, Stabilizer ST-1, Antifoggants AF-1 and AF-2 (having weight average molecular weights of 10,000 and 1,100,000), Dyes AI-1 and AI-2 and Compound DI-1 (9.4 mg/m$^2$) were further contained.

Structures of the respective compounds used for forming the light-sensitive silver halide photographic material according to the present invention are shown below.

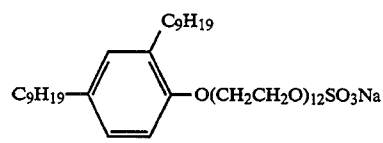

UL-1

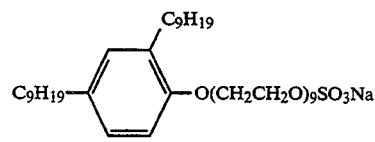

UL-2

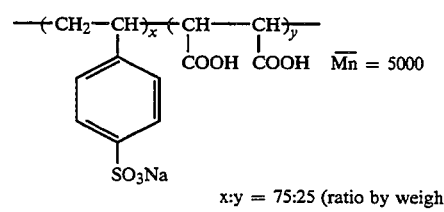

UL-4 x:y = 75:25 (ratio by weight)

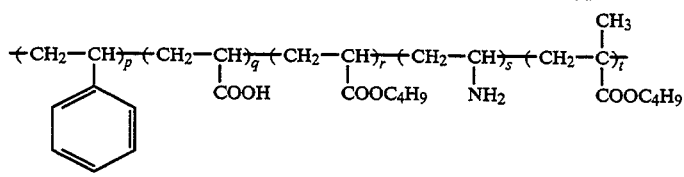
UL-5
p:q:r:s:t = 40:5:10:5:40 (ratio by weight)
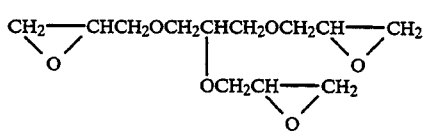
UL-6
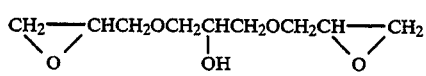
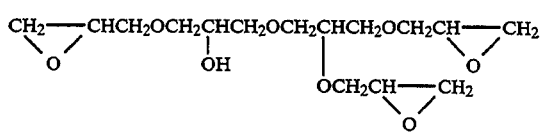
three kinds of mixtures
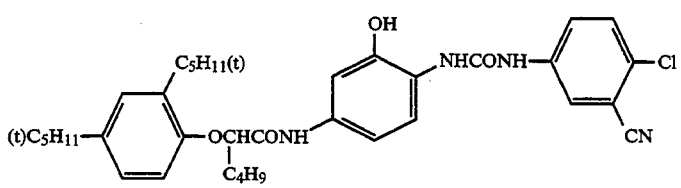
C-1
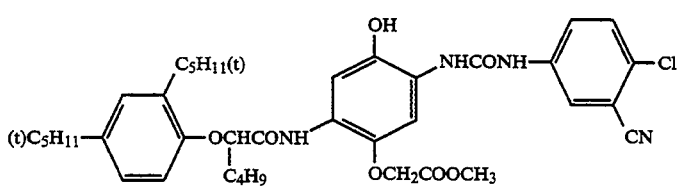
C-2
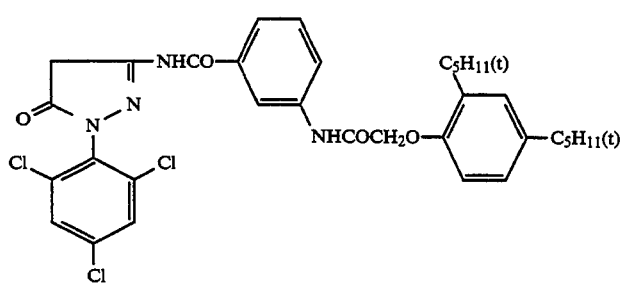
M-1
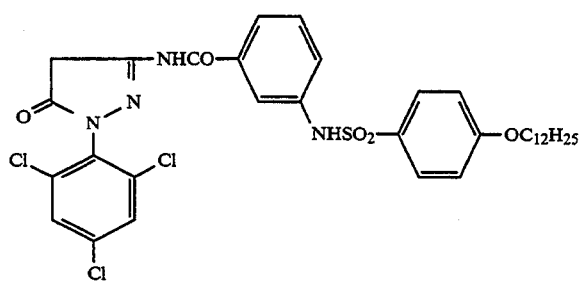
M-2

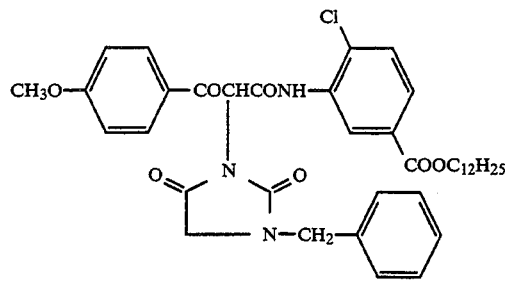
Y-1
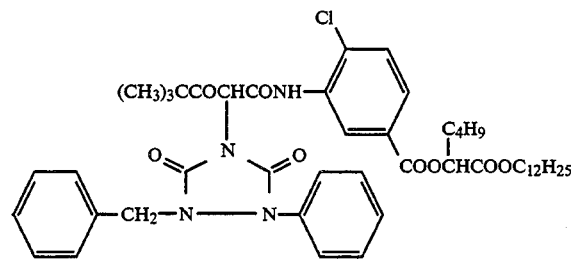
Y-2
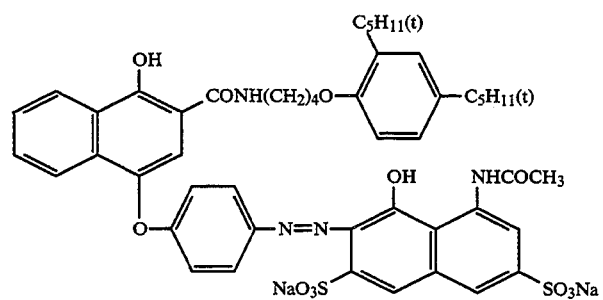
CC-1
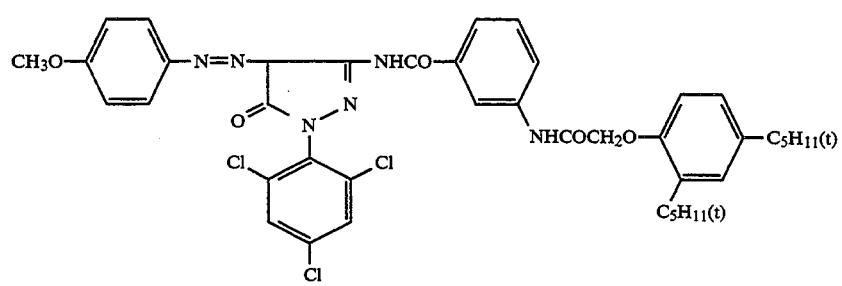
CM-1
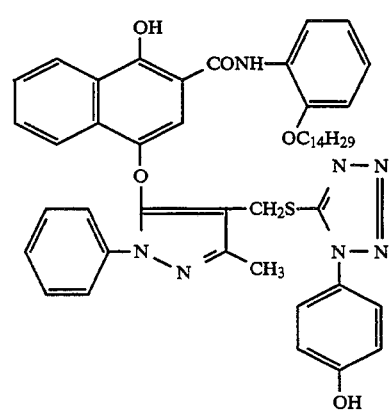
D-1

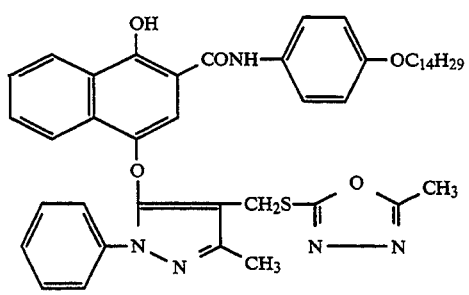
D-2
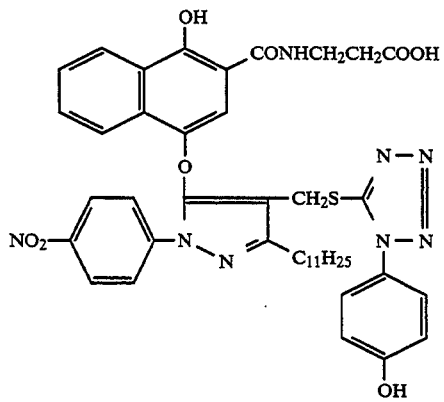
D-3
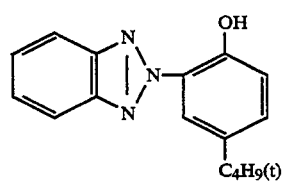
UV-1
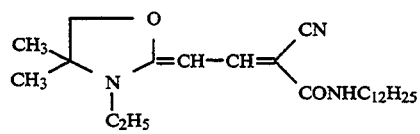
UV-2
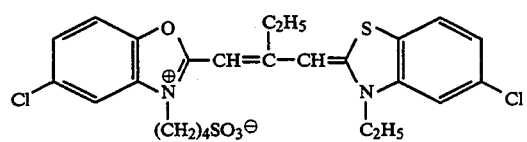
S-1
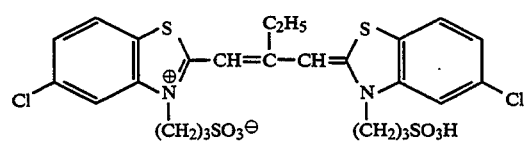
S-2
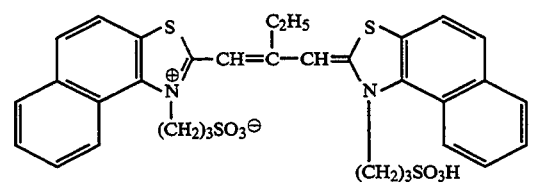
S-3
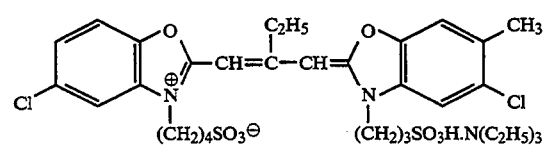
S-4

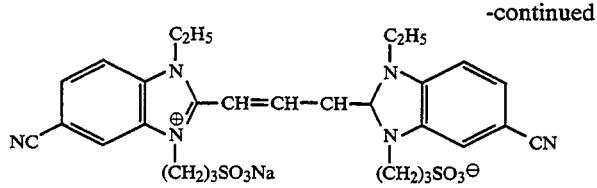
S-5
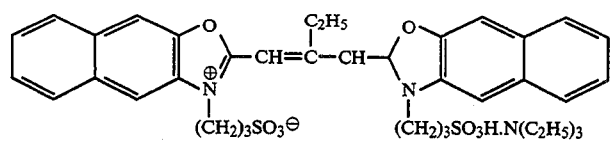
S-6
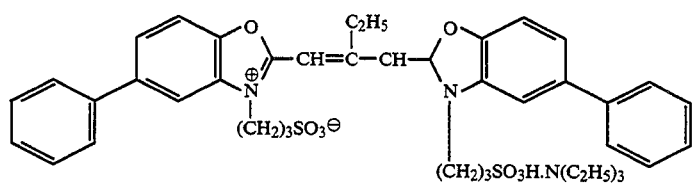
S-7
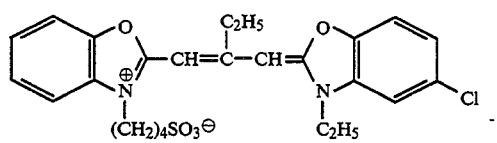
S-8
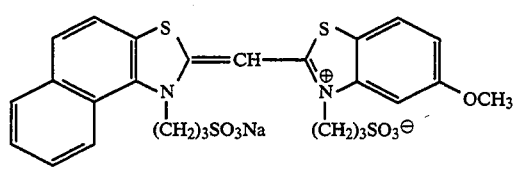
(S-9)
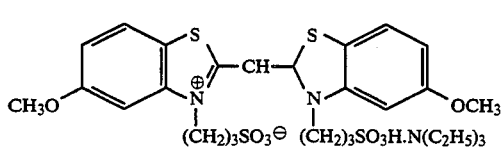
(S-10)
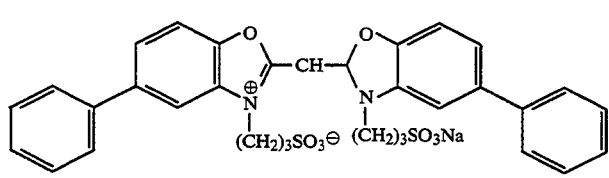
(S-11)
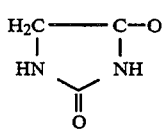
HS-1
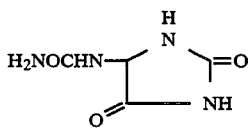
HS-2
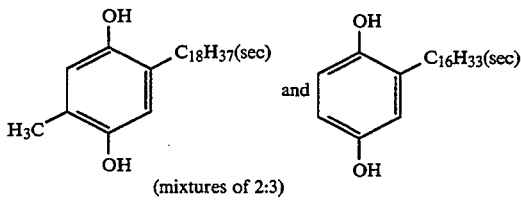
SC-1

-continued
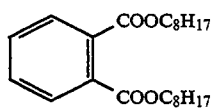 Oil-1
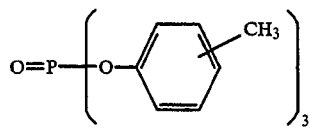 Oil-2
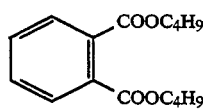 Oil-3
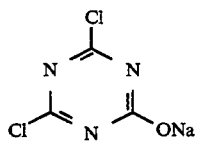 H-1
$(CH_2=CHSO_2CH_2)_2O$    H-2
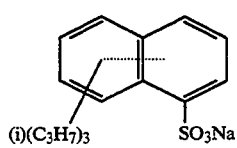 Su-1
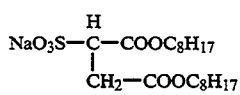 Su-2
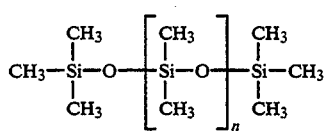
(weight average molecular weight = 30,000)    Compound A
$NaO_3S-CH-COOCH_2(CF_2CF_2)_3H$
$\quad\quad\;\; |$
$\quad\quad\;\; CH_2-COOCH_2(CF_2CF_2)_3H$    Compound B
(mixtures of the following three components)    DI-1
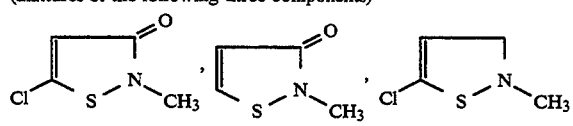
(component A)   (component B)   (component C)
component A:component B:component C = 50:46:4
(molar ratio)
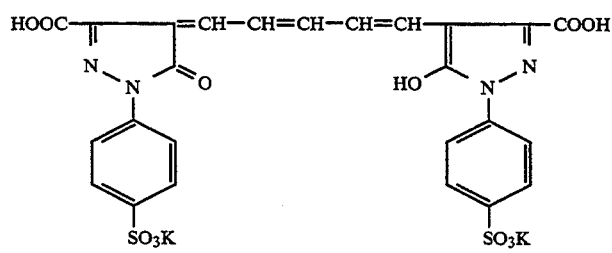 AI-1

-continued

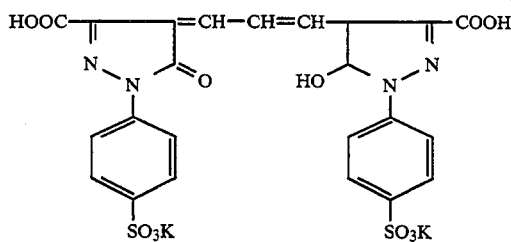

AI-2

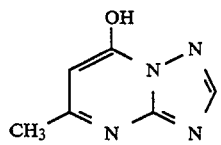

ST-1

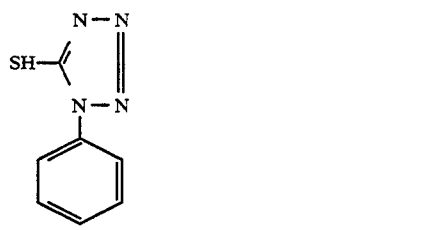

AF-1

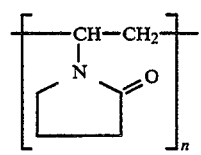

AF-2

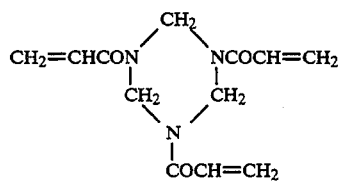

UL-3

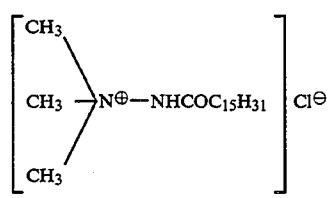

SB-1

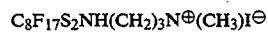

SB-2

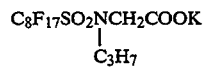

SB-3

Evaluation methods

For the prepared silver halide light-sensitive photographic material, the items described below were evaluated. The results shown in Table 1 were obtained. Sample No. 1 corresponds to Example 1.

Twenty sheets of the light-sensitive material, each having a width of 35 mm and a length of 120 cm, were used. Each sheet of the light-sensitive material was wound around a core tube having a diameter of 10.8 mm such that the emulsion surface might stand facing the core tube. The light-sensitive material was then subjected to heat treatment under the conditions of 55° C. and 20% RH for 4 hours. Thereafter, the sheets of the light-sensitive material were released from the core tubes, spliced by using a commercially available film splicer processing machine (PS-35-2 supplied by Noritsu Koki K.K.), and then subjected to an ordinary-development process using an automatic film development processing machine (NCV60 supplied by Noritsu Koki K.K.).

Suitability for splicer

Evaluation was made with two grades described below.

Practically, film clogging and folding in the automatic developing machine must not occur, and the "o" grade is required.

O: Clogging and folding did not occur.
X: Clogging and folding occurred.

Suitability for conveyance in development processing machine

Evaluation was made with two grades described below.

Practically, the "Δ" grade is acceptable, and the "o" grade should preferably be obtained.

O: No folding occurred.

Δ: Folding partially occurred at joints between sheets of film.

X: Folding occurred over the entire film surface.

Sheets of film showing film clogging and folding in the splicer processing machine were inappropriate as photographic film and could not constitute adequate evaluation samples. Therefore, for such sheets of film, no evaluation was made.

Roll set curl eliminating properties

Evaluation was made on five sheets of film selected at random from the twenty sheets of film. After each sheet of film was subjected to the development process, a tail end of the film, which end was located on the outermost side of the film roll when the film was wound around the core tube, was gripped, and the film was suspended from the gripped end. The film was then subjected to moisture conditioning for one day. While the film was being suspended naturally, the length of a 12 cm portion of the film from its leading end, which end was located on the innermost side of the film roll when the film was wound around the core tube, was measured. The ratio of the thus measured length to the original length was calculated. Evaluation was made with the three grades described below from the average value of the ratios calculated for the five sheets of the film. The "o" grade and the higher grade are preferable for the performance of photographic film.

⊚: 70% or more.

O: 50 to 70%.

X: Less than 50%.

Sheets of film showing film clogging and folding in the splicer processing machine and folding in the development processing machine over the entire film surface were inappropriate as photographic film and could not constitute adequate evaluation samples. Therefore, for such sheets of film, no evaluation was made.

EXAMPLES 2 AND 3

Biaxially oriented films having the film thicknesses shown in Table 1 were obtained in the same manner as that in Example 1, except that the take-off speed of the cooling drum was changed and the film thickness of the laminated unoriented film was changed. Light-sensitive materials were prepared by coating the emulsion layers and the backing layers in the same manner as that in Example 1. Evaluation was made in the same manner as that in Example 1, and the results shown in Table 1 were obtained. Sample Nos. 2 and 3 respectively correspond to Examples 2 and 3.

COMPARATIVE EXAMPLE 1

The emulsion layers and the backing layers were coated and a light-sensitive material was prepared in the same manner as that in Example 1 by using triacetyl cellulose (TAC) (film thickness: 90 μm). Evaluation was made in the same manner as that in Example 1, and the results shown in Table 1 were obtained. Sample No. 4 corresponds to Comparative Example 1.

From the obtained results, it can be found that, when the film thickness of TAC is 100 μm or less, the strength becomes low, folding occurs in the development processing machine, and therefore the film cannot be put to practical use. On the other hand, it can be found that the support having the degree of roll set curl after being subjected to heat treatment and the degree of recovery curl after being subjected to hot water bath treatment, which degrees fall within the ranges specified in the present invention, has good suitability for the processing apparatuses prior to and during the development process, good roll set curl eliminating properties, and good handling properties. Also, the light-sensitive material obtained by using the support in accordance with the present invention had no particular problems and was suitable for photographic purposes.

COMPARATIVE EXAMPLE 2

The copolymer polyester obtained in Example 1 was dried in a vacuum at 150° C. and then subjected to melt extrusion into a film-like shape at 280° C. from a T-die by using a single extruder. The film was quenched on a cooling drum, and an unoriented film was thereby obtained. The unoriented film was pre-heated at 80° C., and subjected to longitudinal orientation (magnification: 3.4), to transverse orientation (magnification: 3.4) at 80° C., and then to heat setting at 210° C. In this manner, a biaxially oriented film having a film thickness of 80 μm was obtained.

A light-sensitive material was prepared by coating the emulsion layers and the backing layers in the same manner as that in Example 1. Evaluation was made in the same manner as that in Example 1, and the results shown in Table 1 were obtained. In Table 1, sample No. 5 corresponds to Comparative Example 2. It can be found that the light-sensitive material having a degree of roll set curl after being subjected to heat treatment and a degree of recovery curl after being subjected to hot water bath treatment, which degrees do not fall within the ranges specified in the present invention, folds and causes clogging in the splicer processing machine prior to the development process. Thus it has bad suitability for the processing apparatuses and cannot be used for photographic purposes.

COMPARATIVE EXAMPLE 3

A commercially available polyethylene terephthalate (intrinsic viscosity: 0.65) was dried in a vacuum at 150° C. and then subjected to melt extrusion into a film-like shape at 285° C. from a T-die by using a single extruder. The film was quenched on a cooling drum, and an unoriented film was thereby obtained. The unoriented film was pre-heated at 95° C., and subjected to longitudinal orientation (magnification: 3.3), to transverse orientation (magnification: 3.3) at 95° C., and then to heat setting at 220° C. In this manner, a biaxially oriented film having a film thickness of 80 μm was obtained.

A light-sensitive material was prepared by coating the emulsion layers and the backing layers in the same manner as that in Example 1. Evaluation was made in the same manner as that in Example 1, and the results shown in Table 1 were obtained. Sample No. 6 corresponds to Comparative Example 3.

It can be found that the light-sensitive material having a degree of recovery curl after being subjected to hot water bath treatment, which degree does not fall within the range specified in the present invention, has bad roll set curl eliminating properties after being subjected to the development process and cannot be used for photographic purposes, though it has acceptable levels of suitability for the splicer processing machine prior to the development process and suitability for conveyance in the development processing machine.

EXAMPLES 4 TO 7, COMPARATIVE EXAMPLES 4

Biaxially oriented films having a film thickness of 80 μm were obtained in the same manner as that in Example 1, except that the copolymer polyester obtained in Example 1 and a commercially available polyethylene terephthalate (intrinsic viscosity: 0.65) were respectively dried in a vacuum at 150° C. and then worked such that each of three layers might be constituted of the material shown in Table 1. Light-sensitive materials were prepared by coating the emulsion layers and the backing layers in the same manner as that in Example 1. Evaluation was made in the same manner as that in Example 1, and the results shown in Table 1 were obtained. Sample Nos. 7 through 10 correspond to Examples 4 through 7, and sample No. 11 corresponds to Comparative Example 4.

Comparison with Examples 1 and 2 reveals that the support in accordance with the present invention having a degree of curl in the width direction falling within the range of 5 to 30 $m^{-1}$ exhibits a low degree of roll set curl after being subjected to heat treatment, good suitability for conveyance in the development processing machine, and good roll set curl eliminating properties, and therefore is particularly preferable. It is also found than the ratio of the thickness $d_A$ of a thicker outer layer to the thickness $d_B$ of a thinner outer layer should preferably fall within the range of $1.1 \leq d_A/d_B \leq 5$, and should more preferably fall within the range of $1.3 \leq d_A/d_B \leq 3$.

EXAMPLES 8 AND 9

Biaxially oriented films having a film thickness of 80 μm were obtained in the same manner as that in Example 1, except that a copolymer polyester having the same composition as that in Example 1 and a commercially available polyethylene terephthalate (intrinsic viscosity: 0.65) were respectively dried in a vacuum at 150° C. and then worked with two extruders such that each of two layers might be constituted of the material shown in Table 1. Light-sensitive materials were prepared by coating the emulsion layers and the backing layers in the same manner as that in Example 1. Evaluation was made in the same manner as that in Example 1, and the results shown in Table 1 were obtained.

It can be found that the support having the degree of roll set curl after being subjected to heat treatment and the degree of recovery curl after being subjected to hot water bath treatment, which degrees fall within the ranges specified in the present invention, has good suitability for the processing apparatuses prior to and during the development process, good roll set curl eliminating properties, and good handling properties. Also, the light-sensitive material obtained by using the support in accordance with the present invention had no particular problems and was suitable for photographic purposes. Sample No. 12 corresponds to Example 8, and sample No. 13 corresponds to Example 9.

EXAMPLE 10

After 0.1 part by weight of a hydrate of calcium acetate serving as an ester exchange catalyst was added to 100 parts by weight of dimethyl terephthalate, 71 parts by weight of ethylene glycol and 9.3 parts by weight (7% by weight/polymer) of dimethyladipic acid (abbreviated to DMA), an ester exchange reaction was carried out by a conventional procedure. To the resulting product, the following were added: 22 parts by weight (4 mol total acid constituent) of an ethylene glycol solution (concentration: 35% by weight) of 5-sodiumsulfo-di(α-hydroxyethyl)isophthalic acid (abbreviated to SIP), 0.05 part by weight of antimony trioxide, and 0.13 part by weight of trimethyl phosphate. Thereafter, the temperature was raised gradually, the pressure was reduced, and polymerization was carried out at 275° C. and 0.5 mmHg. In this manner, a copolymer polyester having an intrinsic viscosity of 0.55 was obtained.

A biaxially oriented film having a film thickness of 80 μm was obtained in the same manner as that in Example 1, except that the thus obtained copolymer polyester and a commercially available polyethylene terephthalate (intrinsic viscosity: 0.65) were used and worked with three extruders. A light-sensitive material was prepared by coating the emulsion layers and the backing layers in the same manner as that in Example 1. Evaluation was made in the same manner as that in Example 1, and the results shown in Table 1 were obtained. Sample No. 14 corresponds to Example 10.

It can be found that the support having the degree of roll set curl after being subjected to heat treatment and the degree of recovery curl after being subjected to hot water bath treatment, which degrees fall within the ranges specified in the present invention, has good suitability for the processing apparatuses prior to and during the development process, good roll set curl eliminating properties, and good handling properties.

Example 11 that follows Example 10 was not carried out and omitted in this specification.

EXAMPLE 12

A mixture solution of an unreacted materials was prepared by adding the following: 100 parts by weight of dimethyl terephthalate, 64 parts by weight of ethylene glycol, 28 parts by weight (5 mol %/total acid constituent) of an ethylene glycol solution (concentration: 35% by weight) of 5-sodiumsulfo-di(α-hydroxyethyl) isophthalic acid (abbreviated to SIP), 11 parts by weight (8.5% by weight/polymer) of polyethylene glycol (abbreviated to PEG) (number-average molecular weight: 600), 0.06 part by weight of sodium acetate, 0.13 part by weight of trimethyl phosphate, and Irganox 1010 (supplied by Ciba-Geigy Ltd.) serving as an antioxidant and added such that the proportion might be 1% by weight with respect to a product polymer. Thereafter, 0.1 part by weight of a hydrate of calcium acetate and 0.05 part by weight of antimony trioxide serving as catalysts were added with stirring. Thereafter, the resulting mixture was heated at 170° C. and methanol was removed by distillation under a nitrogen atmosphere. The temperature was then raised gradually, the pressure was reduced, and polymerization was carried out at 280° C. and 0.5 mmHg. In this manner, a copolymer polyester was obtained.

A film was prepared in the same manner as that in Example 1, except that the thus obtained copolymer polyester and a commercially available polyethylene terephthalate (intrinsic viscosity: 0.65) were used and worked with three extruders such that the film might be constituted of the same materials as that in Example 1. In this manner, a support of the photographic material having a film thickness of 80 μm was obtained. A light-sensitive material was prepared by coating the emulsion layers and the backing layers in the same manner as that in Example 1. Evaluation was made in the same manner as that in Example 1, and the results shown in Table 1 were obtained. Sample No. 16 corresponds to Example 12.

It can be found that the thus obtained support has good suitability for the processing apparatuses prior to and during the development process and good roll set curl eliminating properties. Also, from the results obtained in Examples 1 and 12, it can be said that the effects of the present invention can be obtained regardless of the number-average molecular weight of the polyalkylene glycol, which is contained as the copolymerization constituent in the polyester film. As for the method of polymerization of the copolymer polyester, the copolymerization constituents may be added after the ester exchange has been carried out. Alternatively, the polymerization may be carried out on the mixture of all of the polymerization constituents prior to the ester exchange. Thus it can be found that the effects of the present invention can be obtained regardless of how the polymerization is carried out.

EXAMPLES 13 AND 14

Supports having a film thickness of 80 μm were prepared in the same manner as that in Example 1, except that a copolymer polyester of the same type as that in Example 1 and a commercially available polyethylene terephthalate (intrinsic viscosity: 0.65) were used and worked with three extruders such that the supports might be constituted of the materials shown in Table 1. Light-sensitive materials were then prepared by coating the emulsion layers and the backing layers in the same manner as that in Example 1. Evaluation was made in the same manner as that in Example 1, and the results shown in Table 1 were obtained. Sample No. 17 corresponds to Example 13, and sample No. 18 corresponds to Example 14.

EXAMPLES 15 TO 19

Polymers having an intrinsic viscosity of 0.55 and containing copolymerization constituents in the proportions shown in Table 2 were prepared in the same manner as that in Example 1, except that the amounts of SIP and PEG added were changed as shown in Table 2. Supports were then prepared in the same manner as that in Example 1, except that the thus obtained copolymer polyester and a commercially available polyethylene terephthalate (intrinsic viscosity: 0.65) were used and worked with three extruders such that the supports might be constituted of the same materials as those in Example 1. Light-sensitive materials were then prepared by coating the emulsion layers and the backing layers in the same manner as that in Example 1. Evaluation was made in the same manner as that in Example 1, and the results shown in Table 2 were obtained. Sample Nos. 19 to 23 correspond to Examples 15 through 19.

EXAMPLES 20 TO 22

Polymers having an intrinsic viscosity of 0.55 and containing copolymerization constituents in the proportions shown in Table 2 were prepared in the same manner as that in Example 10, except that the amounts of SIP and DMA added were changed to composition ratios shown in Table 2. Supports were then prepared in the same manner as that in Example 1 such that the supports might be constituted of the same materials as those in Example 1. Light-sensitive materials were then prepared by coating the emulsion layers and the backing layers in the same manner as that in Example 1. Evaluation was made in the same manner as that in Example 1, and the results shown in Table 2 were obtained. Sample Nos. 24, 25, and 26 correspond to Examples 20, 21, and 22.

It can be found that the support having the degree of roll see curl after being subjected to heat treatment and the degree of recovery curl after being subjected to hot water bath treatment, which degrees fall within the ranges specified in the present invention, has good suitability for the processing apparatuses prior to and during the development process, good roll set curl eliminating properties, and good handling properties.

Also, when these results and the results obtained in Examples described above are investigated together, it can be found that, as the copolymerization constituents in the polyester film of the present invention, the aromatic dicarboxylic acid having a metal sulfonate group should preferably be contained in a proportion falling within the range of 2 to 10 mol % with respect to the total acid constituent in the entire polyester constituting the film in accordance with the present invention, and should more preferably be contained in a proportion falling within the range of 2 to 7 mol % with respect to the total acid constituent, and the polyalkylene glycol and/or the saturated aliphatic dicarboxylic acid should preferably be contained in a proportion falling within the range of 3 to 10% by weight

EXAMPLES 23 TO 25

In the respective Examples, two kinds of polymers having an intrinsic viscosity of 0.55 and containing copolymerization constituents in the proportions shown in Table 3 were prepared in the same manner as that in Example 1, except that the amounts of SIP and PEG added were changed. Supports having a film thickness of 80 μm were then prepared in the same manner as that in Example 1, except that the thus obtained copolymer polyesters and a commercially available polyethylene terephthalate (intrinsic viscosity: 0.65) were used and worked with three extruders such that the supports might be constituted of the materials shown in Table 3. Light-sensitive materials were then prepared by coating the emulsion layers and the backing layers in the same manner as that in Example 1. Evaluation was made in the same manner as that in Example 1, and the results shown in Table 3 were obtained. Sample Nos. 27 to 29 respectively correspond to Examples 23, 24, and 25.

EXAMPLES 26 AND 27

In the respective Examples, two kinds of polymers having an intrinsic viscosity of 0.55 and containing copolymerization constituents in the proportions shown in Table 3 were prepared in the same manner as that in Example 1, except that the amounts of SIP and PEG added were changed. Supports having a film thickness of 80 μm were then prepared in the same manner as that for sample Nos. 12 and 13, except that the thus obtained copolymer polyester and a commercially available polyethylene terephthalate (intrinsic viscosity: 0.65) were used and worked with two extruders such that the supports might be constituted of the materials shown in Table 3. Light-sensitive materials were then prepared by coating the emulsion layers and the backing layers in the same manner as that in Example 1. Evaluation was made in the same manner as that in Example 1, and the results shown in Table 3 were obtained. Sample Nos. 30 and 31 respectively correspond to Examples 26 and 27.

It can be found that the support having the degree of roll set curl after being subjected to heat treatment and the degree of recovery curl after being subjected to hot water bath treatment, which degrees fall within the ranges specified in the present invention, has good suitability for the processing apparatuses prior to and during the development process, good roll set curl eliminating properties, and good handling properties. Also, in cases where the film in accordance with the present invention is a laminated film, the effects of the present invention can be obtained even if the composition varies besides the layer configuration, the film thickness, and the kind of the polyester.

EXAMPLES 28 TO 35, COMPARATIVE EXAMPLE 5

In the respective Examples, two kinds of polymers having the intrinsic viscosities shown in Table 4 were prepared in the same manner as that in Example 1, except that the torque at the end of the polymerization was varied and the intrinsic viscosity was changed, while amounts of SIP and PEG added were kept unchanged. Supports having a film thickness of 80 $\mu$m were then prepared in the same manner as that in Example 1, except that the thus obtained copolymer polyesters and a commercially available polyethylene terephthalate (intrinsic viscosity: 0.65) were used and worked with three extruders such that the supports might be constituted of the materials shown in Table 4. Light-sensitive materials were then prepared by coating the emulsion layers and the backing layers in the same manner as that in Example 1. Evaluation was made in the same manner as that in Example 1, and the results shown in Table 4 were obtained.

As for sample No. 37, the copolymer polyester, which was obtained in Example 1 and which had an intrinsic viscosity of 0.55, was used to constitute the middle copolymer polyester layer. Sample Nos. 32 to 36, 38 to 40 respectively correspond to Examples 28 through 32. Sample No. 37 corresponds to Comparative Example 5.

It can be found that the support having the degree of roll set curl after being subjected to heat treatment and the degree of recovery curl after being subjected to hot water bath treatment, which degrees fall within the ranges specified in the present invention, has good suitability for the processing apparatuses prior to and during the development process, good roll set curl eliminating properties, and good handling properties. It can also be found that the difference $\Delta IV$ in the intrinsic viscosity should preferably fall within the range of 0.02 to 0.5, should more preferably fall within the range of 0.05 to 0.4, and should most preferably fall within the range of 0.1 to 0.3.

Also, in cases where the film in accordance with the present invention is a laminated film, the effects of the present invention can be obtained even if the intrinsic viscosity varies besides the layer configuration, the film thickness, the kind of the polyester, and the composition.

EXAMPLES 36 TO 37

After 0.1 part by weight of a hydrate of calcium acetate serving as an ester exchange catalyst was added to 100 parts by weight of a 2,6-naphthalenedicarboxylic acid dimethyl ester and 56 parts by weight of ethylene glycol, an ester exchange reaction was carried out by a conventional procedure. To the resulting product, the following were added: 22 parts by weight (5 mol total acid constituent) of an ethylene glycol solution (concentration: 35% by weight) of 5-sodiumsulfo-di($\alpha$-hydroxyethyl)isophthalic acid (abbreviated to SIP), 10 parts by weight (10% by weight/polymer) of polyethylene glycol (abbreviated to PEG) (number-average molecular weight: 3,000), 0.04 part by weight of antimony trioxide, and 0.1 part by weight of trimethyl phosphate. Thereafter, the temperature was raised gradually, the pressure was reduced, and polymerization was carried out at 285° C. and 0.5 mmHg. In this manner, a copolymer polyester having an intrinsic viscosity of 0.50 was obtained.

The copolymer polyethylene naphthalate, which had been prepared in the manner described above and which was represented as sample No. 39 or 40 was dried in a vacuum at 150° C. and subjected to melt extrusion into a film-like shape from a T-die at 290° C. by using a single extruder. The material was then quenched on a cooling drum to form an unoriented film. Thereafter, the film was pre-heated at 120° C. and subjected to longitudinal orientation (magnification: 3.2) and then to transverse orientation (magnification: 3.2) at 125° C. Heat setting was then carried out at 220° C., and a single-layered biaxially oriented film having a film thickness of 80 $\mu$m was thereby obtained. A light-sensitive material was then prepared by coating the emulsion layers and the backing layers in the same manner as that in Example 1. Evaluation was made in the same manner as that in Example 1, and the results shown in Table 5 were obtained. Sample Nos. 41 and 42 correspond respectively to Examples 36 and 37.

COMPARATIVE EXAMPLE 6

After 0.1 part by weight of a hydrate of calcium acetate serving as an ester exchange catalyst was added to 100 parts by weight of a 2,6-naphthalenedicarboxylic acid dimethyl ester and 56 parts by weight of ethylene glycol, an ester exchange reaction was carried out by a conventional procedure. To the resulting product, the following were added: 0.04 part by weight of antimony trioxide, and 0.1 part by weight of trimethyl phosphate. Thereafter, the temperature was raised gradually, the pressure was reduced, and polymerization was carried out at 285° C. and 0.5 mmHg. In this manner, polyethylene-2,6-naphthalate having an intrinsic viscosity of 0.55 was obtained.

The polyethylene-2,6-naphthalate polymer was dried in a vacuum at 150° C. and subjected to melt extrusion into a film-like shade from a T-die at 300° C. by using a single extruder. The material was then quenched on a cooling drum to form an unoriented film. Thereafter, the film was pre-heated at 130° C. and subjected to longitudinal orientation (magnification: 3.1) and then to transverse orientation (magnification: 3.4) at 135° C. Heat setting was then carried out at 245° C., and a single-layered biaxially oriented film having a film thickness of 80 $\mu$m was thereby obtained. A light-sensitive material was then prepared by coating the emulsion layers and the backing layers in the same manner as that in Example 1. Evaluation was made in the same manner as that in Example 1, and the results shown in Table 5 were obtained. Sample No. 41 corresponds to Comparative Example 8.

It can be found that, even if the support is composed of a single layer and has no curl in the width direction, the support having the degree of roll set curl after being subjected to heat treatment and the degree of recovery curl after being subjected to hot water bath treatment, which degrees fall within the ranges specified in the present invention, has good suitability for the processing apparatuses prior to and during the development process, and good roll set curl eliminating properties, and is acceptable for practical use.

Also, when the results obtained in the Examples described above are considered together, it can be found that the polyester film in accordance with the present invention should preferably contain, as the copolymerization constituent, the aromatic dicarboxylic acid having a metal sulfonate group, should more preferably contain, as the copolymerization constituent, the polyalkylene glycol and/or the saturated aliphatic dicarboxylic acid.

EXAMPLES 38 AND 39, COMPARATIVE EXAMPLE 7

Penetration treatment using a phenol/acetone mixture solvent (ratio 1:1) was carried out on one surface of each of the single-layered support film, which had been Example 36 (sample No. 41) by using a wire bar. The take-up amount was approximately 20 μm in terms of the film thickness. Thereafter, heat treatment was carried out at 100° C. for 10 minutes and was then carried out at a temperature at least 10° C. lower than each temperature Tg for 20 minutes, followed by cooling. A lightsensitive material was then prepared by coating the emulsion layers and the backing layers in the same manner as that in Example 1. Evaluation was made in the same manner as that in Example 1, and the results shown in Table 6 were obtained. Sample Nos. 44 and 46 respectively correspond to Examples 38 and 39, and sample No. 45 corresponds to Comparative Example 7.

It can be found that, the support having the degree of roll set curl after being subjected to heat treatment and the degree of recovery curl after being subjected to hot water bath treatment, which degrees fall within the ranges specified in the present invention, and having a degree of curl in the width direction falling within the range of 5 to 30 $m^{-1}$ exhibits less curl after being subjected to the heat treatment, has good suitability for the processing apparatuses during the process, and good roll set curl eliminating properties.

TABLE 1

| Example/ Comparative Example | Sample No. | Layer configuration M:Copolymerized polyester P:Polyester | Thickness ratio of each layer | Thickness ratio dA/dB (Only three layers) | Roll set curl after heat treatment ($m^{-1}$) | Recovery curl after treatment in hot water bath ($m^{-1}$) | Curl in width direction ($m^{-1}$) | Film thickness (μm) | Splicer aptitude | Developing treatment machine aptitude | Eliminating property of roll set curl |
|---|---|---|---|---|---|---|---|---|---|---|---|
| Example | | | | | | | | | | | |
| 1 | 1 | M/P/M | 1.5/1/0.5 | 3 | 123 | 29 | 15 | 90 | ○ | ○ | ○ |
| 2 | 2 | M/P/M | 1.5/1/0.5 | 3 | 120 | 21 | 16 | 80 | ○ | ○ | ◎ |
| 3 | 3 | M/P/M | 1.5/1/0.5 | 3 | 115 | 11 | 17 | 65 | ○ | ○ | ◎ |
| Comparative Example | | | | | | | | | | | |
| 1 | 4 | — | — | — | 115 | 25 | 14 | 90 | ○ | X | — |
| Comparative Example | | | | | | | | | | | |
| 2 | 5 | M | — | — | 155 | 43 | 0 | 80 | X | — | — |
| 3 | 6 | P | — | — | 90 | 65 | 0 | 80 | ○ | ○ | X |
| Example | | | | | | | | | | | |
| 4 | 7 | M/P/M | 3/1/0.5 | 6 | 90 | 8 | 35 | 80 | ○ | Δ | ◎ |
| 5 | 8 | M/P/M | 2.5/1/0.5 | 5 | 105 | 12 | 27 | 80 | ○ | ○ | ◎ |
| 6 | 9 | M/P/M | 1.2/1/0.8 | 1.5 | 130 | 35 | 12 | 80 | ○ | ○ | ◎ |
| 7 | 10 | M/P/M | 1.1/1/1 | 1.1 | 135 | 41 | 10 | 80 | ○ | ○ | ○ |
| Comparative Example | | | | | | | | | | | |
| 4 | 11 | M/P/M | 1/1/1 | 1 | 144 | 50 | 0 | 80 | X | X | X |
| Example | | | | | | | | | | | |
| 8 | 12 | M/P | 1.5/1 | — | 125 | 22 | 20 | 80 | ○ | ○ | ◎ |
| 9 | 13 | M/P | 1/1 | — | 117 | 27 | 17 | 80 | ○ | ○ | ○ |
| Example | | | | | | | | | | | |
| 10 | 14 | M/P/M | 1.5/1/0.5 | 3 | 117 | 32 | 14 | 80 | ○ | ○ | ○ |
| 11 | 16 | M/P/M | 1.5/1/0.5 | 3 | 122 | 21 | 15 | 80 | ○ | ○ | ○ |
| Example | | | | | | | | | | | |
| 13 | 17 | P/M/P | 1/2/0.5 | 2 | 125 | 35 | 6 | 80 | ○ | ○ | ○ |
| 14 | 18 | P/M/P | 1.5/2/0.5 | 3 | 110 | 24 | 12 | 80 | ○ | ○ | ○ | obtained in Comparative Example 2 (sample No. 5) and

TABLE 2

| Example/ Comparative Example | Sample No. | SIP (mol %/ total ester bond) | Other composition Kind | % by weight/ polymer | Roll set curl after heat treatment ($m^{-1}$) | Recovery curl after treatment in hot water bath ($m^{-1}$) | Curl in width direction ($m^{-1}$) | Splicer aptitude | Developing machine aptitude | Eliminating property of roll set curl |
|---|---|---|---|---|---|---|---|---|---|---|
| Example | | | | | | | | | | |
| 15 | 19 | 2 | PEG | 3 | 125 | 38 | 10 | ○ | ○ | ○ |
| 16 | 20 | 7 | PEG | 6 | 130 | 40 | 20 | ○ | ○ | ○ |

TABLE 2-continued

| Example/ Comparative Example | Sample No. | SIP (mol %/ total ester bond) | Other composition Kind | Other composition % by weight/ polymer | Roll set curl after heat treatment (m$^{-1}$) | Recovery curl after treatment in hot water bath (m$^{-1}$) | Curl in width direction (m$^{-1}$) | Splicer aptitude | Developing machine aptitude | Eliminating property of roll set curl |
|---|---|---|---|---|---|---|---|---|---|---|
| 17 | 21 | 9 | PEG | 6 | 125 | 20 | 25 | ○ | △ | ⊙ |
| 18 | 23 | 5 | PEG | 0 | 90 | 44 | 10 | ○ | ○ | ○ |
| 19 | 23 | 3 | PEG | 10 | 135 | 30 | 19 | ○ | ○ | ○ |
| Example | | | | | | | | | | |
| 20 | 24 | 2 | DMA | 9 | 127 | 30 | 13 | ○ | ○ | ⊙ |
| 21 | 25 | 9 | DMA | 9 | 130 | 35 | 23 | ○ | △ | ○ |
| 22 | 26 | 6 | DMA | 3 | 105 | 40 | 11 | ○ | ○ | ○ |

TABLE 3

| Example | Sample No. | Layer configuration M:Copolymerized polyester P:Polyester | Thickness ratio of each layer | Composition of first layer SIP | Composition of first layer PEG | Composition of third layer SIP | Composition of third layer PEG | Thickness ratio dA/dB | Roll set curl after heat treatment (m$^{-1}$) | Recovery curl after treatment in hot water bath (m$^{-1}$) | Curl in width direction (m$^{-1}$) | Splicer aptitude | Developing treatment machine aptitude | Eliminating property of roll set curl |
|---|---|---|---|---|---|---|---|---|---|---|---|---|---|---|
| Example | | | | | | | | | | | | | | |
| 23 | 27 | M/P/M | 1/1/1 | 5 | 8 | 3 | 5 | 1 | 130 | 40 | 13 | ○ | ○ | ○ |
| 24 | 28 | M/P/M | 1.2/1/0.8 | 5 | 8 | 3 | 5 | 1.5 | 120 | 20 | 18 | ○ | ○ | ⊙ |
| 25 | 29 | M/P/M | 1.2/1/0.8 | 4 | 7 | 3 | 5 | 1.5 | 127 | 40 | 10 | ○ | ○ | ○ |
| Example | | | | | | | | | | | | | | |
| 26 | 30 | M/M | 1/1 | 5 | 8 | 3*1) | 5*1) | — | 125 | 24 | 15 | ○ | ○ | ○ |
| 27 | 31 | M/M | 1.5/1 | 5 | 8 | 3 | 5 | — | 120 | 20 | 18 | ○ | ○ | ⊙ |

*1) represents a composition of the second layer

TABLE 4

| Example | Sample No. | Layer configuration M:Copolymerized polyester P:Polyester | Thickness ratio of each layer | IV of first layer (dl/g) | IV of third layer (dl/g) | ΔIV | Thickness ratio dA/dB | Roll set curl after heat treatment (m$^{-1}$) | Recovery curl after treatment in hot water bath (m$^{-1}$) | Curl in width direction (m$^{-1}$) | Splicer aptitude | Developing treatment machine aptitude | Eliminating property of roll set curl |
|---|---|---|---|---|---|---|---|---|---|---|---|---|---|
| Example | | | | | | | | | | | | | |
| 28 | 32 | M/P/M | 1/1/1 | 0.45 | 0.47 | 0.02 | 1 | 130 | 30 | 5 | ○ | ○ | ○ |
| 29 | 33 | M/P/M | 1/1/1 | 0.45 | 0.55 | 0.1 | 1 | 125 | 22 | 12 | ○ | ○ | ⊙ |
| 30 | 34 | M/P/M | 1/1/1 | 0.35 | 0.55 | 0.2 | 1 | 119 | 15 | 16 | ○ | ○ | ⊙ |
| 31 | 35 | M/P/M | 1/1/1 | 0.35 | 0.80 | 0.45 | 1 | 125 | 20 | 29 | ○ | △ | ⊙ |
| 32 | 36 | M/P/M | 1.2/1/0.8 | 0.45 | 0.47 | 0.2 | 1.5 | 125 | 18 | 14 | ○ | ○ | ⊙ |
| Comparative Example | | | | | | | | | | | | | |
| 5 | 37 | M/P/M | 1/1/1 | 0.55 | 0.55 | 0 | 1 | 145 | 48 | 0 | ○ | ○ | X |
| Example | | | | | | | | | | | | | |
| 33 | 38 | M/P/M | 1/1/1 | 0.50 | 0.55 | 0.05 | 1 | 128 | 27 | 7 | ○ | ○ | ○ |
| 34 | 39 | M/P/M | 1/1/1 | 0.40 | 0.70 | 0.3 | 1 | 115 | 15 | 20 | ○ | ○ | ⊙ |
| 35 | 40 | M/P/M | 1/1/1 | 0.40 | 0.80 | 0.4 | 1 | 120 | 16 | 25 | ○ | △ | ⊙ |

TABLE 5

| Example/ Comparative Example | Sample No. | SIP (mol %/ total ester linkage) | Other composition Kind | Other composition % by weight/ polymer | Roll set curl after heat treatment (m$^{-1}$) | Recovery curl after treatment in hot water bath (m$^{-1}$) | Curl in width direction (m$^{-1}$) | Splicer aptitude | Developing treatment machine aptitude | Eliminating property of roll set curl |
|---|---|---|---|---|---|---|---|---|---|---|
| Example | | | | | | | | | | |
| 36 | 41 | 2 | PEG | 2 | 110 | 40 | 0 | ○ | ○ | ○ |
| 37 | 42 | 3 | — | 0 | 100 | 45 | 0 | ○ | ○ | ○ |
| Comparative Example | | | | | | | | | | |
| 6 | 43 | 0 | — | 0 | 80 | 55 | 0 | ○ | ○ | X |

TABLE 6

| Example | Sample No. | Layer configuration M:Copolymerized polyester P:Polyester | Roll set curl after heat treatment ($m^{-1}$) | Recovery curl after treatment in hot water bath ($m^{-1}$) | Curl in width direction ($m^{-1}$) | Splicer treatment machine aptitude | Developing treatment machine aptitude | Eliminating property of roll set curl |
|---|---|---|---|---|---|---|---|---|
| Example 38 | 44 | M | 130 | 25 | 13 | ○ | ○ | ◎ |
| Comparative Example 7 | 45 | P | 80 | 55 | 5 | ○ | ○ | X |
| Example 39 | 46 | M | 90 | 20 | 11 | ○ | ○ | ◎ |

EXAMPLES 40 TO 43, COMPARATIVE EXAMPLES 10 AND 11

After 0.1 part by weight of a hydrate of calcium acetate serving as an ester exchange catalyst was added to 100 parts by weight of dimethyl terephthalate and 64 parts by weight of ethylene glycol, an ester exchange reaction was carried out by a conventional procedure.

To the resulting product, the following were added: 28 parts by weight of an ethylene glycol solution (concentration: 35% by weight) of 5-sodiumsulfo-di(α-hydroxyethyl)isophthalic acid (abbreviated to SIP), and 8.1 parts by weight of polyethylene glycol (abbreviated to PEG) (number-average molecular weight: 3,000). Thereafter, 0.05 part by weight of antimony trioxide and 0.13 part by weight of trimethyl phosphate were added. Thereafter, the temperature was raised gradually, the pressure was reduced, and polymerization was carried out at 280° C. and 0.5 mmHg. In this manner, a copolymer polyester was obtained.

A support of the photographic material was prepared in the manner described below by using the thus obtained copolymer polyester and a polyethylene terephthalate (intrinsic viscosity: 0.65) for photographic purposes, which was to be used as a polyester layer.

The thus obtained copolymer polyester and the polyethylene terephthalate (intrinsic viscosity: 0.65) were respectively dried in a vacuum at 150° C. and subjected to melt extrusion at 285° C. by using three extruders. The materials were adhered in a layered form in a T-die such that the polyester layer and the copolymer polyester layers might constitute the layer configuration shown in Table 7, and were quenched and solidified on a cooling drum to form a laminated unoriented film. Thereafter, the laminated unoriented film was subjected to longitudinal orientation (magnification: 3.5) at 85° C. and then to transverse orientation (magnification: 3.5) at 95° C. Heat setting was then carried out at 210° C., and a support of the photographic material having a thickness of 80 μm was thereby obtained.

The thus obtained support of the photographic material was evaluated in the manner described later, and the results shown in Table 7 were obtained.

Comparative Example 8 and 9 are skipped numbers.

In Comparative Example 10, the value of $\{(d_1+d_3)/d_2\}$ in Condition Formula (2) is 0.6, which is smaller than values falling within the range specified by Condition Formula (2), and therefore the roll set curl recovery properties are bad. In Comparative Example 11, the value of $\{(d_1+d_3)/d_2\}$ in Condition Formula (2) is 4.0, which is larger than values falling within the range specified by Condition Formula (2), and therefore the modulus of elasticity is low.

In Examples 40 through 43, the support of the photographic materials satisfy Condition Formulas (1), (2), and (3), and therefore simultaneously have good anticurl properties, good roll set curl recovery properties, and a high modulus of elasticity. The support of the photographic materials obtained in Examples 40 and 41 further satisfy Condition Formula (5), i.e., $1.5 \leq \{(d_1+d_3)/d_2\} \leq 2.5$, and therefore have better anticurl properties, better roll set curl recovery properties, and a higher modulus of elasticity than the support of the photographic materials obtained in Examples 42 and 43.

EXAMPLES 44 TO 46, COMPARATIVE EXAMPLE 12

Support of the photographic materials having the layer configurations shown in Table 7 were obtained in the same manner as that in Example 40. The thus obtained support of the photographic materials were evaluated in the same manner as that in Example 40, and the results shown in Table 7 were obtained.

In Comparative Example 12, the value of the left side of Condition Formula (3), i.e. the value of $\{(S_1-P_1-d_1)/(S_3 \times P_3 \times d_3)\}$, is 1.4, which does not satisfy Condition Formula (3). Therefore, the support of the photographic material obtained in Comparative Example 12 had bad anticurl properties.

The support of the photographic materials obtained in Examples 44 through 46 satisfy Condition Formulas (1), (2), and (3), and therefore simultaneously have good anticurl properties, good roll set curl recovery properties, and a high modulus of elasticity. The support of the photographic material obtained in Example 46 further satisfies Condition Formula (6), i.e., $\{(S_1 \times P_1 \times d_1)/(S_3 \times P_3 \times d_3)\} \geq 2$, and therefore have better anticurl properties, better roll set curl recovery properties, and a higher modulus of elasticity than the support of the photographic materials obtained in Examples 44 and 45.

Examples 47 and 48, Comparative Examples 13 and 14 Support of the photographic materials having the layer configurations shown in Table 7 were obtained in the same manner as that in Example 40. The thus obtained support of the photographic materials were evaluated in the same manner as that in Example 40, and the results shown in Table 7 were obtained.

The support of the photographic materials obtained in Comparative Examples 13 and 14 do not satisfy Condition Formulas (1), (2), and (3) at the same time, and therefore cannot simultaneously have good anticurl properties, good roll set curl recovery properties, and a high modulus of elasticity.

On the other hand, the support of the photographic materials obtained in Examples 47 and 48 satisfy Condition Formulas (1), (2), and (3) at the same time, and therefore simultaneously have good anticurl properties, good roll set curl recovery properties, and a high modulus of elasticity. The support of the photographic material obtained in Example 48 further satisfies Condition Formula (6), and therefore have better anticurl properties, better roll set curl recovery properties, and a higher modulus of elasticity than the support of the photographic material obtained in Example 47.

COMPARATIVE EXAMPLES 15 AND 16

Support of the photographic materials having the layer configurations shown in Table 7 were obtained in the same manner as that in Example 40. The thus obtained support of the photographic materials were evaluated in the same manner as that in Example 40, and the results shown in Table 8 were obtained.

In the first and third layers of each of the support of the photographic materials obtained in Comparative Examples 16 and 17, the value of SIP, i.e. the content (mol %/acid constituent) with respect to the total acid constituent in the aromatic dicarboxylic acid having a metal sulfonate group, does not fall within the range of 2 to 7, or the value of PEG, i.e. the content (% by weight/total polymer) of the polyalkylene glycol with respect to the total weight of the reaction product, does not fall within the range of 3 to 10. Therefore, these support of the photographic materials cannot yield the technical effects of the present invention.

COMPARATIVE EXAMPLE 17

A support of the photographic material having a thickness of 110 μm was obtained in the same manner as that in Example 40, except that the take-off speed of the cooling drum was changed and the copolymer polyester having the same composition as that in Example 42 was used.

The thus obtained support of the photographic material was evaluated in the same manner as that in Example 40, and the results shown in Table 8 were obtained.

In the support of the photographic material obtained in Comparative Example 17, the value of $d_2$ is 55 μm and does not satisfy Condition Formula (1). Therefore, this support of the photographic material cannot yield the technical effects of the present invention.

With a known method, photographic film was made by overlaying a photographic light-sensitive layer on the convex surface of the support of the photographic material in accordance with the present invention. The photographic film had good handling properties and good performance, and had no problems during practical use.

Evaluating methods

The support of the photographic materials prepared in the manner described above were evaluated with the methods described below. The results are shown in Tables 7 and 8.

Modulus of elasticity

The photographic film was left to stand for 24 hours or more in a room adjusted at a temperature of 23° C. and relative humidity of 55%. It was then cut into a sample having a width of 10 mm and a length of 200 mm, and subjected to a tensile test in which the distance between chucks was 100 mm and the stress rate was 100 mm/min according to JIS-Z1702-1976.

Roll set curl recovery properties

A sheet of film having a width of 35 mm and a length of 12 cm was wound around a core tube having a diameter of 10 mm with the concave surface facing the exterior, and was then kept in this state at 55° C., 20% RH for 3 days. Thereafter, the film was released from the core tube, and a load of 50 g was applied to one end of the film. The film was dipped in a water bath at 38° C. for 15 minutes, dried in a warm air drier at 55° C. for 15 minutes, and released from the load. The length of the film suspended naturally was measured, and the ratio of the measured length to the original length was calculated. The results were evaluated with three grades shown below. From the point of view of the performance of the support of the photographic material, if the support has the "Δ" grade or the higher grade, no problem will occur with the roll set curl eliminating properties of the light-sensitive material made by overlaying the emulsion layers on the support.

Evaluation grades:
O: 80% or more.
Δ: From 50% to less than 80%.
X: Less than 50%.

Alternatively, the roll set curl recovery properties may be evaluated in the manner described below. Specifically, a sheet of film having a width of 35 mm and a length of 12 cm is wound around a core tube having a diameter of 10 mm with the concave surface facing the exterior, and is then kept in this state at 55° C., 20% RH for 3 days. Thereafter, the film is released from the core tube, and a load of 70 g is applied to one end of the film. The film is dipped in a water bath at 38° C. for 15 minutes, dried in a warm air drier at 55° C. for 15 minutes, and released from the load. Thereafter, the film is cut in the width direction so as to obtain a sample having a length of 2 to 3 mm, which length is taken along the longitudinal direction of the original film. The sample is subjected to moisture conditioning at 23° C., 55% RH for one day, the degree of curl in the width direction is measured, and the results are evaluated with three grades shown below in terms of the absolute value of curl. In view of the grade of the current TAC film, the "Δ" grade is acceptable for a support of the photographic material. However, the support of the photographic material should preferably has the "O" grade, and should more preferably has the "⊙" grade.

Evaluation grades:
⊙: 12 to 18.
O: 5 to 12, or 18 to 25.
Δ: 0 to 5, over 25.

EXAMPLE 49

After a hydrate of calcium acetate and manganese acetate serving as ester exchange catalysts were added respectively in amounts, which corresponded to molar ratios of $2 \times 10^{-4}$ with respect to dimethyl terephthalate, to 100 parts by weight of dimethyl terephthalate, 71 parts by weight of ethylene glycol and 9.7 parts by weight (7% by weight/polymer) of dimethyl adipate (abbreviated to DMA), an ester exchange reaction was carried out by a conventional procedure. To the resulting product, the following were added: 28 parts by weight (5 mol %/total acid constituent) of an ethylene glycol solution (concentration: 35% by weight) of 5-sodiumsulfo-di(α-hydroxyethyl)isophthalic acid (abbreviated to SIP), 0.05 part by weight of antimony trioxide, and 0.13 part by weight of trimethyl phosphate. Thereafter, the temperature was raised gradually, the pressure was reduced, and polymerization was carried out at 280° C. and 0.5 mmHg. In this manner, a copolymer polyester having an intrinsic viscosity of 0.55 was obtained.

This copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 9, and were quenched and solidified on a cooling drum to form a laminated unoriented film. At this time, the extrusion rate of each material was adjusted such that the thickness of each layer might change as shown in Table 9. Thereafter, the film was subjected to longitudinal orientation (magnification: 3.5) at 85° C. and then to transverse orientation (magnification: 3.5) at 95° C. Heat setting was then carried out at 210° C., and a biaxially oriented film having a film thickness of 80 mm was thereby obtained.

This film had the physical properties shown in Table 9. The film costituted of the copolymer polyester alone or the polyester alone had bad roll set curl recovery properties or a low modulus of elasticity. However, the film constituted of layers of the two materials laminated together, particularly the film in which the ratio of the layers fell within the range specified in the present invention, had good roll set curl recovery properties and a high modulus of elasticity at the same time.

With a known method, photographic film was made by overlaying a photographic light-sensitive layer on the above-described support film. The photographic film had good performance, and had no problems during practical use.

Also, the film in accordance with the present invention, in which the copolymer polyester layer was overlaid on one surface of the polyester layer, had good roll set curl recovery properties, a high modulus of elasticity, good anticurl properties, and good handling properties.

EXAMPLES 50 TO 54

Biaxially oriented films having a film thickness of 80 mm were prepared by using a copolymer polyethylene terephthalate of the same type as that in Example 48 and using three extruders in the same manner as that in Example 48, except that the ratio of the thicknesses of the layers was changed to values shown in Table 9.

These films had the physical properties shown in Table 9. It can be found that the films falling within the scope of the present invention has good characteristics.

Also, it can be found that particularly good results are obtained with the film which satisfies the preferable condition in accordance with the present invention, i.e. $0.7 \leq d_2/d_1 \leq 3$, or the more preferable condition $1 \leq d_2/d_1 \leq 2$, and the condition $(S_1 \times P_1 \times d_1)/(S_3 \times P_3 \times d_3) \geq 1.5$.

From the foregoing, the thickness of the polyester layer should preferably be 50 $\mu$m or less, should more preferably be 40 $\mu$m or less, and should preferably be 20 $\mu$m or more. If it is less than 20 mm, the modulus of elasticity decreases to an unacceptable level.

EXAMPLES 55 TO 63

A copolymer polyethylene terephthalate having an intrinsic viscosity of 0.55 was obtained in the same manner as that in Example 49, except that the amounts of 5-sodiumsulfo-di($\beta$-hydroxyethyl)isophthalic acid (abbreviated to SIP) and dimethyl adipate (abbreviated to DMA) were changed as shown in Table 9. Biaxially oriented films having a film thickness of 80 $\mu$m were obtained in the same manner as that in Example 49, except that the ratio between thicknesses of the respective layers was changed as shown in Table 9.

These films had the physical properties shown in Table 9. It can be found that the films falling within the scope of the present invention has good characteristics.

Example 62 is a skipped number.

Also, it can be found that good results are obtained with the film which satisfies the preferable condition in accordance with the present invention, i.e. $0.7 \leq d_2/d_1 \leq 3$, and the condition $(S_1 \times P_1 \times d_1)/(S_3 \times P_3 \times d_3) \geq 1.5$. Also, it can be found that particularly good results are obtained with the film which satisfies the condition $1.5 \leq (S_1 \times P_1 \times d_1)/(S_3 \times P_3 \times d_3) \leq 4$.

With a known method, photographic film was made by overlaying a photographic light-sensitive layer on the convex surface of the support film in accordance with the present invention. The photographic film had good handling properties and good performance, and had no problems during practical use. Also, it can be found that, as the copolymerization constituent, the polyalkylene glycol yields a higher modulus of elasticity than the saturated aliphatic dicarboxylic acid. Therefore, the polyalkylene glycol is more preferable than the saturated aliphatic dicarboxylic acid.

TABLE 7

| | Ratio of thickness of each layer* | | | First layer composition | | Third layer composition | | $d_2$ | $(d_1 + d_3)/$ | $(S_1 \times P_1 \times d_1)/$ | Anti-curl prop- | Recovery property of roll | Modulas of elasti-city |
|---|---|---|---|---|---|---|---|---|---|---|---|---|---|
| | first layer: | second layer: | third layer | SIP | PEG | SIP | PEG | $\mu$m | $d_2$ | $(S_3 \times P_3 \times d_3)$ | erty | set curl | Kg/mm$^2$ |
| Example 40 | 4: | 3: | 1 | 5 | 7 | 5 | 7 | 30 | 1.7 | 4.0 | ⊚ | ⊚ | 500 |
| Example 41 | 3: | 2: | 1 | 5 | 7 | 5 | 7 | 26.7 | 2.0 | 3.0 | ⊚ | ⊚ | 490 |
| Comparative Example 10 | 2: | 5: | 1 | 5 | 7 | 5 | 7 | 50 | 0.6 | 2.0 | ⊚ | △ | 530 |
| Example 42 | 2: | 3: | 1 | 5 | 7 | 5 | 7 | 40 | 1.0 | 2.0 | ⊚ | ○ | 530 |
| Example 43 | 2: | 1: | 1 | 5 | 7 | 5 | 7 | 20 | 3.0 | 2.0 | ⊚ | ⊚ | 460 |
| Comparative Example 11 | 8: | 3: | 4 | 5 | 7 | 5 | 7 | 16 | 4.0 | 2.0 | ⊚ | ⊚ | 380 |
| Example 44 | 1: | 1: | 1 | 5 | 7 | 3 | 7 | 26.7 | 2.0 | 1.7 | ○ | ⊚ | 510 |
| Comparative Example 12 | 1: | 1: | 1 | 5 | 10 | 5 | 7 | 26.7 | 2.0 | 1.4 | △ | ⊚ | 490 |
| Example 45 | 1: | 1: | 1 | 5 | 10 | 5 | 6 | 26.7 | 2.0 | 1.7 | ○ | ⊚ | 500 |
| Example 46 | 1: | 1: | 1 | 5 | 7 | 3 | 5 | 26.7 | 2.0 | 2.3 | ⊚ | ⊚ | 510 |
| Comparative Example 13 | 4: | 5: | 7 | 5 | 7 | 3 | 5 | 25 | 2.2 | 1.3 | △ | ⊚ | 510 |

TABLE 7-continued

| | Ratio of thickness of each layer* | | | First layer composition | | Third layer composition | | $d_2$ | $(d_1 + d_3)/$ | $(S_1 \times P_1 \times d_1)/$ | Anti-curl prop- | Re-covery property of roll | Modulas of elasti-city |
|---|---|---|---|---|---|---|---|---|---|---|---|---|---|
| | first layer: | second layer: | third layer | SIP | PEG | SIP | PEG | μm | $d_2$ | $(S_3 \times P_3 \times d_3)$ | erty | set curl | Kg/mm² |
| Example 47 | 5: | 6: | 8 | 5 | 7 | 3 | 5 | 25.3 | 2.2 | 1.5 | ○ | ⊙ | 510 |
| Example 48 | 6: | 7: | 7 | 5 | 7 | 3 | 5 | 28 | 1.9 | 2.0 | ⊙ | ⊙ | 500 |
| Comparative Example 14 | 5: | 3: | 7 | 5 | 7 | 3 | 5 | 16 | 4.0 | 1.7 | ⊙ | ⊙ | 390 |

*The first to third layers shown in Table 7 are a copolymerized polyester layer, a polyester layer and a copolymerized polyester layer, respectively. SIP is a content (mol %/acid component) against the total acid component of an aromatic dicarboxylic acid having a metal sulfonate group. PEG is a content (% by weight/total polymer) against the total weight of the reaction product of polyalkylene glycol.

TABLE 8

| | Ratio of thickness of each layer* | | | First layer composition | | Third layer composition | | $d_2$ | $(d_1 + d_3)/$ | $(S_1 \times P_1 \times d_1)/$ | Anti-curl prop- | Recovery property of roll | Modulas of elas-ticity |
|---|---|---|---|---|---|---|---|---|---|---|---|---|---|
| | first layer: | second layer: | third layer | SIP | PEG | SIP | PEG | μm | $d_2$ | $(S_3 \times P_3 \times d_3)$ | erty | set curl | Kg/mm² |
| Comparative Example 15 | 1: | 1: | 1 | 9 | 7 | 5 | 7 | 26.7 | 2.0 | 1.8 | ⊙ | ⊙ | 370 |
| Comparative Example 16 | 1: | 1: | 1 | 5 | 7 | 3 | 0 | 26.7 | 2.0 | ∞ | ⊙ | Δ | 490 |
| Comparative Example 17 | 2: | 3: | 1 | 5 | 7 | 5 | 7 | 55 | 1.0 | 2.0 | ○ | Δ | 530 |

*The first to third layers shown in Table 7 are a copolymerized polyester layer, a polyester layer and a copolymerized polyester layer, respectively. SIP is a content (mol %/acid component) against the total acid component of an aromatic dicarboxylic acid having a metal sulfonate group. PEG is a content (% by weight/total polymer) against the total weight of the reaction product of polyalkylene glycol.

TABLE 9

| | Ratio of thickness of each layer* | | | First layer composition | | Third layer composition | | $d_2$ | $(d_1 + d_3)/$ | $(S_1 \times P_1 \times d_1)/$ | Anti-curl prop- | Recovery property of roll | Modulas of elas-ticity |
|---|---|---|---|---|---|---|---|---|---|---|---|---|---|
| | first layer: | second layer: | third layer | SIP | DMA | SIP | DMA | μm | $d_2$ | $(S_3 \times P_3 \times d_3)$ | erty | set curl | Kg/mm² |
| Example 49 | 4: | 3: | 1 | 5 | 7 | 5 | 7 | 30 | 1.7 | 4.0 | ⊙ | ⊙ | 490 |
| Example 50 | 3: | 2: | 1 | 5 | 7 | 5 | 7 | 26.7 | 2.0 | 3.0 | ⊙ | ⊙ | 480 |
| Example 51 | 2: | 5: | 1 | 5 | 7 | 5 | 7 | 50 | 0.6 | 2.0 | ⊙ | Δ | 510 |
| Example 52 | 2: | 3: | 1 | 5 | 7 | 5 | 7 | 40 | 1.0 | 2.0 | ⊙ | ⊙ | 510 |
| Example 53 | 2: | 1: | 1 | 5 | 7 | 5 | 7 | 20 | 3.0 | 2.0 | ⊙ | ⊙ | 450 |
| Example 54 | 8: | 3: | 4 | 5 | 7 | 5 | 7 | 16 | 4.0 | 2.0 | ⊙ | ⊙ | 380 |
| Example 55 | 1: | 1: | 1 | 5 | 7 | 3 | 7 | 26.7 | 2.0 | 1.7 | ○ | ⊙ | 500 |
| Example 56 | 1: | 1: | 1 | 5 | 10 | 5 | 7 | 26.7 | 2.0 | 1.4 | Δ | ⊙ | 480 |
| Example 57 | 1: | 1: | 1 | 5 | 10 | 5 | 6 | 26.7 | 2.0 | 1.7 | ⊙ | ⊙ | 490 |
| Example 58 | 1: | 1: | 1 | 5 | 7 | 3 | 5 | 26.7 | 2.0 | 2.3 | ⊙ | ⊙ | 500 |
| Example 59 | 4: | 5: | 7 | 5 | 7 | 3 | 5 | 25 | 2.2 | 1.3 | Δ | ⊙ | 500 |
| Example 60 | 5: | 6: | 8 | 5 | 7 | 3 | 5 | 25.3 | 2.2 | 1.5 | ⊙ | ⊙ | 500 |
| Example 61 | 6: | 7: | 7 | 5 | 7 | 3 | 5 | 28 | 1.9 | 2.0 | ⊙ | ⊙ | 490 |
| Example 63 | 1: | 1: | 1 | 5 | 7 | 3 | 0 | 26.7 | 2.0 | ∞ | ○ | ○ | 470 |

*The first to third layers shown in Table 7 are a copolymerized polyester layer, a polyester layer and a copolymerized polyester layer, respectively. SIP is a content (mol %/acid component) against the total acid component of an aromatic dicarboxylic acid having a metal sulfonate group. PEG is a content (% by weight/total polymer) against the total weight of the reaction product of polyalkylene glycol.

EXAMPLE 64

After 0.1 part by weight of a hydrate of calcium acetate serving as an ester exchange catalyst was added to 100 parts by weight of dimethyl terephthalate and 64 parts by weight of ethylene glycol, an ester exchange reaction was carried out by a conventional procedure.

To the resulting product, the following were added: 12 parts by weight of an ethylene glycol solution (concentration: 35% by weight) of 5-sodiumsulfo-di(β-hydroxyethyl)isophthalic acid, 8 parts by weight of polyethylene glycol (number-average molecular weight: 3,000), 0.05 part by weight of antimony trioxide, 0.13 part by weight of trimethyl phosphate, and 0.02 part by weight of sodium hydroxide. Thereafter, the temperature was raised gradually, the pressure was reduced, and polymerization was carried out at 280° C. and 0.5 mmHg. In this manner, a copolymer polyester having an intrinsic viscosity of 0.55 was obtained.

This copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 10, and were quenched and solidified by being brought into close contact with a cooling drum by an electrostatic contact method. In this manner, a laminated unoriented film was obtained. At this time, the extrusion rate of each material was adjusted such that the ratio between the thicknesses of the respective layers might be 0.5:1:1.5. Thereafter, the film was subjected to longitudinal orientation (magnification: 3.5) at 85° C. and then to transverse orientation (magnification: 3.5) at 95° C. Heat setting was then carried out at 210° C., and a biaxially oriented film having a film thickness of 80 mm was thereby obtained.

As for the thus obtained biaxially oriented film, evaluation was made with the methods described below. The results shown in Table 10 were obtained.

Evaluation methods

Degree of roll set curl after heat treatment

The degree of roll set curl was measured in the same method as mentioned above.

Degree of recovery curl after hot water bath treatment

The degree of recovery curl was measured in the same method as mentioned above.

Degree of curl in the width direction

The degree of curl in the width direction was measured in the same method as mentioned above.

Intrinsic viscosity

The intrinsic viscosity was measured in the same manner as mentioned above.

During the measurement of the intrinsic viscosity of each of the layers constituting the polyester film, the surface of the film was scraped off, and fragments of each layer were collected and subjected to the measurement.

Breaking strength

The film was left to stand for 4 hours or more in a room adjusted at a temperature of 23° C. and relative humidity of 55%. It was then cut into a sample having a width of 10 mm and a length of 200 mm, and subjected to a tensile test using Tensilon (RTA-100) supplied by Orientec K.K., in which the distance between chucks was 100 mm and the tensile rate was 100 mm/min.

The load at which the film broke was divided by the initial cross-sectional area, and the breaking strength was thereby calculated.

Coating defects

A corona discharge process at 8 W/(m$^2$·min) was carried out on one surface of the film, and an undercoating composition B-3 was coated at normal temperature and normal humidity and at a rate of 50 m/min by using a roll fit coating pan and an air knife. The coating layer was dried at 90° C. for 30 seconds, and an undercoat layer B-3 having a dry film thickness of 0.8 mm was thereby formed. In the same manner, an undercoating composition B-4 was coated on the other surface of the film and dried, and an undercoat layer B-4 having a dry film thickness of 0.8 μm was thereby formed.

A perforation process was carried out in the manner described in JIS K7519-1982 on the light-sensitive photographic material obtained in the manner described above.

An end 3 of a perforation strength measuring jig shown in FIG. 1 was gripped by a chuck of Tensilon RTA-100 supplied by Orientec K.K. A perforated region of the film having a length of 250 mm was fitted to a sprocket 1, the film was thus positioned, and a weight of 100 g was suspended from an end 2 of the film. The other film end 4 was gripped by the chuck, and pulled at a rate of 40 mm/min. The maximum load, at which the perforated region broken, was taken as the perforation strength. A maximum load of 7 kg or more is practically acceptable.

Roll set curl recovery properties

A film sample having a size of 12 cm×35 mm was wound around a core tube having a diameter of 10 mm such that the emulsion surface might stand facing the interior. The sample was then processed under the conditions of 55° C. and 20% RH for 3 days, and was thus imparted with roll set curl. Thereafter, the sample was released from the core tube, and dipped in pure water at 38° C. for 15 minutes. A load of 50 g was then applied to the sample, and the sample was dried in a hot air drier at 55° C. for 3 minutes. The sample was then released from the load, suspended vertically, and the distance between the two ends of the sample was measured. In this manner, the degree of recovery with respect to the original distance of 12 cm was evaluated.

The results were evaluated with the grades shown below.

⊚: 70% or more.
O: From 50% to less than 70%.
X: Less than 50%.

The "O" grade or the higher grade are acceptable practically.

As is clear from Table 10, the film had sufficient roll see curl recovery properties. Also, the degree of roll set curl of the film after being subjected to heat treatment, the degree of recovery curl of the film after being subjected to hot water bath treatment, and the breaking strength fell within the SCOPES specified in the present invention. Additionally, good results were obtained with respect to the perforation strength and the coating defects.

EXAMPLE 65

A biaxially oriented film having a thickness of 80 mm was obtained in the same manner as that in Example 64, except that the amount of the ethylene glycol solution (concentration: 35% by weight) of 5-sodiumsulfo-di(β-hydroxyethyl)isophthalic acid was changed to 25 parts by weight.

Evaluation was made on this film in the same manner as that in Example 64, and the results shown in Table 10 were obtained. As is clear from Table 10, the laminated film in accordance with the present invention had sufficient roll set curl recovery properties and a high breaking strength, and yielded good results with respect to the perforation strength and the coating defects.

EXAMPLE 66

A biaxially oriented film having a thickness of 80 mm was obtained in the same manner as that in Example 64, except that the amount of the ethylene glycol solution (concentration: 35% by weight) of 5-sodiumsulfo-di(β-hydroxyethyl)isophthalic acid was changed to 35 parts by weight.

Evaluation was made on this film in the same manner as that in Example 64, and the results shown in Table 10 were obtained. As is clear from Table 10, the film in accordance with the present invention had sufficient roll set curl recovery properties and a breaking strength falling within the range specified in the present invention, and yielded practically acceptable results with respect to the perforation strength and the coating defects.

EXAMPLE 67

After 0.1 part by weight of a hydrate of calcium acetate serving as an ester exchange catalyst was added to 100 parts by weight of dimethyl terephthalate, 70 parts by weight of ethylene glycol, and 10 parts by weight of dimethyl adipate, an ester exchange reaction was carried out by a conventional procedure.

To the resulting product, the following were added: 32 parts by weight of an ethylene glycol solution (concentration: 35% by weight) of 5-sodiumsulfo-di(β-hydroxyethyl)isophthalic acid, 0.05 part by weight of antimony trioxide, and 0.13 part by weight of trimethyl phosphate. Thereafter, the temperature was raised gradually, the pressure was reduced, and polymerization was carried out at 280° C. and 0.5 mmHg. In this manner, a copolymer polyester having an intrinsic viscosity of 0.50 was obtained.

This copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 10, and were quenched and solidified on a cooling drum. In this manner, a laminated unoriented film was obtained. At this time, the extrusion rate of each material was adjusted such that the ratio between the thicknesses of the respective layers might be 0.5:1:1.0.

Thereafter, the unoriented film was subjected to longitudinal orientation (magnification: 3.3) at 80° C. and then to transverse orientation (magnification: 3.3) at 90° C. Heat setting was then carried out at 200° C. for 30 seconds, and a biaxially oriented film having a film thickness of 100 $\mu$m was thereby obtained.

Evaluation was made on this biaxially oriented film in the same manner as that in Example 64, and the results shown in Table 10 were obtained. As is clear from Table 10, the film had sufficient roll set curl recovery properties and a breaking strength falling within the range specified in the present invention, and yielded practically acceptable results with respect to the perforation strength and the coating defects.

EXAMPLE 68

An unoriented film obtained in the same manner as that in Example 66 was subjected to longitudinal orientation (magnification: 3.5) at 85° C., then to transverse orientation (magnification: 3.0) at 95° C., and thereafter to longitudinal orientation (magnification: 1.1) at 130° C. Heat setting was then carried out at 210° C., and a biaxially oriented film having a film thickness of 65 $\mu$m was thereby obtained.

Evaluation was made on this biaxially oriented film in the same manner as that in Example 64, and the results shown in Table 10 were obtained. As is clear from Table 10, the film had good roll set curl recovery properties and a high breaking strength. Therefore, though the thickness was as thin as 65 $\mu$m, good results were obtained with respect to the perforation strength and the coating defects.

COMPARATIVE EXAMPLE 10

After 0.1 part by weight of a hydrate of calcium acetate serving as an ester exchange catalyst was added to 100 parts by weight of dimethyl terephthalate, 70 parts by weight of ethylene glycol, and 10 parts by weight of dimethyl adipate, an ester exchange reaction was carried out by a conventional procedure.

To the resulting product, the following were added: 32 parts by weight of an ethylene glycol solution (concentration: 35% by weight) of 5-sodiumsulfo-di(β-hydroxyethyl)isophthalic acid, 0.05 part by weight of antimony trioxide, and 0.13 part by weight of trimethyl phosphate. Thereafter, the temperature was raised gradually, the pressure was reduced, and polymerization was carried out at 280° C. and 0.5 mmHg. In this manner, a copolymer polyester having an intrinsic viscosity of 0.50 was obtained.

This copolymer polyester was dried in a vacuum at 150° C., subjected to melt extrusion at 280° C., and quenched and solidified on a cooling drum. In this manner, an unoriented film was obtained. Thereafter, the unoriented film was subjected to longitudinal orientation (magnification: 3.3) at 80° C. and then to transverse orientation (magnification: 3.3) at 90° C. Heat setting was then carried out at 180° C. for 30 seconds, and a biaxially oriented film having a film thickness of 100 mm was thereby obtained.

Evaluation was made on this biaxially oriented film in the same manner as that in Example 64, and the results shown in Table 10 were obtained. As is clear from Table 10, the film had a breaking strength and a degree of roll set curl after being subjected to heat treatment, which were outside of the range specified in the present invention. Also the film exhibited a low perforation strength and many coating defects, and thus could not be put to practical use.

COMPARATIVE EXAMPLE 19

A biaxially oriented film having a thickness of 80 mm was obtained in the same manner as that in Example 64, except that the ethylene glycol solution (concentration: 35% by weight) of 5-sodiumsulfo-di(β-hydroxyethyl)isophthalic acid was not added. Evaluation was made on this biaxially oriented film in the same manner as that in Example 64, and the results shown in Table 10 were obtained. As is clear from Table 10, when this copolymer polyester was applied to a support of the photographic material, a photographic film was obtained which had bad roll set curl recovery properties.

COMPARATIVE EXAMPLE 20

A commercially available polyethylene terephthalate (intrinsic viscosity: 0.65) was dried in a vacuum at 150° C., subjected to melt extrusion at 290° C., and quenched and solidified by being brought into close contact with a cooling drum by an electrostatic contact method. In this manner, an unoriented film was obtained. Thereafter, the unoriented film was subjected to longitudinal orientation (magnification: 3.3) at 85° C. and then to transverse orientation (magnification: 3.3) at 95° C. Heat setting was then carried out at 225° C. for 30 seconds, and a biaxially oriented film having a film thickness of 80 $\mu$m was thereby obtained. Evaluation was made on this biaxially oriented film in the same manner as that in Example 64, and the results shown in Table 10 were obtained. As is clear from Table 10, the film had a degree of recovery curl after being subjected to hot water bath treatment, which was outside of the range specified in the present invention. When this biaxially oriented film was applied to a support of the photographic material, a photographic film was obtained which had bad roll set curl recovery properties.

EXAMPLE 69

An unoriented film having a layer thickness ratio of 1:1 was obtained in the same manner as that in Example 64, except that the copolymer polyester obtained in Example 65 and a commercially available polyethylene terephthalate (intrinsic viscosity: 0.65) were used and two extruders were used. A biaxially oriented film having a film thickness of 100 $\mu$m was then obtained from the unoriented film in the same manner as that in Example 64. The thus obtained biaxially oriented film was curled such that the side of the copolymer polyester layer was concave. Evaluation was made on this biaxially oriented film in the same manner as that in Example 64, and the results shown in Table 10 were obtained. As is clear from Table 10, the film exhibited practically acceptable, good results with respect to the coating defects, the perforation strength, and the roll set curl recovery properties.

EXAMPLE 70

Two kinds of copolymer polyesters having an intrinsic viscosity of 0.55 (copolymer polyester 1) and an intrinsic viscosity of 0.45 (copolymer polyester 2) were prepared by changing the polymerization time in Example 65. An unoriented film having a layer thickness ratio of 1:1:1 was obtained in the same manner as that in Example 64, except that these two kinds of the copolymer polyesters and a commercially available polyethylene terephthalate (intrinsic viscosity: 0.65) were used.

A biaxially oriented film having a film thickness of 100 mm was then obtained from the unoriented film in the same manner as that in Example 64. The thus obtained biaxially oriented film was curled such that the side of the copolymer polyester layer 1 was concave.

Evaluation was made on this biaxially oriented film in the same manner as that in Example 64, and the results shown in Table 10 were obtained. As is clear from Table 10, the film exhibited practically acceptable, good results with respect to the coating defects, the perforation strength, and the roll set curl recovery properties.

EXAMPLE 71

A mixture was prepared by adding the following: 100 parts by weight of dimethyl terephthalate, 64 parts by weight of ethylene glycol, 28 parts by weight of an ethylene glycol solution (concentration: 35% by weight) of 5-sodiumsulfo-di($\beta$-hydroxyethyl)isophthalic acid, 10 parts by weight polyethylene glycol (number-average molecular weight: 600), 0.1 part by weight of a hydrate of calcium acetate, 0.05 part by weight of antimony trioxide, 0.13 part by weight of trimethyl phosphate, 0.05 part by weight of sodium acetate, and 0.2 part by weight of Irganox 1010 (supplied by Ciba-Geigy Ltd.). Thereafter, the resulting mixture was subjected to an ester exchange reaction according to a conventional procedure. The temperature was then raised gradually, the pressure was reduced, and polymerization was carried out at 280° C. and 0.5 mmHg. In this manner, a copolymer polyester having an intrinsic viscosity of 0.50 was obtained.

A biaxially oriented film having a thickness of 100 $\mu$m was prepared in the same manner as that in Example 64, except that the thus obtained copolymer polyester and a commercially available polyethylene terephthalate (intrinsic viscosity: 0.65) were used. Evaluation was made on this biaxially oriented film in the same manner as that in Example 64, and the results shown in Table 10 were obtained.

The film exhibited practically acceptable, good results with respect to the coating defects, the perforation strength, and the roll set curl recovery properties.

This biaxially oriented film had yellow color, and therefore its quality is slightly low for a support of the photographic material.

TABLE 10

| | Layer configuration | Degree of roll set curl after heat treatment ($m^{-1}$) | Recovery degree of roll set curl after treatment in hot water bath ($m^{-1}$) | Degree of curl in width direction ($m^{-1}$) | Break strength ($kg/mm^2$) Length | Break strength ($kg/mm^2$) Side | Coating defects | Perforation strength (kgf) | Recovery property of roll set curl |
|---|---|---|---|---|---|---|---|---|---|
| Example 64 | M/P/M | 125 | 35 | 10 | 18 | 20 | ⊙ | 10 | ⊙ |
| Example 65 | M/P/M | 125 | 30 | 15 | 18 | 20 | ⊙ | 10 | ⊙ |
| Example 66 | M/P/M | 120 | 25 | 20 | 16 | 17 | ○ | 8 | ⊙ |
| Example 67 | M/P/M | 135 | 45 | 5 | 16 | 15 | ○ | 7 | ○ |
| Example 68 | M/P/M | 110 | 20 | 20 | 22 | 16 | ⊙ | 10 | ⊙ |
| Comparative Example 18 | M | 160 | 40 | 0 | 10 | 12 | X | 4 | ○ |
| Comparative Example 19 | M | 140 | 60 | 0 | 18 | 20 | ○ | 10 | X |
| Comparative Example 20 | P | 90 | 65 | 0 | 20 | 22 | ○ | 14 | X |
| Example 69 | M/P | 100 | 35 | 30 | 18 | 20 | ○ | 14 | ⊙ |
| Example 70 | M/P/M | 125 | 25 | 15 | 17 | 18 | ⊙ | 12 | ⊙ |
| Example 71 | M/P/M | 125 | 35 | 15 | 16 | 16 | ○ | 8 | ○ |

EXAMPLE 72

Preparation of film

After a hydrate of calcium acetate and a hydrate of manganese acetate serving as ester exchange catalysts were added respectively in proportions of $2 \times 10^{-4}$ mol per mol of dimethyl terephthalate to 100 parts by weight of dimethyl terephthalate and 64 parts by weight of ethylene glycol, an ester exchange reaction was carried out by a conventional procedure. To the resulting product, the following were added: 28 parts by weight (5 mol %/total ester linkage) of an ethylene glycol solution (concentration: 35% by weight) of 5-sodium-sulfo-di($\beta$-hydroxyethyl)isophthalic acid (abbreviated to SIP), and 8.7 parts by weight (7% by weight/total weight) of polyethylene glycol (abbreviated to PEG) (number-average molecular weight: 3,000). Thereafter, the following were added: 0.05 part by weight of antimony trioxide, 0.13 part by weight of trimethyl phosphate, and Irganox 245 (supplied by Ciba-Geigy Ltd.) serving as an anti-oxidant and added such that the proportion might be 1% by weight with respect to a product polymer. Thereafter, the temperature was raised gradually, the pressure was reduced, and polymerization was carried out at 275° C. and 0.5 mmHg. In this manner, a copolymer polyester having an intrinsic viscosity of 0.55 was obtained.

The thus obtained copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 13, and were quenched and solidified on a cooling drum to form a laminated unoriented film. Thereafter, the film was subjected to longitudinal orientation (magnification: 3.5) at 85° C. and then to transverse orientation (magnification: 3.5) at 95° C. Heat setting was then carried out at 210° C., and a biaxially oriented film having a film thickness of 80 mm was thereby obtained. (Sample No. 1) Irganox 245 (supplied by Ciba-Geigy Ltd.)

Film evaluation methods

Evaluation was made on the thus obtained film (sample No. 1) in the manner described below, and the results shown in Table 13 were obtained.

Modulus of elasticity

The film was left to stand for 4 hours or more in a room adjusted at a temperature of 23° C. and relative humidity of 55%. It was then cut into a sample having a width of 10 mm and a length of 200 mm, and subjected to a tensile test in which the distance between chucks was 100 mm and the tensile rate was 100 mm/minute. The modulus of elasticity was thus measured and evaluated with the grades shown below. If the modulus of elasticity is lower than that of the current TAC film, the effects of the use of the laminated polyester as the support will be lost. Therefore, for the support of the photographic material, the modulus of elasticity should preferably be of the "O" grade or higher.

Grades:
⊙: 500 kg/mm² or more.
O: 400 to 500 kg/mm².
X: Less than 400 kg/mm².

Preparation of light-sensitive material

The light-sensitive material was prepared in the same method as mentioned above.

Evaluation methods for light-sensitive material

For the light-sensitive material prepared in the same manner as that in Example 1, the items described below were evaluated. The results shown in Table 13 were obtained.

Roll set curl eliminating properties

Five sheets of the light-sensitive material, each having a width of 35 mm and a length of 120 cm, were used. Each sheet of the light-sensitive material was wound around a core tube having a diameter of 10.8 mm and then subjected to heat treatment under the conditions of 55° C. and 20% RH for 4 hours. Thereafter, the sheets of the light-sensitive material were released from the core tubes, spliced by using a commercially available film splicer processing machine (PS-35-2 supplied by Noritsu Koki K.K.), and then subjected to an ordinary development process using an automatic film development processing machine (NCV60 supplied by Noritsu Koki K.K.).

Evaluation was made on the five sheets of film. After each sheet of film was subjected to the development process, a tail end of the film, which end was located on the outermost side of the film roll when the film was wound around the core tube, was gripped, and the film was suspended from the gripped end. The film was then subjected to moisture conditioning for one day. While the film was being suspended naturally, the length of a 12 cm portion of the film from its leading end, which end was located on the innermost side of the film roll when the film was wound around the core tube, was measured. The ratio of the thus measured length to the original length was calculated. Evaluation was made with the three grades described below from the average value of the ratios calculated for the five sheets of the film. The "O" grade and the higher grade are preferable for the performance of photographic film.

⊙: 70% or more.
O: 50 to 70%.
X: Less than 50%.

Color reproducibility

The sample of the light-sensitive material was loaded in a camera, and photographs of four kinds of scenes (1) to (4) described below were taken. After the film was processed in the manner described later, it was subjected to printing on a commercially available color paper using an automatic printing and development processing machine. A printing process was carried out under the conditions described later, and a color print for evaluation was thereby obtained. The printed image thus obtained and an image for comparison, which was obtained by processing in the same manner with a commercially available color film (TAC), were presented to 10 persons. Evaluation was made with sense of these persons from the viewpoint of the color reproducibility. As the evaluation criteria, a zero mark was given to bad color reproducibility, a one mark was given to normal color reproducibility, and two marks were given to good color reproducibility. The total marks were calculated and evaluated with the grades shown below. The color reproducibility should be of the "O" grade or higher in cases where the use of the light-sensitive material is limited to a support for a photographic material.

(1) Portrait of a woman
(2) Group photograph
(3) Landscape photograph of mountain
(4) Landscape photograph of amusement park Grades:
⊙: 60 marks or more
O: 40 to 60 marks
X: Less than 40 marks Storage stability at high temperature The light-sensitive material having a width of 35 mm and a length of 120 cm was wound around a spool having a diameter of 10.8 mm and subjected to heat treatment under the conditions of 65° C. and 80% RH for 3 days. Thereafter, without being exposed to light, the film was subjected to a development process described later. Presence or absence of scratches and spot-like defects on the film were investigated visually.

O: No scratch nor spot-like defect were found.
Δ: Small scratches or small spot-like defects were found.
X: Large scratches or large spot-like defects were found.

The "Δ" grade or higher are practically acceptable for a support for a photographic material.

TABLE 11

(Film development processing)

| Processing step | Processing time | Processing temperature (°C.) | Replenished amount* (ml) |
|---|---|---|---|
| Color development | 3 min 15 sec | 38 ± 0.3 | 780 |
| Bleaching | 45 sec | 38 ± 2.0 | 150 |
| Fixing | 1 min 30 sec | 38 ± 2.0 | 830 |
| Stabilizing | 60 sec | 38 ± 5.0 | 830 |

TABLE 11-continued (Film development processing)

| Processing step | Processing time | Processing temperature (°C.) | Replenished amount* (ml) |
|---|---|---|---|
| Drying | 1 min | 55 ± 5.0 | — |

*the replenished amount is a value per 1 m² of the light-sensitive photographic material.

The following color developing solution, bleaching solution, fixing solution, stabilizing solution and replenishing solutions thereof were used.

<Color developing solution>

| | |
|---|---|
| Water | 800 ml |
| Potassium carbonate | 30 g |
| Sodium hydrogen carbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(b-hydroxyl-ethyl)aniline sulfate | 4.5 g |
| Diethylenetriaminepentaacetic acid | 3.0 g |
| Potassium hydroxide | 1.2 g | made up to 1 liter with addition of water, and adjusted to pH 10.06 by using potassium hydroxide or 20% sulfuric acid.

<Color developing replenishing solution>

| | |
|---|---|
| Water | 800 ml |
| Potassium carbonate | 35 g |
| Sodium hydrogen carbonate | 3 g |
| Potassium sulfite | 5 g |
| Sodium bromide | 0.4 g |
| Hydroxylamine sulfate | 3.1 g |
| 4-Amino-3-methyl-N-ethyl-N-(b-hydroxyl-ethyl)aniline sulfate | 6.3 g |
| Potassium hydroxide | 2 g |
| Diethylenetriaminepentaacetic acid | 3.0 g | made up to 1 liter with addition of water, and adjusted to pH 10.18 by using potassium hydroxide or 20% sulfuric acid.

<Bleaching solution>

| | |
|---|---|
| Water | 700 ml |
| Iron (III) ammonium 1,3-diaminopropane-tetraacetate | 125 g |
| Ethylenediaminetetraacetic acid | 2 g |
| Sodium nitrate | 40 g |
| Ammonium bromide | 150 g |
| Glacial acetic acid | 40 g | made up to 1 liter with addition of water, and adjusted to pH 4.4 by using aqueous ammonia or glacial acetic acid.

<Bleaching replenishing solution>

| | |
|---|---|
| Water | 700 ml |
| Iron (III) ammonium 1,3-diaminopropane-tetraacetate | 175 g |
| Ethylenediaminetetraacetic acid | 2 g |
| Sodium nitrate | 50 g |
| Ammonium bromide | 200 g |
| Glacial acetic acid | 56 g | adjusted to pH 4.0 by using aqueous ammonia or glacial acetic acid, and then made up to 1 liter with addition of water.

<Fixing solution>

| | |
|---|---|
| Water | 800 ml |
| Ammonium thiocyanate | 120 g |
| Ammonium thiosulfate | 150 g |
| Sodium sulfite | 15 g |
| Ethylenediaminetetraacetic acid | 2 g | adjusted to pH 6.2 by using aqueous ammonia or glacial acetic acid, and then made up to 1 liter with addition of water.

<Fixing replenishing solution>

| | |
|---|---|
| Water | 800 ml |
| Ammonium thiocyanate | 150 g |
| Ammonium thiosulfate | 180 g |
| Sodium sulfite | 20 g |
| Ethylenediaminetetraacetic acid | 2 g | adjusted to pH 6.5 by using aqueous ammonia or glacial acetic acid, and then made up to 1 liter with addition of water.

<Stabilizing solution and stabilizing replenishing solution>

| | |
|---|---|
| Water | 900 ml |
| Compound $HO(CH_2CH_2O)_m(CHCH_2O)_{17}(CH_2CH_2O)_nH$ with $CH_3$ branch (average molecular weight = 1800) | 2.0 g |
| Dimethylol urea | 0.5 g |
| Hexamethylenetetramine | 0.2 g |
| 1,2-Benzisothiazolin-3-one | 0.1 g |
| Siloxane L-77 (trade name, produced by UCC) | 0.1 g |
| Aqueous ammonia | 0.5 ml | made up to 1 liter with addition of water, and then adjusted to pH 8.5 by using aqueous ammonia or 50% sulfuric acid.

(Printing processing step) Conditions of the printing processing are shown in Table 12.

TABLE 12

| Processing step | Temperature | Time |
|---|---|---|
| Color development | 35.0 ± 0.3° C. | 45 sec |
| Bleach-fixing | 35.0 ± 0.5° C. | 45 sec |
| Stabilizing | 30 to 40° C. | 90 sec |
| Drying | 60 to 80° C. | 60 sec |

<Color developing solution>

| | |
|---|---|
| Pure water | 800 ml |
| Triethanolamine | 10 g |
| N,N-diethylhydroxylamine | 5 g |
| Potassium bromide | 0.02 g |
| Potassium chloride | 2 g |
| Potassium sulfite | 0.3 g |
| 1-Hydroxyethylidene-1,1-diphosphonic acid | 1.0 g |
| Ethylenediaminetetraacetic acid | 1.0 g |
| Disodium catechol-3,5-disulfonate | 1.0 g |
| Diethylene glycol | 10 g |
| N-ethyl-N-b-methanesulfonamidoethyl-3-methyl-4-aminoaniline sulfate | 4.5 g |
| Fluorescent brightener (4,4'-diamino-stilbenesulfonic acid derivative) | 1.0 g |
| Potassium carbonate | 27 g | made up to 1 liter in total with addition of water, and adjusted to pH 10.10.

<Bleach-fixing solution>

| | |
|---|---|
| Ferric ammonium ethylenediaminetetra-acetate dihydrate | 60 g |
| Ethylenediaminetetraacetic acid | 3 g |
| Ammonium thiosulfate (70% aqueous solution) | 100 ml |
| Ammonium sulfite (40% aqueous solution) | 27.5 ml | made up to 1 liter in total with addition of water, and adjusted to pH 5.7 by using potassium carbonate or glacial acetic acid.

<Stabilizing solution>

| | |
|---|---|
| 5-Chloro-2-methyl-4-isothiazolin-3-one | 0.2 g |
| 1,2-Benzisothiazolin-3-one | 0.3 g |
| Ethylene glycol | 1.0 g |
| 1-Hydroxyethylidene-1,1-diphosphonic acid | 2.0 g |
| o-Phenylphenol sodium | 1.0 g |
| Ethylenediaminetetraacetic acid | 1.0 g |
| Ammonium hydroxide (20% aqueous solution) | 3.0 g |
| Fluorescent brightener (4,4'-diamino-stilbenesulfonic acid derivative) | 1.5 g | made up to 1 liter in total with addition of water, and adjusted to pH 7.0 by using sulfuric acid or potassium hydroxide.

EXAMPLE 73

A film was prepared by using the same type of copolymer polyester as that in Example 72 and using two or three extruders in the same manner as that in Example 72, except that the film was constituted of the materials shown in Table 13. A light-sensitive material was then prepared by coating the emulsion layers and the backing layers in the same manner as that in Example 72. Evaluation was made in the same manner as that in Example 72, and the results shown in Table 13 were obtained. (Sample Nos. 2 to 10)

EXAMPLE 74

The copolymer polyester obtained in Example 72 was dried in a vacuum at 150° C. and subjected to melt extrusion into a film-like shape from a T-die at 280° C. by using a single extruder. The material was then quenched on a cooling drum to form an unoriented film. Thereafter, the film was pre-heated at 80° C. and subjected to longitudinal orientation (magnification: 3.4) and then to transverse orientation (magnification: 3.4) at 80° C. Heat setting was then carried out at 210° C., and a biaxially oriented film having a film thickness of 80 μm was thereby obtained.

A light-sensitive material was then prepared by coating the emulsion layers and the backing layers in the same manner as that in Example 72. Evaluation was made in the same manner as that in Example 72, and the results shown in Table 13 were obtained. (Sample No. 11)

From the results shown in Table 13, it can be found that the laminated film having the L and b values falling within the ranges specified in the present invention has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention.

Also, the film, which has been imparted with curl in the width direction, has particularly good storage stability at high temperatures.

It can also be found that the film in accordance with the present invention having the L and b values falling within the ranges specified in the present invention and a degree of curl in the width direction falling within the range of 5 to 30 m$^{-1}$ exhibits a low degree of roll set curl after being subjected to heat treatment, good suitability for conveyance in the development processing machine, and good roll set curl eliminating properties, and therefore is particularly preferable. It is additionally found that the ratio of the thickness $d_A$ of a thicker outer layer to the thickness $d_B$ of a thinner outer layer should preferably fall within the range of $1.1 \leq d_A/d_B \leq 5$, and should more preferably fall within the range of $1.3 \leq d_A/d_B \leq 3$.

EXAMPLE 75

A polymer having an intrinsic viscosity of 0.55 and containing copolymerization constituents in the proportions shown in Table 14 was prepared in the same manner as that in Example 72, except that the amounts of SIP and PEG added were changed. A film was then prepared in the same manner as that in Example 72, except that the film was constituted of the materials shown in Table 14. A light-sensitive material was then prepared by coating the emulsion layers and the backing layers in the same manner as that in Example 72. Evaluation was made in the same manner as that in Example 72, and the results shown in Table 14 were obtained. (Sample Nos. 12 to 19)

The layer configuration of the film was the same as that in sample No. 1 of Example 72.

From the results shown in Table 14, it can be found that the laminated film having the L and b values falling within the ranges specified in the present invention has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention.

Also, it can be found that the film, which contains SIP and a polyalkylene glycol, particularly polyethylene glycol, and in which the proportion of SIP falls within the range of approximately 2 to 7 mol % (with respect to the ester linkage) and the proportion of PEG falls within the range of approximately 3 to 10% by weight (with respect to the polymer), has good color reproducibility and is very suitable as the support of the photographic material.

EXAMPLE 76

A polymer having the same composition as that of sample No. 1 of Example 72 was obtained in the same manner as that in Example 72, except that the polymerization temperature for the copolymer polyester was changed as shown in Table 15. A film was then prepared in the same manner as that in Example 72. A light-sensitive material was then prepared by coating the emulsion layers and the backing layers in the same manner as that in Example 72. Evaluation was made in the same manner as that in Example 72, and the results shown in Table 15 were obtained. The degree of roll set curl of the film after being subjected to heat treatment, the degree of recovery curl of the film after being subjected to hot water bath treatment, and the degree of curl in the width direction were approximately identical with those in Example 72. (Sample Nos. 20 and 21)

EXAMPLE 77

A polymer having the same composition as that of sample No. 1 of Example 72 was obtained in the same manner as that in Example 72, except that the amounts of the ester exchange catalysts were changed as shown in Table 16. A film was then prepared in the same manner as that in Example 72. A light-sensitive material was then prepared by coating the emulsion layers and the backing layers in the same manner as that in Example 72. Evaluation was made in the same manner as that in Example 72, and the results shown in Table 16 were obtained. The degree of roll set curl of the film after being subjected to heat treatment, the degree of recovery curl of the film after being subjected to hot water bath treatment, and the degree of curl in the width direction were approximately identical with those in Example 72. (Sample Nos. 22 to 26)

From the results shown in Tables 15 and 16, it can be found that the laminated film having the L and b values falling within the ranges specified in the present invention has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention.

EXAMPLE 78

After a hydrate of calcium acetate, which served as an ester exchange catalyst, was added in a proportion of $2\times10^{-4}$ mol per mol of dimethyl terephthalate to 100 parts by weight of dimethyl terephthalate, 9.6 parts by weight of dimethyl adipate (abbreviated to DMA), and 64 parts by weight of ethylene glycol, an ester exchange reaction was carried out by a conventional procedure. To the resulting product, 28 parts by weight of an ethylene glycol solution (concentration: 35% by weight) of 5-sodiumsulfo-di($\beta$-hydroxyethyl)isophthalic acid (abbreviated to SIP) were added. Also, 0.05 part by weight of antimony trioxide and 0.13 part by weight of trimethyl phosphate were added. Thereafter, the temperature was raised gradually, the pressure was reduced, and polymerization was carried out at 275° C. and 0.5 mmHg. In this manner, a copolymer polyester having an intrinsic viscosity of 0.55 was obtained.

A film was then made in the same manner as that in Example 72 so as to obtain the same layer configuration as that in Example 72, except that the thus obtained copolymer polyester and a commercially available polyethylene terephthalate (intrinsic viscosity: 0.65) were used. A light-sensitive material was then prepared by coating the emulsion layers and the backing layers in the same manner as that in Example 72. Evaluation was made in the same manner as that in Example 72, and the results shown in Table 17 were obtained. (Sample No. 27)

EXAMPLE 79

A polymer containing copolymerization constituents in the proportions shown in Table 17 was prepared in the same manner as that in Example 78, except that the amounts of SIP and DMA added were changed. A film was then prepared so as to obtain the same layer configuration as that in Example 78. A light-sensitive material was then prepared by coating the emulsion layers and the backing layers in the same manner as that in Example 72. Evaluation was made in the same manner as that in Example 72, and the results shown in Table 17 were obtained. (Sample Nos. 28 to 34)

From the results shown in Table 17, it can be found that the laminated film having the L and b values and the degree of curl in the width direction, which fall within the ranges specified in the present invention, has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention.

Also, it can be found that the film, which contains SIP and the saturated aliphatic dicarboxylic acid, particularly dimethyl adipate (DMA), and in which the proportion of SIP falls within the range of approximately 2 to 7 mol % (with respect to the ester linkage) and the proportion of DMA falls within the range of approximately 3 to 10% by weight (with respect to the polymer), is very suitable as the support of the photographic material.

EXAMPLE 80

After 0.1 part by weight of a hydrate of calcium acetate serving as an ester exchange catalyst was added to 100 parts by weight of a 2,6-naphthalenedicarboxylic acid dimethyl ester and 56 parts by weight of ethylene glycol, an ester exchange reaction was carried out by a conventional procedure. To the resulting product, the following were added: 22 parts by weight (5 mol %/total ester linkage) of an ethylene glycol solution (concentration: 35% by weight) of 5-sodiumsulfo-di($\beta$-hydroxyethyl)isophthalic acid (abbreviated to SIP), 10 parts by weight (10% by weight/polymer) of polyethylene glycol (abbreviated to PEG) (number-average molecular weight: 3,000), 0.04 part by weight of antimony trioxide, and 0.1 part by weight of trimethyl phosphate. Thereafter, the temperature was raised gradually, the pressure was reduced, and polymerization was carried out at 285° C. and 0.5 mmHg. In this manner, a copolymer polyester having an intrinsic viscosity of 0.5 was obtained.

This copolymer polyester and a commercially available polyethylene-2,6-naphthalate (intrinsic viscosity: 0.59) were respectively dried in a vacuum at 150° C. and subjected to melt extrusion at 295° C. by using three extruders. The materials were adhered in a layered form in a T-die so as to obtain the same layer configuration as that in Example 72, and were quenched and solidified on a cooling drum to form a laminated unoriented film. Thereafter, the film was subjected to longitudinal orientation (magnification: 3.2) at 120° C. and then to transverse orientation (magnification: 3.2) at 125° C. Heat setting was then carried out at 220° C., and a biaxially oriented film having a film thickness of 80 mm was thereby obtained. A light-sensitive material was then prepared by coating the emulsion layers and the backing layers in the same manner as that in Example 72. Evaluation was made in the same manner as to that in Example 72, and the results shown in Table 18 were obtained. (Sample No. 35)

EXAMPLE 81

After 0.1 part by weight of a hydrate of calcium acetate serving as an ester exchange catalyst was added to 100 parts by weight of a 2,6-naphthalenedicarboxylic acid dimethyl ester, 11 parts by weight (10% by weight/polymer) of dimethyl adipate (abbreviated to DMA), and 65 parts by weight of ethylene glycol, an ester exchange reaction was carried out by a conventional procedure. To the resulting product, the following were added: 22 parts by weight (5 mol %/total ester linkage) of an ethylene glycol solution (concentration: 35% by weight) of 5-sodiumsulfo-di($\beta$-hydroxyethyl)isophthalic acid (abbreviated to SIP), 0.04 part by weight of antimony trioxide, and 0.1 part by weight of trimethyl phosphate. Thereafter, the temperature was raised gradually, the pressure was reduced, and polymerization was carried out at 285° C. and 0.5 mmHg. In this manner, a copolymer polyester having an intrinsic viscosity of 0.5 was obtained.

Thereafter, the extrusion and the film formation were carried out in the same manner as that in Example 80, and a biaxially oriented film having a film thickness of 80 mm was thereby obtained. A light-sensitive material was then prepared by coating the emulsion layers and the backing layers in the same manner as that in Example 72. Evaluation was made in the same manner as that in Example 72, and the results shown in Table 18 were obtained. (Sample No. 36)

From the results shown in Table 18, it can be found that the laminated film having the L and b values and the degree of curl in the width direction, which fall within the ranges specified in the present invention, has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention. Also, it can be found that the film, wherein the copolymer polyester is the copolymer polyethylene-2,6-naphthalate, has a very high strength and thus is preferable.

EXAMPLE 82

Two kinds of copolymer polyesters having an intrinsic viscosity of 0.55 and containing the copolymerization constituents in the proportions shown in Table 19 were prepared in the same manner as that in Example 72, except that the amounts of SIP and PEG added were changed. A film having a film thickness of 80 μm was then prepared in the same manner as that in Example 72, except that the thus obtained copolymer polyesters and a commercially available polyethylene terephthalate (intrinsic viscosity: 0.65) were used and three extruders were used so as to obtain the layer configuration shown in Table 19. A light-sensitive material was then prepared by coating the emulsion layers and the backing layers in the same manner as that in Example 72. Evaluation was made in the same manner as that in Example 72, and the results shown in Table 19 were obtained. (Sample Nos. 37 to 39)

In the state of the film, the side of the polyester layer containing more copolymerization constituent had curl in the width direction.

EXAMPLE 83

Two kinds of copolymer polyesters having an intrinsic viscosity of 0.55 and containing the copolymerization constituents in the proportions shown in Table 20 were prepared in the same manner as that in Example 72, except that the amounts of SIP and PEG added were changed. A film having a film thickness of 80 μm was then prepared in the same manner as that in Example 72, except that the thus obtained copolymer polyesters and a commercially available polyethylene terephthalate (intrinsic viscosity: 0.65) were used and two extruders were used so as to obtain the layer configuration shown in Table 19. A light-sensitive material was then prepared by coating the emulsion layers and the backing layers in the same manner as that in Example 72, Evaluation was made in the same manner as that in Example 72, and the results shown in Table 19 were obtained. (Sample Nos. 40 and 41)

From the results shown in Table 19, it can be found that the laminated film having the L and b values and the degree of curl in the width direction, which fall within the ranges specified in the present invention, has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention.

Also, it can be found that, in the case of the laminated film, the effects of the present invention can be accomplished even if the composition varies besides the layer configuration, the film thickness, and the kind of the polyester.

In the state of the film, the side of the polyester layer containing more copolymerization constituent had curl in the width direction.

EXAMPLE 84

Two kinds of copolymer polyesters having different intrinsic viscosities were prepared in the same manner as that in Example 72, except that the torque at the end of the polymerization was varied and the intrinsic viscosity was changed, while amounts of SIP and PEG added were kept unchanged. A film having a film thickness of 80 μm was then prepared in the same manner as that in Example 72, except that the thus obtained copolymer polyesters and a commercially available polyethylene terephthalate (intrinsic viscosity: 0.65) were used and worked with three extruders such that the film might be constituted of the materials shown in Table 20. A light-sensitive material was then prepared by coating the emulsion layers and the backing layers in the same manner as that in Example 72. Evaluation was made in the same manner as that in Example 72, and the results shown in Table 20 were obtained. (Sample Nos. 42 to 46)

The copolymer polyesters, which were used to constitute the two outer layers of the three-layered film, were independently sampled from the extruders, and their intrinsic viscosities were measured. The results shown in Table 20 were obtained.

As for sample No. 45, the copolymer polyester, which was obtained in Example 72 and which had an intrinsic viscosity of 0.55, was used to constitute the middle copolymer polyester layer.

From the results shown in Table 20, it can be found that the laminated film having the L and b values and the degree of curl in the width direction, which fall within the ranges specified in the present invention, has good color reproducibility, good storage stability at high temperatures, and good roll set curl eliminating properties. The film also has a high mechanical strength even with a small film thickness and can be subjected to an ordinary automatic development process. Therefore, the film is suitable as the support of the photographic material for the purposes of the present invention.

In the state of the film, the side of the polyester layer having a higher intrinsic viscosity had curl in the width direction.

It can also be found that the difference ΔIV between the intrinsic viscosities should preferably fall within the range of 0.02 to 0.5, should more preferably fall within the range of 0.05 to 0.4, and should most preferably fall within the range of 0.1 to 0.3.

Additionally, it can be found that, in the case of the laminated film, the effects of the present invention can be accomplished even if the intrinsic viscosity varies besides the layer configuration, the film thickness, the kind of the polyester, and the composition.

It can further be found that the effects of the present invention can be accomplished even if the intrinsic viscosity is 0.35 or more.

EXAMPLE 85

To 100 parts by weight of dimethyl terephthalate and 64 parts by weight of ethylene glycol, the following were added: 0.05 part by weight of a hydrate of manganese acetate serving as ester exchange catalyst, 28 parts by weight (5 mol %/total ester linkage) of an ethylene glycol solution (concentration: 35% by weight) of 5-sodiumsulfo-di($\beta$-hydroxyethyl)isophthalic acid (abbreviated to SIP), 8.7 parts by weight (7% by weight/polymer) of polyethylene glycol (abbreviated to PEG) (number-average molecular weight: 1,000), 0.05 part by weight of sodium acetate, 0.05 part by weight of antimony trioxide, 0.13 part by weight of trimethyl phosphate, and Irganox 245 (supplied by Ciba-Geigy Ltd.) serving as an anti-oxidant and added such that the proportion might be 1% by weight with respect to a product polymer. Thereafter, the temperature was raised gradually, and an ester exchange reaction was carried out at 170° C. in a nitrogen atmosphere. Methanol was then removed by distillation, the pressure was reduced, and polymerization was carried out at 275° C. and 0.5 mmHg. In this manner, a copolymer polyester having an intrinsic viscosity of 0.55 was obtained.

A film having a film thickness of 80 μm was obtained in the same manner as that in Example 72 by using the thus obtained copolymer polyester and a commercially available polyethylene terephthalate and laminating the copolymer polyethylene terephthalate layers as the outer layers. A light-sensitive material was then prepared by coating the emulsion layers and the backing layers in the same manner as that in Example 72. Evaluation was made in the same manner as that in Example 72, and the results shown in Table 20 were obtained. (Sample No. 47)

From the results obtained in the above-described examples, it can be found that, in cases where the characteristics fall within the ranges specified in the present invention, a film suitable for a support of the photographic material can be obtained regardless of the molecular weight of the polyethylene glycol and the polymerization method for the copolymer polyester.

As apparent from Tables 1 to 20, in cases where the degree of roll set curl after the heat treatment and the degree of the recovery curl after the treatment in a hot water bath are within the scope of the present invention, roll set curl is easily eliminated. Also, it can be understood that in cases where the light-sensitive material is coated for a photograph and the color reproducibility is considered for obtaining a photograph, the light-sensitive material having the L value of L≧85 and the b value of b≦5 which are within the scope of the present invention is excellent for a permissible support for a photographic material.

TABLE 13

| Sample No. | Layer configuration M:Copolymerized polymer P:Polyester | Thickness ratio of layer | Thickness ratio of outer layers dA/dB | Degree of roll set curl after heat treatment ($m^{-1}$) | Recovery degree of curl after treatment in hot water bath ($m^{-1}$) | Degree of curl in width direction ($m^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|---|---|---|---|---|
| 1 | M/P/M | 1.5/0.8/0.5 | 3 | 122 | 24 | 16 | 92.0 | 1.2 | ◉ | ○ | ◉ | ○ | Present invention |
| 2 | M/P/M | 3/0.8/0.5 | 6 | 97 | 8 | 35 | 92.1 | 1.2 | ◉ | ○ | ◉ | Δ | Present invention |
| 3 | M/P/M | 2.5/0.8/0.5 | 5 | 107 | 14 | 26 | 92.0 | 1.2 | ◉ | ○ | ◉ | Δ | Present invention |
| 4 | M/P/M | 1.2/0.8/0.8 | 1.5 | 128 | 36 | 14 | 92.5 | 1.0 | ◉ | ○ | ◉ | ○ | Present invention |
| 5 | M/P/M | 1.1/0.8/1 | 1.1 | 134 | 40 | 11 | 91.5 | 1.4 | ◉ | ○ | ◉ | ○ | Present invention |
| 6 | M/P/M | 1/0.8/1 | 1 | 144 | 50 | 0 | 92.5 | 0.8 | X | ○ | ○ | Δ | Comparison |
| 7 | M/P | 1.5/1 | 1.5 | 125 | 22 | 20 | 92.5 | 0.7 | ◉ | ○ | ◉ | ○ | Present invention |
| 8 | M/P | 1/1 | 1 | 117 | 27 | 17 | 92.9 | 0.6 | ○ | ○ | ◉ | ○ | Present invention |
| 9 | P/M/P | 1/1.5/0.5 | 2 | 125 | 34 | 6 | 91.7 | 0.9 | ○ | ○ | ◉ | ○ | Present invention |
| 10 | P/M/P | 1.5/1.5/0.5 | 3 | 111 | 25 | 12 | 91.8 | 1.0 | ○ | ○ | ◉ | ○ | Present invention |
| 11 | M | — | — | 155 | 43 | 0 | 93.0 | 0.8 | ○ | ○ | ○ | X | Comparison |

TABLE 14

| Sample No. | SIP (mol %/total ester linkage) | PEG (% by weight/total weight) | Thickness ratio of outer layers dA/dB | Degree of roll set curl after heat treatment ($m^{-1}$) | Recovery degree of curl after treatment in hot water bath ($m^{-1}$) | Degree of curl in width direction ($m^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|---|---|---|---|---|
| 12 | 3 | 10 | 3 | 135 | 41 | 17 | 91.3 | 1.0 | ◉ | ○ | ◉ | ○ | Present invention |
| 13 | 7 | 3 | 3 | 125 | 35 | 21 | 85.4 | 2.7 | ◉ | ○ | ○ | ○ | Present invention |
| 14 | 3 | 3 | 3 | 124 | 37 | 11 | 93.1 | 0.2 | ○ | ◉ | ◉ | ○ | Present invention |
| 15 | 7 | 10 | 3 | 130 | 33 | 21 | 87.6 | 3.8 | ◉ | ○ | ○ | ○ | Present invention |
| 16 | 0 | 7 | 3 | 134 | 72 | 9 | 84.0 | 1.4 | X | ◉ | ◉ | ○ | Comparison |

TABLE 14-continued

| Sample No. | SIP (mol %/total ester linkage) | PEG (% by weight/ total weight) | Thickness ratio of outer layers dA/dB | Degree of roll set curl after heat treatment (m$^{-1}$) | Recovery degree of curl after treatment in hot water bath (m$^{-1}$) | Degree of curl in width direction (m$^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|---|---|---|---|---|
| 17 | 5 | 1 | 3 | 97 | 44 | 10 | 93.8 | 0.2 | ○ | ⊙ | ⊙ | ○ | Present invention |
| 18 | 5 | 12 | 3 | 149 | 38 | 24 | 85.9 | 5.4 | ⊙ | ○ | X | X | Comparison |
| 19 | 9 | 7 | 3 | 125 | 21 | 24 | 87.7 | 4.8 | ⊙ | △ | ○ | △ | Present invention |

TABLE 15

| Sample No. | Polymerization temperature (°C.) | Colorimetry value L | Colorimetry value b | Eliminating property of roll set curl | Modulas of elasticity | Color reproducibility | Storage stability at high temperature | Remarks |
|---|---|---|---|---|---|---|---|---|
| 20 | 270 | 91.7 | 1.0 | ⊙ | ○ | ⊙ | ○ | Present invention |
| 21 | 290 | 83.1 | 4.4 | ⊙ | ○ | X | △ | Comparison |

TABLE 16

| Sample No. | Amount of catalyst for ester interchange Mn | Amount of catalyst for ester interchange Ca | Colorimetry value L | Colorimetry value b | Eliminating property of roll set curl | Modulas of elasticity | Color reproducibility | Storage stability at high temperature | Remarks |
|---|---|---|---|---|---|---|---|---|---|
| 22 | 3 × 10$^{-4}$ | 0 | 92.8 | 1.9 | ⊙ | ○ | ○ | △ | Present invention |
| 23 | 3 × 10$^{-4}$ | 1.5 × 10$^{-4}$ | 94.2 | 0.8 | ⊙ | ○ | ⊙ | ○ | Present invention |
| 24 | 3 × 10$^{-4}$ | 2.5 × 10$^{-4}$ | 94.0 | 1.0 | ⊙ | ○ | ⊙ | ○ | Present invention |
| 25 | 3 × 10$^{-4}$ | 11 × 10$^{-4}$ | 84.0 | 2.2 | ⊙ | ○ | X | ○ | Comparison |
| 26 | 0 | 4 × 10$^{-4}$ | 82.0 | 5.1 | ⊙ | ○ | X | ○ | Comparison |

TABLE 17

| Sample No. | SIP (mol %/ total ester linkage) | DMA (% by weight/total weight) | Thickness ratio of outer layers dA/dB | Degree of roll set curl after heat treatment (m$^{-1}$) | Recovery degree of curl after treatment in hot water bath (m$^{-1}$) | Degree of curl in width direction (m$^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|---|---|---|---|---|
| 27 | 5 | 8 | 3 | 122 | 27 | 16 | 91.7 | 0.8 | ⊙ | | ⊙ | | Present invention |
| 28 | 3 | 10 | 3 | 134 | 40 | 17 | 87.2 | 2.0 | | | | | Present invention |
| 29 | 7 | 3 | 3 | 124 | 31 | 12 | 91.0 | 0.6 | | | ⊙ | | Present invention |
| 30 | 3 | 3 | 3 | 124 | 32 | 8 | 89.4 | 3.0 | | ⊙ | | △ | Present invention |
| 31 | 7 | 10 | 3 | 133 | 35 | 18 | 92.0 | 1.7 | ⊙ | | ⊙ | | Present invention |
| 33 | 5 | 1 | 3 | 92 | 43 | 10 | 92.8 | 0.7 | ⊙ | | | | Present invention |
| 34 | 5 | 12 | 3 | 150 | 40 | 21 | 88.0 | 5.8 | ⊙ | | | x | Comparison |

TABLE 18

| No. | Degree of roll set curl after heat treatment (m$^{-1}$) | Recovery degree of curl after treatment in hot water bath (m$^{-1}$) | Degree of curl in width direction (m$^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|---|---|
| 36 | 105 | 35 | 10 | 90.2 | 3.4 | ⊚ | | ⊚ | | Present invention |
| 36 | 108 | 37 | 8 | 90.8 | 1.9 | ⊚ | | ⊚ | Δ | Present invention |

TABLE 19

| No. | Layer configuration M:Copolymerized polyester P:Polyester | Thickness ratio of each layer | Composition of first layer SIP | Composition of first layer PEG | Composition of third layer SIP | Composition of third layer PEG | Thickness ratio of outer layers dA/dB | Degree of roll set curl after heat treatment (m$^{-1}$) | Recovery degree of curl after treatment in hot water bath (m$^{-1}$) |
|---|---|---|---|---|---|---|---|---|---|
| 37 | M/P/M | 1.2/0.8/1.2 | 6 | 8 | 3 | 5 | 1 | 132 | 38 |
| 38 | M/P/M | 1.2/0.8/0.8 | 6 | 8 | 3 | 5 | 1.5 | 121 | 21 |
| 39 | M/P/M | 1.2/0.8/0.8 | 4 | 7 | 2 | 5 | 1.5 | 124 | 39 |
| 40 | M/M | 1/1 | 6 | 8 | 3 | 5 | — | 132 | 21 |
| 41 | M/M | 1.5/1 | 6 | 8 | 3 | 5 | — | 127 | 17 |

| No. | Degree of curl in width direction (m$^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|
| 37 | 14 | 91.4 | 1.2 | | | ⊚ | | Present invention |
| 38 | 19 | 92.1 | 0.9 | ⊚ | | ⊚ | | Present invention |
| 39 | 11 | 92.1 | 0.6 | | | ⊚ | Δ | Present invention |
| 40 | 16 | 93.0 | 1.4 | ⊚ | | ⊚ | Δ | Present invention |
| 41 | 17 | 92.1 | 2.0 | ⊚ | | ⊚ | Δ | Present invention |

TABLE 20

| No. | Layer configuration M:Copolymerized polyester P:Polyester | Thickness ratio of each layer | IV of first layer (dl/g) | IV of third layer (dl/g) | ΔIV | Thickness ratio of outer layers dA/dB | Degree of roll set curl after heat treatment (m$^{-1}$) | Recovery degree of curl after treatment in hot water bath (m$^{-1}$) |
|---|---|---|---|---|---|---|---|---|
| 42 | M/P/M | 1.2/0.8/1.2 | 0.45 | 0.47 | 0.02 | 1 | 131 | 32 |
| 43 | M/P/M | 1.2/0.8/1.2 | 0.45 | 0.55 | 0.1 | 1 | 124 | 24 |
| 44 | M/P/M | 1.2/0.8/1.2 | 0.35 | 0.55 | 0.2 | 1 | 118 | 17 |
| 45 | M/M/M | 1.2/0.8/1.2 | 0.35 | 0.80 | 0.45 | 1 | 127 | 22 |
| 46 | M/P/M | 1.2/1/0.8 | 0.45 | 0.47 | 0.02 | 1.5 | 125 | 20 |
| 47 | M/P/M | 1.5/1/0.5 | 0.55 | 0.55 | 0 | 3 | 122 | 22 |

| No. | Degree of curl in width direction (m$^{-1}$) | Colorimetry value L | Colorimetry value b | Eliminating property of roll set curl | Modulas of elasticity | Color reproducibility | Storage stability at high temperature | Remarks |
|---|---|---|---|---|---|---|---|---|
| 42 | 5 | 90.0 | 2.8 | | | ⊚ | Δ | Present invention |
| 43 | 11 | 89.2 | 2.1 | ⊚ | | | Δ | Present invention |
| 44 | 17 | 87.8 | 3.1 | ⊚ | | | | Present invention |
| 45 | 28 | 87.0 | 3.9 | ⊚ | | | Δ | Present invention |
| 46 | 13 | 90.3 | 2.6 | ⊚ | | ⊚ | | Present invention |
| 47 | 13 | 90.9 | 0.9 | | | | | Present invention |

EXAMPLES 86 TO 91

After 0.1 part by weight of a hydrate of calcium acetate was added to 100 parts by weight of a 2,6-naphthalenedicarboxylic acid dimethyl ester and 56 parts by weight of ethylene glycol, an ester exchange reaction was carried out by a conventional procedure. To the resulting product, the following were added: 17 parts by weight of an ethylene glycol solution (concentration: 35% by weight) of 5-sodiumsulfo-di($\beta$-hydroxyethyl)isophthalic acid, 12 parts by weight of polyethylene glycol (number-average molecular weight: Mw 3,000), 0.04 part by weight of antimony trioxide, and 0.1 part by weight of trimethyl phosphate. Thereafter, the temperature was raised gradually, the pressure was reduced, and polymerization was carried out at 285° C. and 0.5 mmHg. In this manner, a copolymer polyester was obtained.

The thus obtained copolymer polyester and a commercially available polyethylene naphthalate (intrinsic viscosity: 0.65) were respectively dried in a vacuum at 150° C. and subjected to melt extrusion at 285° C. by using three extruders. The materials were adhered in a layered form in a T-die so as to obtain a layer configuration shown in Table 21, and were quenched and solidified on a cooling drum to form a laminated unoriented film. At this time, the extrusion rate of each material was adjusted such that the thickness of each layer might be changed as shown in Table 21. Thereafter, the film was subjected to longitudinal orientation (magnification: 3.5) at 135° C. and then to transverse orientation (magnification: 3.5) at 145° C. Heat setting was then carried out at 220° C., and a biaxially oriented film having a film thickness of 80 μm was thereby obtained. For the biaxially oriented film thus obtained, measurement and evaluation were carried out as described below. The results shown in Table 21 were obtained.

Measurement and Evaluation of Physical Values

Modulus of elasticity

The film was left to stand for 4 hours or more in a room adjusted at a temperature of 23° C. and relative humidity of 55%. It was then cut into a sample having a width of 10 mm and a length of 200 mm, and subjected to a tensile test in which the temperature was 70° C., the distance between chucks was 100 mm, and the tensile rate was 100 m/minute. The modulus of elasticity was thus measured. A modulus of elasticity of 500 kg/mm² or more is practically acceptable.

Transparency

Haze of the film was measured according to JIS K-6714. A haze level of 3% or less is practically appropriate for the support of the photographic material.

Roll set curl recovery properties

A light-sensitive material was prepared by overlaying a silver halide emulsion layer on one surface of the biaxially oriented film by a conventional procedure. The light-sensitive material was cut into a sample having a size of 15 cm×35 mm. The sample was wound around a core tube having a diameter of 10.8 mm and then subjected to heat treatment under the conditions of 55° C. and 30% RH for 4 hours. Thereafter, the sample was released from the core tube, a load of 50 g was then applied no the sample, and the sample was dipped in a water bath at 40° C. for 15 minutes. Thereafter, the sample was dried in a warm air drier at 55° C. for 3 minutes. The sample was then suspended vertically in an atmosphere at 23° C. and 55% RH. The length of the sample was measured, and the degree of recovery to the original sample length of 15 cm was evaluated. The results were evaluated with the grades shown below.

Evaluation criteria:
⊚: 70% or more.
O: From 50% to less than 70%.
X: Less than 50%.

The "O" grade or the higher grade are acceptable practically.

TABLE 21

| | Sample No. | Layer configuration | Thickness ratio of each layer | Sum of thickness of copolymerized polyester/Sum of thickness of polyester layer = (d₂/d₁) | Roll set curl after heat treatment (m⁻¹) | Recovery curl after treatment water bath (m⁻¹) | Haze (%) | Modulus of elasticity Kg/mm² | Recovery ratio of roll set curl (%) |
|---|---|---|---|---|---|---|---|---|---|
| Example 86 | 1 | M/P/M | 1/1/1 | 2 | 125 | 30 | 0.5 | 620 | ⊚ |
| Example 87 | 2 | M/P/M | 1/2/1 | 1 | 110 | 35 | 0.5 | 650 | ⊚ |
| Example 88 | 6 | M/P/M | 2/1/1 | 3 | 100 | 20 | 0.6 | 580 | ⊚ |
| Example 89 | 7 | M/M/P | 1/1/1 | 2 | 90 | 15 | 0.5 | 620 | ⊚ |
| Example 90 | 8 | M/M/P | 1/1/2 | 1 | 85 | 30 | 0.4 | 660 | ⊚ |
| Example 91 | 10 | P/M/P | 1/2/1 | 1 | 115 | 40 | 0.5 | 620 | |

M: Coplymerized polyester
P: Polyester

As is clear from Table 21, the laminated film, which is constituted of the copolymer polyester or the polyester and in which the roll set curl and the recovery curl fall within the scope of the present invention and the ratio between layers falls within the range specified in present invention, has good roll set curl recovery properties and good modulus of elasticity.

Also, the light-sensitive photographic material formed by overlaying a light-sensitive layer on the film support by a conventional procedure had good performance and was practically acceptable.

EXAMPLES 92 TO 96

A biaxially oriented film having a thickness of 80 mm was prepared in the same manner as that in Example 86, except that the amount of the ethylene glycol solution (concentration: 35% by weight) of 5-sodiumsulfo-di($\beta$-hydroxyethyl)isophthalic acid serving as the aromatic dicarboxylic acid having a metal sulfonate group and the amount of the polyethylene glycol (number-average molecular weight: 3,000) serving as the polyalkylene glycol were changed as shown in Table 22, and the ratio between the layer thicknesses was the same as that in sample No. 1 shown in Table 21. For the sample obtained, measurement and evaluation of physical values were carried out in the same manner as that in Example 86. The results shown in Table 22 were obtained.

TABLE 22

| | Polyalkylene glycol | | Aromatic dicarbocyclic acid containing metal sulfonate group | | Roll set curl after heat treatment ($m^{-1}$) | Recovery curl after treatment in hot water bath ($m^{-1}$) | Modulas of elasticity $Kg/mm^2$ | ratio of troll set curl (%) | Haze (%) |
|---|---|---|---|---|---|---|---|---|---|
| | Added amount Parts by weight | Copolymerization ratio % by weight/ polymer | Added amount Parts by weight | Copolymerization ratio mol %/ester bond unit | | | | | |
| Example 92 | 11 | 10.0 | 4 | 1.0 | 115 | 45 | 650 | | 1.4 |
| Example 93 | 13 | 11.0 | 17 | 4.0 | 120 | 30 | 620 | ◎ | 0.9 |
| Example 94 | 12 | 10.0 | 31 | 7.0 | 125 | 20 | 580 | ◎ | 0.5 |
| Example 95 | 3 | 3.0 | 17 | 4.0 | 105 | 35 | 620 | | 0.5 |
| Example 96 | 26 | 20.0 | 17 | 4.0 | 135 | 30 | 570 | ◎ | 0.5 |

From the results shown in Table 22, it can be found that the samples of Examples 92 through 96 has satisfactory results with respect to the modulus of elasticity, the roll set curl recovery properties, and haze.

EXAMPLE 97

After 0.1 part by weight of a hydrate of calcium acetate serving as an ester exchange catalyst was added to 100 parts by weight of dimethyl terephthalate and 64 parts by weight of ethylene glycol, an ester exchange reaction was carried out by a conventional procedure.

To the resulting product, the following were added: 28 parts by weight of an ethylene glycol solution (concentration: 35% by weight) of 5-sodiumsulfo-di (β-hydroxyethyl) isophthalic acid, 8 parts by weight of polyethylene glycol (number-average molecular weight: 3,000), 0.05 part by weight of antimony trioxide, 0.13 part by weight of trimethyl phosphate, and 0.02 part by weight of sodium hydroxide. Thereafter, the temperature was raised gradually, the pressure was reduced, and polymerization was carried out at 280° C. and 0.5 mmHg. In this manner, a copolymer polyester was obtained. The copolymer polyester contained diethylene glycol, which was generated as a by-product during the aforesaid polymerization reaction, as an acid constituent.

The thus obtained copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 23, and were quenched and solidified on a cooling drum. In this manner, a laminated unoriented film was obtained. At this time, the extrusion rate of each material was adjusted such that the ratio between the thicknesses of the respective layers might be 1:1:2. Thereafter, the film was subjected to longitudinal orientation (magnification: 3.5) at 85° C. and then to transverse orientation (magnification: 3.5) at 95° C. Heat setting was then carried out at 210° C., and a biaxially oriented film having a film thickness of 80 mm was thereby obtained. As for the thus obtained biaxially oriented film, the content of diethylene glycol was measured with the method described below. Also, the flatness, the modulus of elasticity, and the roll set curl recovery properties were evaluated with the evaluation methods described below. The results shown in Table 23 were obtained. The biaxially oriented film of the present invention had a slightly colored appearance. However, the coloring was of a practically acceptable level. As is clear from Table 23, the film has good results with respect to the flatness, the modulus of elasticity, and the roll set curl recovery properties.

Measurement of diethylene glycol content

The copolymer polyester layer was scraped off from the surface of the multi-layered film, and pulverized. Thereafter, 2 g of the pulverized copolymer polyester was added to 50 ml of a 1N methanol solution of potassium hydroxide, and the mixture was heated at 230° C. with stirring. Ninety minutes after the heating begun, 10 ml of pure water was added, and the heating was continued for further 30 minutes. Thereafter, 7 g of terephthalic acid was added, the mixture was cooled to normal temperature, 5 ml of a 1 vol.% methanol solution of tetraethylene glycol dimethyl ether was added, and the resulting mixture was stirred for 5 minutes. The thus obtained liquid was filtered, the filtrate was analyzed by gas chromatography, and the content of diethylene glycol in the copolymer polyester was calculated from a previously obtained calibration curve.

Flatness

The film was subjected to moisture conditioning under the conditions of 23° C. and 55% relative humidity for 4 hours or more. The film was cut into a sample having a size of 120 mm×150 mm, and the sample was heated at 150° C. for 30 minutes in an unstretched state in a hot air oven. Thereafter, the sample was subjected to moisture conditioning at 23° C. and 55% relative humidity, and the degree of waving was investigated visually and evaluated with the grades described below. These grades were determined in accordance with acceptability for a support of the photographic material. The grade 3 or higher is practically acceptable.

| Evaluation criteria: | |
|---|---|
| Grade 5: | Very good. |
| Grade 4: | Good. |
| Grade 3: | Waving is found by careful investigation. |
| Grade 2: | Medium level of waving. |
| Grade 1: | Very much waving. |

Roll set curl recovery properties

A film sample having a size of 12 cm×35 mm was wound around a core tube having a diameter of 10 mm. The sample was then left to stand under the conditions of 55° C. and 20% RH for 3 minutes, and was thus imparted with roll set curl. Thereafter, the sample was released from the core tube, and dipped in pure water at 38° C. for 15 minutes. A load of 50 g was then applied to the sample, and the sample was dried in a hot air drier at 55° C. for 3 minutes. The sample was then released from the load under the moisture conditioning conditions of 55% relative humidity, suspended vertically, and the distance between the two ends of the sample was measured. In this manner, the degree of recovery with respect to the original distance of 12 cm was evaluated. For practical use as a support of the photographic material, the roll set curl recovery properties should preferably be 50% or more, and should preferably be 80% or more. The roll set curl recovery properties of 50% or more are acceptable for use as photographic film.

Modulus of elasticity

The photographic film was left to stand for 4 hours or more in a room adjusted at a temperature of 23° C. and relative humidity of 55%. It was then cut into a sample having a width of 10 mm and a length of 200 mm, and subjected to a tensile test in which the distance between chucks was 100 mm and the tensile rate was 100 mm/min.

EXAMPLE 98

A biaxially oriented film having a thickness of 80 mm was obtained in the same manner as that in Example 97, except that 0.07% by weight of tetraethylhydroxyammonium was added in lieu of sodium hydroxide used during the preparation of the copolymer polyester. Evaluation was made on the thus obtained film in the same manner as that in Example 97. The results shown in Table 23 were obtained. As in Example 97, the obtained film had a slightly colored appearance, but the coloring was of a practically acceptable level. Also, as is clear from Table 23, practically acceptable results were obtained with respect to the flatness, the modulus of elasticity, and the roll set curl recovery properties.

EXAMPLE 99

A biaxially oriented film having a thickness of 80 mm was obtained in the same manner as that in Example 97, except that 0.04% by weight of sodium acetate was added during the ester exchange reaction in lieu of sodium hydroxide. Evaluation was made on the thus obtained film in the same manner as that in Example 97. The results shown in Table 23 were obtained. The obtained film had a colorless, transparent appearance. Also, as is clear from Table 23, practically acceptable results were obtained with respect to the flatness, the modulus of elasticity, and the roll set curl recovery properties.

Also, the photographic film formed by overlaying a light-sensitive layer on the film support by a conventional procedure had good performance and was practically acceptable.

EXAMPLE 100

After 0.1 part by weight of a hydrate of calcium acetate serving as an ester exchange catalyst was added to 100 parts by weight of dimethyl terephthalate, 70 parts by weight of ethylene glycol, and 10 parts by weight of dimethyl adipate, an ester exchange reaction was carried out by a conventional procedure.

To the resulting product, the following were added: 32 parts by weight of an ethylene glycol solution (concentration: 35% by weight) of 5-sodiumsulfo-di($\beta$-hydroxyethyl)isophthalic acid, 0.05 part by weight of antimony trioxide, 0.13 part by weight of trimethyl phosphate, and 0.04 part by weight of sodium acetate. Thereafter, the temperature was raised gradually, the pressure was reduced, and polymerization was carried out at 280° C. and 0.5 mmHg. In this manner, a copolymer polyester was obtained.

The thus obtained copolymer polyester and a commercially available polyethylene terephthalate (intrinsic viscosity: 0.65) were respectively dried in a vacuum at 150° C. and subjected to melt extrusion at 285° C. by using three extruders. The materials were adhered in a layered form in a T-die such that each of three layers might be constituted of the materials shown in Table 23, and were quenched and solidified on a cooling drum. In this manner, a laminated unoriented film was obtained. At this time, the extrusion rate of each material was adjusted such that the ratio between the thicknesses of the respective layers might be 1:1:1.

Thereafter, the unoriented film thus obtained was subjected to longitudinal orientation (magnification: 3.3) at 80° C. and then to transverse orientation (magnification: 3.3) at 90° C. Heat setting was then carried out at 200° C. for 30 seconds, and a biaxially oriented film having a film thickness of 80 $\mu$m was thereby obtained. As for the thus obtained biaxially oriented film, the content of diethylene glycol was measured in the same manner as that in Example 97. Also, the flatness, the modulus of elasticity, and the roll set curl recovery properties were evaluated in the same manner as that in Example 97. The results shown in Table 23 were obtained. The biaxially oriented film thus obtained had a colorless, transparent appearance. As is clear from Table 23, the film has good results with respect to the flatness, the modulus of elasticity, and the roll set curl recovery properties.

EXAMPLE 101

A biaxially oriented film having a film thickness of 80 $\mu$m was obtained in the same manner as that in Example 99, except that ratio between the thicknesses of the respective layers was 2:3:4. As for the thus obtained biaxially oriented film, the content of diethylene glycol was measured in the same manner as that in Example 97. Also, the flatness, the modulus of elasticity, and the roll set curl recovery properties were evaluated in the same manner as that in Example 97. The results shown in Table 23 were obtained. The biaxially oriented film thus obtained had a colorless, transparent appearance. As is clear from Table 23, the content of diethylene glycol is 3% by weight, the film has practically acceptable results with respect to the flatness and the modulus of elasticity, and has very good roll set curl recovery properties.

EXAMPLE 102

A biaxially oriented film having a film thickness of 80 $\mu$m was obtained in the same manner as that in Example 100, except that ratio between the thicknesses of the respective layers was 1:2:3. As for the thus obtained biaxially oriented film, the content of diethylene glycol was measured in the same manner as that in Example 97. Also, the flatness, the modulus of elasticity, and the roll set curl recovery properties were evaluated in the same manner as that in Example 97. The results shown in Table 23 were obtained. The biaxially oriented film thus obtained had a colorless, transparent appearance. As is clear from Table 23, the content of diethylene glycol is 3% by weight, the film has practically acceptable results with respect to the flatness and the modulus of elasticity, and has very good roll set curl recovery properties.

TABLE 23

| | Layer configuration* | Diethylene glycol content (mol %) | Roll set curl after heat treatment ($m^{-1}$) | Recovery curl after treatment in hot water bath ($m^{-1}$) | Appearance of film | Flatness | Modulas of elasticity ($kg/mm^2$) | Recovery ratio of roll set curl (%) |
|---|---|---|---|---|---|---|---|---|
| Example 97 | M/P/M | 4 | 125 | 25 | Slightly colored | 5 | 500 | 85 |
| Example 98 | M/P/M | 5 | 125 | 20 | Slightly colored | 4 | 500 | 85 |
| Example 99 | M/P/M | 3 | 125 | 30 | Well | 5 | 520 | 90 |
| Example 100 | M/P/M | 3 | 130 | 45 | Well | 3 | 450 | 70 |
| Example 101 | M/P/M | 3 | 115 | 10 | Well | 5 | 520 | 100 |
| Example 102 | M/P/M | 3 | 110 | 15 | Well | 3 | 450 | 100 |

*M: Copolymerized polyester layer P: Polyester layer (polyethylene terephthalate)

According to the present invention, the film is provided which has a required level of strength, does not easily suffer from roll set curl, has good roll set curl eliminating properties, an appropriate level of curl in the width direction, and good handling properties, and is useful as a material to be used as a printing material, a magnetic material, etc. and a support of photographic materials can be provided which can be suitable for a photographic film which can be used for a compact camera.

What is claimed is:

1. A support of the photographic material comprising at least two polyester layers having a degree of roll set curl of not higher than 135 $m^{-1}$ after being subjected to heat treatment, and having a degree of recovery curl of not higher than 45 $m^{-1}$ after being subjected to hot water bath treatment.

2. The support of the photographic material of claim 1, wherein the film has a breaking strength in a longitudinal direction of not lower than 16 $kg/mm^2$.

3. The support of the photographic material of claim 1, wherein the film has colorimetric values satisfying the conditions of $L \geq 85$, and $b \leq 5$, wherein L represents the lightness, and b represents the chromaticity.

4. The support of the photographic material of claim 1, wherein the support of the photographic material comprises at least one polyester layer and at least one copolymer polyester layer, which is constituted of a copolymer polyester containing a polyethylene naphthalate as a main constituent, the copolymer polyester containing an aromatic dicarboxylic acid having a metal sulfonate group in a proportion falling within the range of 1 to 8 mol % with respect to a total ester linkage and containing a compound having a repeated structure of an alkyleneoxy group in a proportion falling within the range of 3 to 20% by weight with respect to the copolymer polyester, a thickness of a single polyester layer is not larger than 50 mm, and the ratio of total thickness $d_8$ of the copolymer polyester layer to the total thickness $d_7$ of the polyester layer falls within the range of $0.7 \leq d_8/d_7 \leq 3$.

5. The support of the photographic material of claim 4, wherein the support of the photographic material comprises at least one polyester layer and at least one copolymer polyester layer, a thickness of a single polyester layer is not larger than 40 μm, and the ratio of total thickness $d_8$ of the copolymer polyester layer to the total thickness $d_7$ of the polyester layer falls within the range of $1 \leq d_8 d_7 \leq 2$.

6. The support of the photographic material of claim 4, wherein the support of the photographic material comprises at Least one polyester layer and at least one copolymer polyester layer, a copolymer polyester, which is contained in the copolymer polyester layer, contains an aromatic dicarboxylic acid having a metal sulfonate group, as a copolymerization constituent, and contains diethylene glycol in a proportion falling within the range of not higher than 5 mol % with respect a total ester linkage.

7. A support of the photographic material comprising a single or a plurality of polyester layers and at least one copolymer polyester layer, which is laminated on both surface of said polyester layer, containing 2 to 7 mole % of an aromatic dicarboxylic acid with respect to the total acid components having metal sulfonate groups as a monomer unit and containing 3 to 10% by weight of polyalkylene glycol with respect to a total weight of a reaction product, wherein when the thickness of said polyester layer is d2, the sum of the thickness of the copolymer polyester layer laminated on one surface of said polyester is d1, an average content (mole %) of said aromatic dicarboxylic acid with respect to the total acid components is S1, and an average content (% by weight) of said polyalkylene glycol with respect to the reaction product is P1, and those of the copolymer polyester layer on the other surface of said polyester layer are d3, S3 and P3, respectively said support simultaneously satisfies the following condition formuras 1, 2 and 3:

condition formura 1; $d_2 \geq 23 \ 50 \ (\mu m)$
condition formura 2; $0.7 \leq \{(d1+d3)/d2\} \leq 3$
condition formura 3; $\{(S1 \times P1 \times d1)/(S3 \times P3 \times d3)\} \geq 1.5$.

* * * * *